US007328332B2

(12) United States Patent
Tran

(10) Patent No.: US 7,328,332 B2
(45) Date of Patent: Feb. 5, 2008

(54) BRANCH PREDICTION AND OTHER PROCESSOR IMPROVEMENTS USING FIFO FOR BYPASSING CERTAIN PROCESSOR PIPELINE STAGES

(75) Inventor: Thang Tran, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/210,428

(22) Filed: Aug. 24, 2005

(65) Prior Publication Data

US 2006/0095745 A1 May 4, 2006

Related U.S. Application Data

(60) Provisional application No. 60/605,846, filed on Aug. 30, 2004, provisional application No. 60/605,837, filed on Aug. 30, 2004, provisional application No. 60/605,836, filed on Aug. 30, 2004.

(51) Int. Cl.
*G06F 9/44* (2006.01)
(52) U.S. Cl. ...................................... 712/238; 712/237
(58) Field of Classification Search ................ 712/233, 712/239, 238, 237
See application file for complete search history.

(56) References Cited

U.S. PATENT DOCUMENTS

| 5,287,467 | A | * | 2/1994 | Blaner et al. ............... 712/235 |
| 5,822,575 | A | | 10/1998 | Tran |
| 5,978,906 | A | | 11/1999 | Tran |
| 6,081,887 | A | * | 6/2000 | Steely et al. ................ 712/239 |
| 6,185,676 | B1 | | 2/2001 | Poplingher et al. |
| 6,189,091 | B1 | | 2/2001 | Col et al. |
| 6,243,805 | B1 | * | 6/2001 | Mahurin ..................... 712/233 |
| 6,526,502 | B1 | | 2/2003 | Col et al. |
| 6,640,297 | B1 | * | 10/2003 | Banning et al. ............ 712/238 |
| 6,701,426 | B1 | * | 3/2004 | Ries et al. .................. 712/239 |
| 6,745,323 | B1 | | 6/2004 | Sinharoy |

(Continued)

OTHER PUBLICATIONS

Warnock, J., et al., "High Performance CMOS Circuit Techniques for the G-4 S/390 Microprocessor," Proceedings of the 1997 International Conference on Computer Design, Figs. 3, 5, and 6.

(Continued)

*Primary Examiner*—Eddie Chan
*Assistant Examiner*—Jacob Petranek
(74) *Attorney, Agent, or Firm*—Wade James Brady, III; Frederick J. Telecky, Jr.

(57) ABSTRACT

A processor (1700) including a pipeline (1710, 1740) having a fetch pipeline (1710) with branch prediction circuitry (1840) to supply respective predicted taken target addresses for branch instructions, an execution pipeline (1740) with a branch execution circuit (1870), and storage elements (in 1860) and control logic (2350) operable to establish a first-in-first-out (FIFO) circuit (1860) with a write pointer WP1 and a read pointer RP1. The control logic (2350) is responsive to the branch prediction circuitry (1840) to write a predicted taken target address to a storage element (in 1860) identified by the write pointer (WP1) and the predicted taken target address remains stationary therein. The FIFO circuit (1860) bypasses a plurality of pipestages between the branch prediction circuitry (1840) and the branch execution circuit (1870). The control logic (2350) is operable to read a predicted taken target address (PTTPCA) from a storage element (in 1860) identified by the read pointer RP1.

44 Claims, 10 Drawing Sheets

U.S. PATENT DOCUMENTS

| | | |
|---|---|---|
| 6,871,275 B1 | 3/2005 | Poplingher et al. |
| 6,886,093 B2 | 4/2005 | Henry et al. |
| 7,266,676 B2 * | 9/2007 | Tran et al. ............... 712/238 |
| 2002/0031166 A1 * | 3/2002 | Subramanian et al. ...... 375/130 |
| 2005/0027975 A1 | 2/2005 | Frommer et al. |

OTHER PUBLICATIONS

Baron, Max, "Five Chips from TI—Or, Is It Six?", Microprocessor Report, Mar. 17, 2003, Figs. 1, 3, and 4.

* cited by examiner

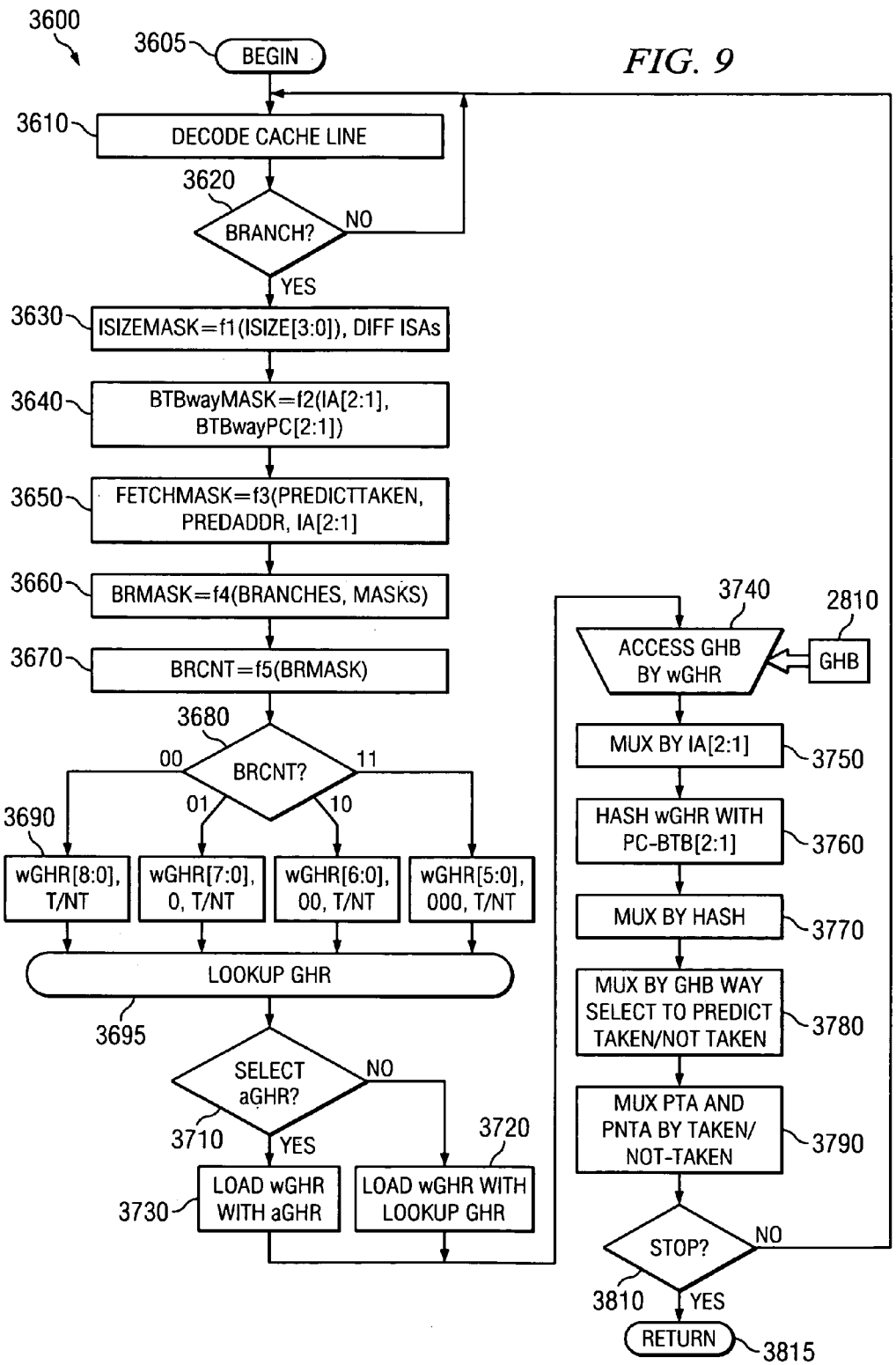

BRANCH PREDICTION AND OTHER PROCESSOR IMPROVEMENTS USING FIFO FOR BYPASSING CERTAIN PROCESSOR PIPELINE STAGES

CROSS-REFERENCE TO RELATED APPLICATIONS

This application is related to provisional U.S. Patent Application Ser. No. 60/605,846, filed Aug. 30, 2004, titled "Global History Register Optimizations," for which priority under 35 U.S.C. 119(e)(1) is hereby claimed and which is hereby incorporated herein by reference.

This application is related to provisional U.S. Patent Application Ser. No. 60/605,837, filed Aug. 30, 2004, titled "Branch Target FIFO and Branch Resolution in Execution Unit," for which priority under 35 U.S.C. 119(e)(1) is hereby claimed and which is hereby incorporated herein by reference.

This application is related to provisional U.S. Patent Application Ser. No. 60/605,836 filed Aug. 30, 2004, titled "Dual Pipeline Multi-Threading," for which priority under 35 U.S.C. 119(e) (1) is hereby claimed and which is hereby incorporated herein by reference.

This application is co-filed so that the present U.S. non-provisional patent application "Processes, Circuits, Devices, And Systems For Branch Prediction And Other Processor Improvements" Ser. No. 11/210,354 and the present U.S. non-provisional patent application "BRANCH PREDICTION AND OTHER PROCESSOR IMPROVEMENTS USING FIFO FOR BYPASSING CERTAIN PROCESSOR PIPELINE STAGES" Ser. No. 11/210,428 each have the same application filing date, and each of said patent applications hereby incorporates the other by reference.

This application is related to U.S. patent application Ser. No. 11/133,870, filed May 18, 2005, titled "Processes, Circuits, Devices, And Systems For Scoreboard And Other Processor Improvements," which is hereby incorporated herein by reference.

STATEMENT REGARDING FEDERALLY SPONSORED RESEARCH OR DEVELOPMENT

Not applicable.

BACKGROUND OF THE INVENTION

This invention is in the field of information and communications, and is more specifically directed to improved processes, circuits, devices, and systems for information and communication processing, and processes of operating and making them. Without limitation, the background is further described in connection with wireless communications processing.

Wireless communications of many types have gained increasing popularity in recent years. The mobile wireless (or "cellular") telephone has become ubiquitous around the world. Mobile telephony has recently begun to communicate video and digital data, in addition to voice. Wireless devices, for communicating computer data over a wide area network, using mobile wireless telephone channels and techniques are also available.

The market for portable devices such as cell phones and PDAs (personal digital assistants) is expanding with many more features and applications. More features and applications call for microprocessors to have high performance but with low power consumption. Thus, keeping the power consumption for the microprocessor and related cores and chips to a minimum, given a set of performance requirements, is very important.

Wireless data communications in wireless local area networks (WLAN), such as that operating according to the well-known IEEE 802.11 standard, has become especially popular in a wide range of installations, ranging from home networks to commercial establishments. Short-range wireless data communication according to the "Bluetooth" technology permits computer peripherals to communicate with a personal computer or workstation within the same room.

Security is important in both wireline and wireless communications for improved security of retail and other business commercial transactions in electronic commerce and wherever personal and/or commercial privacy is desirable. Added features and security add further processing tasks to the communications system. These potentially mean added software and hardware in systems where cost and power dissipation are already important concerns.

Improved processors, such as RISC (Reduced Instruction Set Computing) processors and digital signal processing (DSP) chips and/or other integrated circuit devices are essential to these systems and applications. Reducing the cost of manufacture, increasing the efficiency of executing more instructions per cycle, and addressing power dissipation without compromising performance are important goals in RISC processors, DSPs, integrated circuits generally and system-on-a-chip (SOC) designs. These goals become even more important in hand held and mobile applications where small size is so important, to control the cost and the power consumed.

In high performance microprocessors, instructions often are fetched, decoded, and executed in assembly-line fashion, called a pipeline. The pipeline of a microprocessor has pipeline stages which perform processing on microprocessor instructions, which are analogous to places on a factory assembly line where processing work is performed on workpieces. In a microprocessor, instructions are often fetched in a predetermined order, and if an instruction conditionally or unconditionally specifies that the next instruction should be out of the usual order, then that event is called a branch.

Processors execute some set of instructions in assembly-line order by using a series of circuit stages collectively called a pipeline through which the operations actually sequentially occur to perform the operations represented by each instruction. The operation of each stage is arranged to take relatively little time, and the instructions can be processed rapidly at a high clock rate or processor speed.

Computer software has a list of instructions that represent operations that the processor is to perform or execute, often in list-wise order. However, some of the instructions, called branch instructions, represent directions to the processor to go somewhere else in the list of instructions to execute a succeeding instruction instead of to the next instruction in the list-wise order. Some of these branches are unconditional. Other branches depend on the existence or detection of some condition or event more or less near in time to the time when the branch is to be executed.

Branches present a challenge to pipeline processing of instructions. The most efficient processing of instructions occurs when every stage of the pipeline is operating on the instruction stream. The execution of a branch generally occurs in a later, or downstream, portion of the pipeline. The branch determines which instruction should subsequently come after the branch. The instructions currently being executed earlier in the pipeline may or may not be the ones determined to be subsequent instructions. If the instructions currently being executed earlier in the pipeline are the wrong ones, the operations performed in the earlier pipestages are irrelevant and need to be invalidated or flushed. These irrelevant operations waste time and power. The flush operation also consumes time and power. Then the correct subsequent instruction needs to be issued to the pipeline. The wasted operations are not made up or recovered.

For high performance purposes, a microprocessor may put instructions subsequent to a branch instruction into the pipeline to fetch, decode, and execute, even when the branch instruction has not yet been executed. This process is called branch prediction, which is a not-fully-certain prediction of whether a given branch instruction will take or not-take a branch. However, if a branch prediction is wrong, the instructions in the pipeline and any improvidently computed results from them will have to be "flushed" and replaced with a different sequence of instructions based on the actual branch determined when the branch instruction is actually executed. A pipeline flush entails a substantial amount of wasted time and degrades the performance which is so important in a high-performance microprocessor.

As microprocessor clock frequency has increased, execution pipelines have lengthened (deepened). Also, multiple instructions are "speculatively" issued to one or more pipelines, meaning that the instructions are issued on the uncertain assumption that the branch predictions are correct. In consequence, the importance of accurate branch prediction is increasing because ever more pipeline stages are in danger of being subject to wasted operations ("bubbles") if any branch predictions are incorrect.

The term "branch prediction" as used herein refers to predicting either the state of a branch as taken or not-taken (and any additional states of the branch) or, depending on the context, predicting the succeeding address of an instruction which should succeed a given branch instruction. The succeeding address is called a "next" address herein if the succeeding address is obtained by automatic sequencing of an address counter such as by incrementing or decrementing by one. The succeeding address is called a "target address" or "target" herein when such address is out of program order and is established by what is called a "taken" branch instead of a not-taken branch. A "not-taken" branch goes to the next address established by automatic sequencing of a counter such as by incrementing (or decrementing) it. A branch prediction can point to the address of an instruction or to the address of a cache line for a cache memory or both. The term "cache line" is used herein to refer to information bits or a storing circuit for them that thereupon holds the information bits read from a line in a cache memory. A "storing circuit" means a flop, a register, a register file, a random access memory (RAM), or other suitable circuit for storing information.

Branch prediction circuitry of various types hitherto have been provided to predict the behavior of branch instructions in software with the goal of delivering instructions for execution in the pipeline that reflect the actual order of branching that will occur. However, the prior art approaches still fall short of the goal of perfect branch prediction imposing power dissipation problems, and introduce complexities for the pipestages, and limit processor speed.

Among other problems, it would be highly desirable to solve problems of how to more efficiently and economically perform branch prediction. These problems need to be solved with respect to CPI (cycles per instruction) efficiency and operating frequency and low power dissipation in superscalar, deeply pipelined microprocessors and other microprocessors.

SUMMARY OF THE INVENTION

Generally, a processor form of the invention has a pipeline including a fetch pipeline having branch prediction circuitry to supply respective predicted taken target addresses for branch instructions, and an execution pipeline having a branch execution circuit. Storage elements and control logic are operable to establish a first-in-first-out (FIFO) circuit with a write pointer and a read pointer. The control logic is responsive to the branch prediction circuitry to write a predicted taken target address to a said storage element identified by the write pointer and the predicted taken target address remains stationary therein. The FIFO circuit bypasses a plurality of pipestages between the branch prediction circuitry and the branch execution circuit, and the control logic is operable to read a predicted taken target address from a storage element identified by the read pointer.

Generally, another form of the invention is a processor for processing instructions, comprising a pipeline having a pipestage with immediate circuitry to supply respective immediates from instructions, and an execution pipeline having an execution pipestage for executing an operation utilizing a said immediate. Storage elements and control logic are operable to establish a first-in-first-out (FIFO) circuit with a write pointer and a read pointer. The control logic is responsive to the immediate circuitry to write a said immediate to a said storage element identified by the write pointer and the immediate remains stationary therein. The FIFO circuit bypasses a plurality of pipestages between the immediate circuitry and the execution pipestage, and the control logic is operable to read an immediate for the execution pipestage from a particular storage element identified by the read pointer.

Generally, another method of operating a processor having a pipeline having pipestages, includes supplying respective predicted taken target addresses for branch instructions, executing branch instructions having targets, and using a FIFO and holding the predicted taken target addresses stationary in the FIFO to bypass the predicted taken target addresses around a plurality of the pipestages for comparison with the targets from the executing of branch instructions.

Other forms of the invention involve wireless communications devices, systems, circuits, devices, branch prediction processes and methods of operation, processes of manufacture, and articles of manufacture, as disclosed and claimed.

BRIEF DESCRIPTION OF THE DRAWINGS

FIG. 9 is a flow diagram of another method embodiment of inventive branch prediction.

Figure 1:
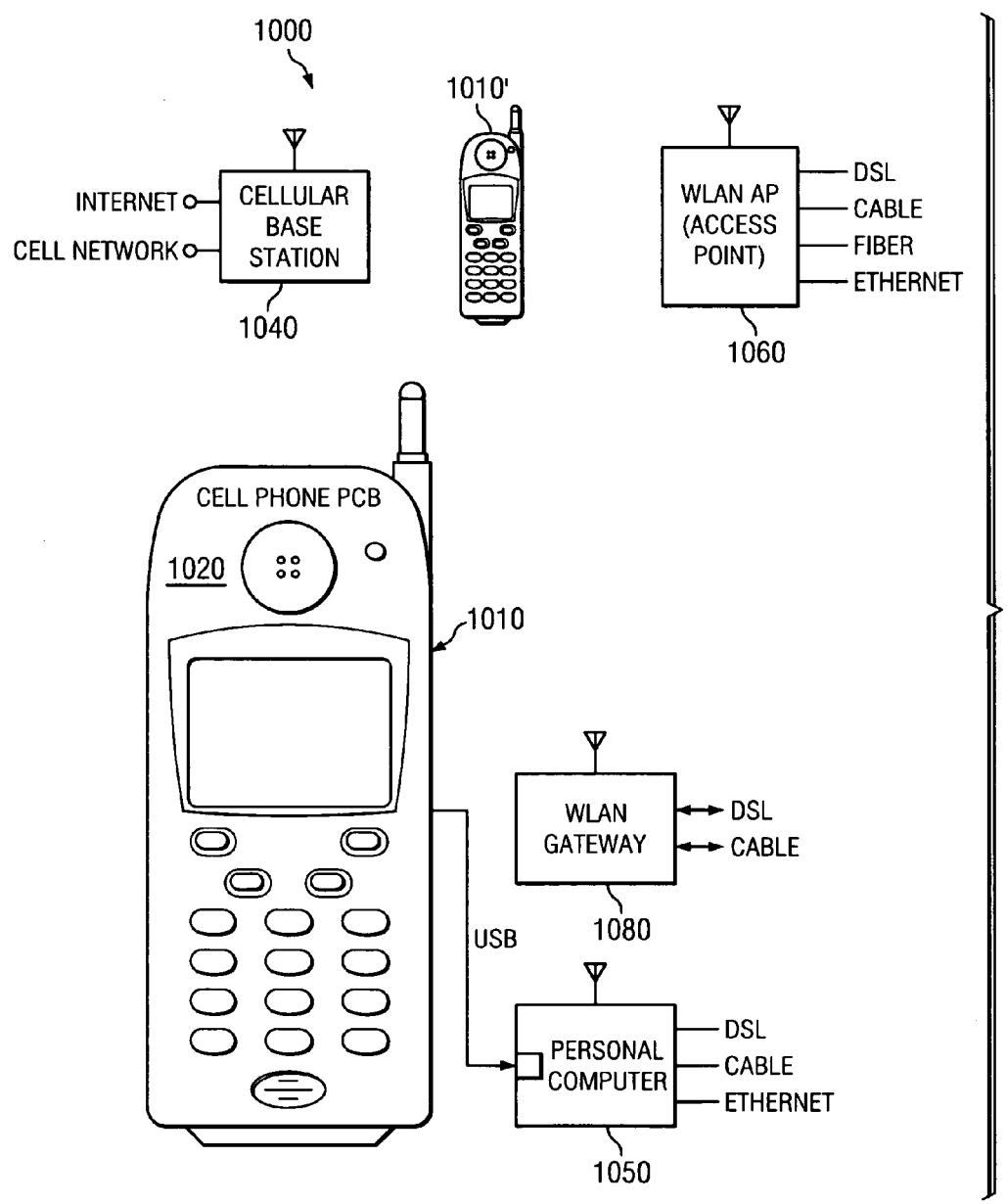
FIG. 1 is a pictorial diagram of a communications system including a cellular base station, two cellular telephone handsets, a WLAN AP (wireless local area network access point), a WLAN gateway, a personal computer (PC), a WLAN station on the PC, and any one, some or all of the foregoing improved according to the invention.

Corresponding numerals ordinarily identify corresponding parts in the various Figures of the drawing except where the context indicates otherwise. A Figure number without a suffix identifies items collectively that have suffixes to that Figure number. A circuit element numeral in a Figure without suffixes, collectively identifies all circuit elements having suffixes to that same numeral. When "x" or "i" or "y" is used in place of an index, it stands for any one value or letter which the index can have.

DETAILED DESCRIPTION OF EMBODIMENTS

In FIG. 1, an improved communications system 1000 has system blocks with increased metrics of features per watt of power dissipation, cycles per watt, features per unit cost of manufacture, and greater throughput of instructions per cycle, among other advantages.

Any or all of the system blocks, such as cellular mobile telephone and data handsets 1010 and 1010', a cellular (telephony and data) base station 1040, a WLAN AP (wireless local area network access point, IEEE 802.11 or otherwise) 1060, a Voice WLAN gateWay 1080 with user voice over packet telephone, and a voice enabled personal computer (PC) 1050 with another user voice over packet telephone, communicate with each other in communications system 1000. Each of the system blocks 1010, 1010', 1040, 1050, 1060, 1080 is provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), and Ethernet wideband network. Cellular base station 1040 two-way communicates with the handsets 1010, 1010', with the Internet, with cellular communications networks and with PSTN (public switched telephone network).

In this way, advanced networking capability for services, software, and content, such as cellular telephony and data, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), and other services accommodate and provide security for secure utilization and entertainment appropriate to the just-listed and other particular applications, while recognizing market demand for different levels of security.

The embodiments, applications and system blocks disclosed herein are suitably implemented in fixed, portable, mobile, automotive, seaborne, and airborne, communications, control, set top box, and other apparatus. The personal computer (PC) is suitably implemented in any form factor such as desktop, laptop, palmtop, organizer, mobile phone handset, PDA personal digital assistant, internet appliance, wearable computer, personal area network, or other type.

Figure 2:
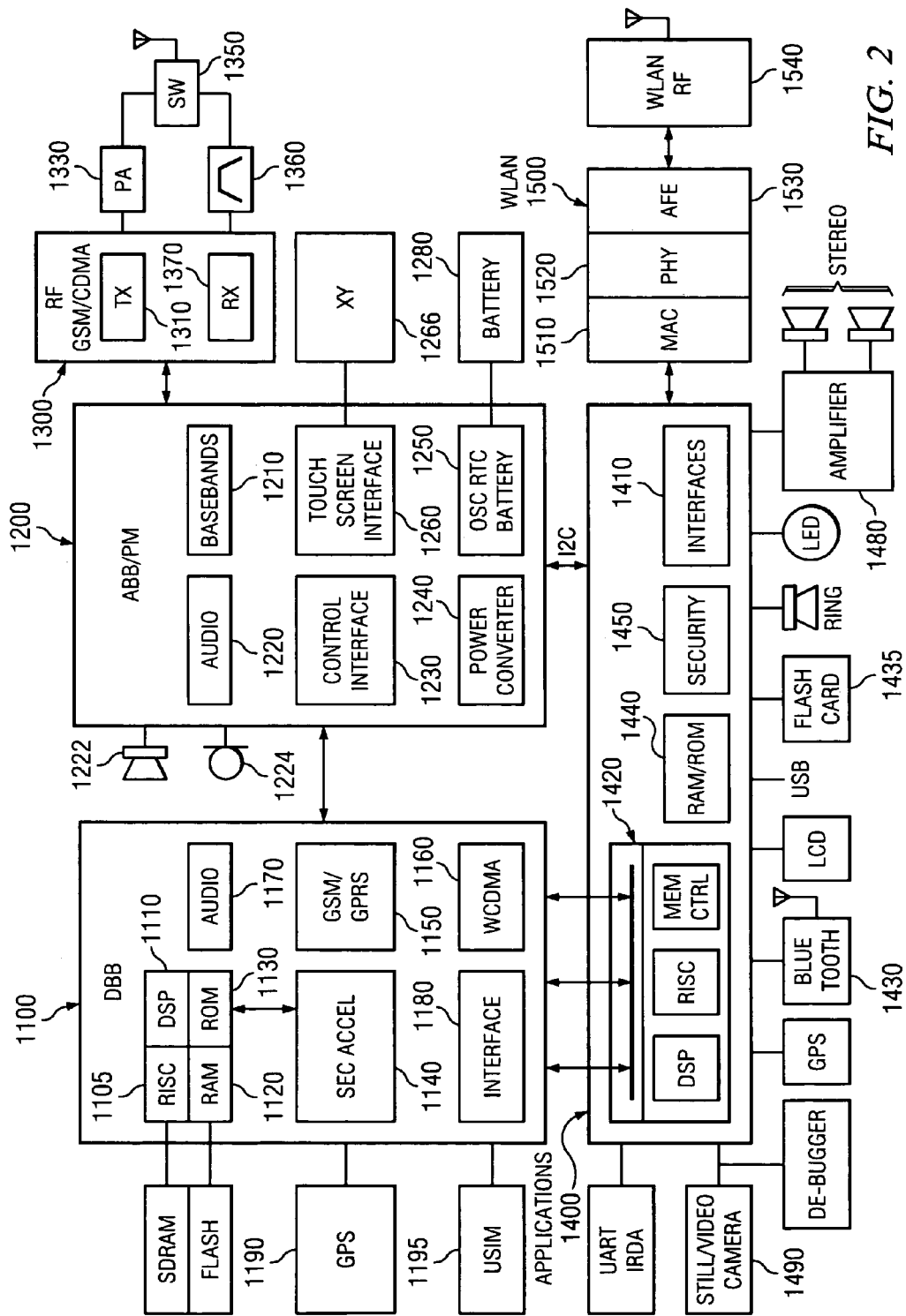
FIG. 2 is a block diagram of an inventive integrated circuit chip with any subset or all of the chip circuits for use in the blocks of the communications system of FIG. 1.

For example, handset 1010 is improved and remains interoperable and able to communicate with all other similarly improved and unimproved system blocks of communications system 1000. On a cell phone printed circuit board (PCB) 1020 in handset 1010, FIGS. 1 and 2 show a processor integrated circuit and a serial interface such as a USB interface connected by a USB line to the personal computer 1050. Reception of software, intercommunication and updating of information are provided between the personal computer 1050 (or other originating sources external to the handset 1010) and the handset 1010. Such intercommunication and updating also occur automatically and/or on request via WLAN, Bluetooth, or other wireless circuitry.

FIG. 2 illustrates inventive integrated circuit chips including chips 1100, 1200, 1300, 1400, 1500 for use in the blocks of the communications system 1000 of FIG. 1. The skilled worker uses and adapts the integrated circuits to the particular parts of the communications system 1000 as appropriate to the functions intended. For conciseness of description, the integrated circuits are described with particular reference to use of all of them in the cellular telephone handsets 1010 and 1010' by way of example.

It is contemplated that the skilled worker uses each of the integrated circuits shown in FIG. 2, or such selection from the complement of blocks therein provided into appropriate other integrated circuit chips, or provided into one single integrated circuit chip, in a manner optimally combined or partitioned between the chips, to the extent needed by any of the applications supported by the cellular telephone base station 1040, personal computer(s) 1650 equipped with WLAN, WLAN access point 1060 and Voice WLAN gateWay 1080, as well as cellular telephones, radios and televisions, fixed and portable entertainment units, routers, pagers, personal digital assistants (PDA), organizers, scanners, faxes, copiers, household appliances, office appliances, combinations thereof, and other application products now known or hereafter devised in which there is desired increased, partitioned or selectively determinable advantages next described.

In FIG. 2, an integrated circuit 1100 includes a digital baseband (DBB) block 1110 that has a RISC processor (such as MIPS core, ARM processor, or other suitable processor) 1105, a digital signal processor (DSP) 1110, communications software and security software for any such processor or core, security accelerators 1140, and a memory controller. The memory controller interfaces the RISC and the DSP to Flash memory and SDRAM (synchronous dynamic random access memory). The memories are improved by any one or more of the processes herein. On chip RAM 1120 and on-chip ROM 1130 also are accessible to the processors 1105 and 1110 for providing sequences of software instructions and data thereto.

Digital circuitry 1150 on integrated circuit 1100 supports and provides wireless interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM transmit/receive chip 1300. Digital circuitry 1150 includes ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA) wireless with or without an HSDPA/HSUPA (High Speed Downlink Packet Access, High Speed Uplink Packet Access) (or 1xEV-DV, 1xEV-DO or 3xEV-DV) data feature via the analog baseband chip 1200 and an RF GSM/CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing.). Block ENC has blocks for uplink and downlink supporting confidentiality processes of WCDMA.

Audio/voice block 1170 supports audio and voice functions and interfacing. Applications interface block 1180 couples the digital baseband 1110 to an applications processor 1400. Also, a serial interface in block 1180 interfaces from parallel digital busses on chip 1100 to USB (Universal Serial Bus) of a PC (personal computer) 1050. The serial interface includes UARTs (universal asynchronous receiver/transmitter circuit) for performing the conversion of data between parallel and serial lines. Chip 1100 is coupled to location-determining circuitry 1190 for GPS (Global Positioning System). Chip 1100 is also coupled to a USIM (UMTS Subscriber Identity Module) 1195 or other SIM for user insertion of an identifying plastic card, or other storage element, or for sensing biometric information to identify the user and activate features.

In FIG. 2, a mixed-signal integrated circuit 1200 includes an analog baseband (ABB) block 1210 for GSM/GPRS/EDGE/UMTS which includes SPI (Serial Port Interface), digital-to-analog/analog-to-digital conversion DAC/ADC block, and RF (radio frequency) Control pertaining to GSM/GPRS/EDGE/UMTS and coupled to RF (GSM etc.) chip 1300. Block 1210 suitably provides an analogous ABB for WCDMA wireless and any associated HSDPA data (or 1xEV-DV, 1xEV-DO or 3xEV-DV data and/or voice) with its respective SPI (Serial Port Interface), digital-to-analog conversion DAC/ADC block, and RF Control pertaining to WCDMA and coupled to RF (WCDMA) chip 1300.

An audio block 1220 has audio I/O (input/output) circuits to a speaker 1222, a microphone 1224, and headphones (not shown). Audio block 1220 is coupled to a voice codec and a stereo DAC (digital to analog converter), which in turn have the signal path coupled to the baseband block 1210 with suitable encryption/decryption activated or not.

A control interface 1230 has a primary host interface (I/F) and a secondary host interface to DBB-related integrated circuit 1100 of FIG. 2 for the respective GSM and WCDMA paths. The integrated circuit 1200 is also interfaced to an I2C port of applications processor chip 1400 of FIG. 2. Control interface 1230 is also coupled via access arbitration circuitry to the interfaces in circuits 1250 and the baseband 1210.

A power conversion block 1240 includes buck voltage conversion circuitry for DC-to-DC conversion, and low-dropout (LDO) voltage regulators for power management/sleep mode of respective parts of the chip regulated by the, LDOs. Power conversion block 1240 provides information to and is responsive to a power control state machine shown between the power conversion block 1240 and circuits 1250.

Circuits 1250 provide oscillator circuitry for clocking chip 1200. The oscillators have frequencies determined by one or more crystals. Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip.

Batteries such as a lithium-ion battery 1280 and backup battery provide power to the system and battery data to circuit 1250 on suitably provided separate lines from the battery pack. When needed, the battery 1280 also receives charging current from a Battery Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine.

In FIG. 2 an RF integrated circuit 1300 includes a GSM/GPRS/EDGE/UMTS/CDMA RF transmitter block 1310 supported by oscillator circuitry with off-chip crystal (not shown). Transmitter block 1310 is fed by baseband block 1210 of chip 1200. Transmitter block 1310 drives a dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA baseband block 1210.

Further in FIG. 2, an integrated circuit chip or core 1400 is provided for applications processing and more off-chip peripherals. Chip (or core) 1400 has interface circuit 1410 including a high-speed WLAN 802.11a/b/g interface coupled to a WLAN chip 1500. Further provided on chip 1400 is an applications processing section 1420 which includes a RISC processor (such as MIPS core, ARM processor, or other suitable processor), a digital signal processor (DSP), and a shared memory controller MEM CTRL with DMA (direct memory access), and a 2D (two-dimensional display) graphic accelerator.

The RISC processor and the DSP have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, the shared memory controller in circuitry 1420 interfaces the RISC processor and the DSP via an on-chip bus to on-chip memory 1440 with RAM and ROM. A 2D graphic accelerator is coupled to frame buffer internal SRAM (static random access memory) in block 1440. A security block

1450 includes secure hardware accelerators having security features and provided for accelerating encryption and decryption of any one or more types known in the art or hereafter devised.

On-chip peripherals and additional interfaces 1410 include UART data interface and MCSI (Multi-Channel Serial Interface) voice wireless interface for an off-chip IEEE 802.15 ("Bluetooth" and high and low rate piconet and personal network communications) wireless circuit 1430. Debug messaging and serial interfacing are also available through the UART. A JTAG emulation interface couples to an off-chip emulator Debugger for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to off-chip Audio codec, a touch-screen controller, and audio amplifier 1480 to stereo speakers. External audio content and touch screen (in/out) and LCD (liquid crystal display) are suitably provided. Additionally, an on-chip USB OTG interface couples to off-chip Host and Client devices. These USB communications are suitably directed outside handset 1010 such as to PC 1050 (personal computer) and/or from PC 1050 to update the handset 1010.

An on-chip UART/IrDA (infrared data) interface in interfaces 1410 couples to off-chip GPS (global positioning system) and Fast IrDA infrared wireless communications device. An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 2, an on-chip LCD controller and associated PWL (Pulse-Width Light) block in interfaces 1410 are coupled to a color LCD display and its LCD light controller off-chip.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

In FIG. 2, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for BARKER coding, CCK, and OFDM. PHY 1520 receives PHY Clocks from a clock generation block supplied with suitable off-chip host clock, such as at 13, 16.8, 19.2, 26, or 38.4 MHz. These clocks are compatible with cell phone systems and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifier and has low noise amplifier LNA in the receive path. Bandpass filtering couples WLAN RF 1540 to a WLAN antenna. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 2. Still other additional wireless interfaces such as for wideband wireless such as IEEE 802.16 "WiMAX" mesh networking and other standards are suitably provided and coupled to the applications processor integrated circuit 1400 and other processors in the system.

Branch prediction-based architectural and methods as taught herein remarkably improve any one or more of the processors and systems hereinabove and such other processor and system technologies now or in the future to which such improvements commend their use.

To solve problems as noted herein, inventive branch prediction and execution are provided. The inventive circuitry is relatively robust when the number of pipelines increases and when the number of execution pipeline stages in various one or more of the pipelines increases. The branch prediction method and circuitry operate at advantageously high frequency and low power dissipation for high overall performance of various types of microprocessors.

Figure 3:
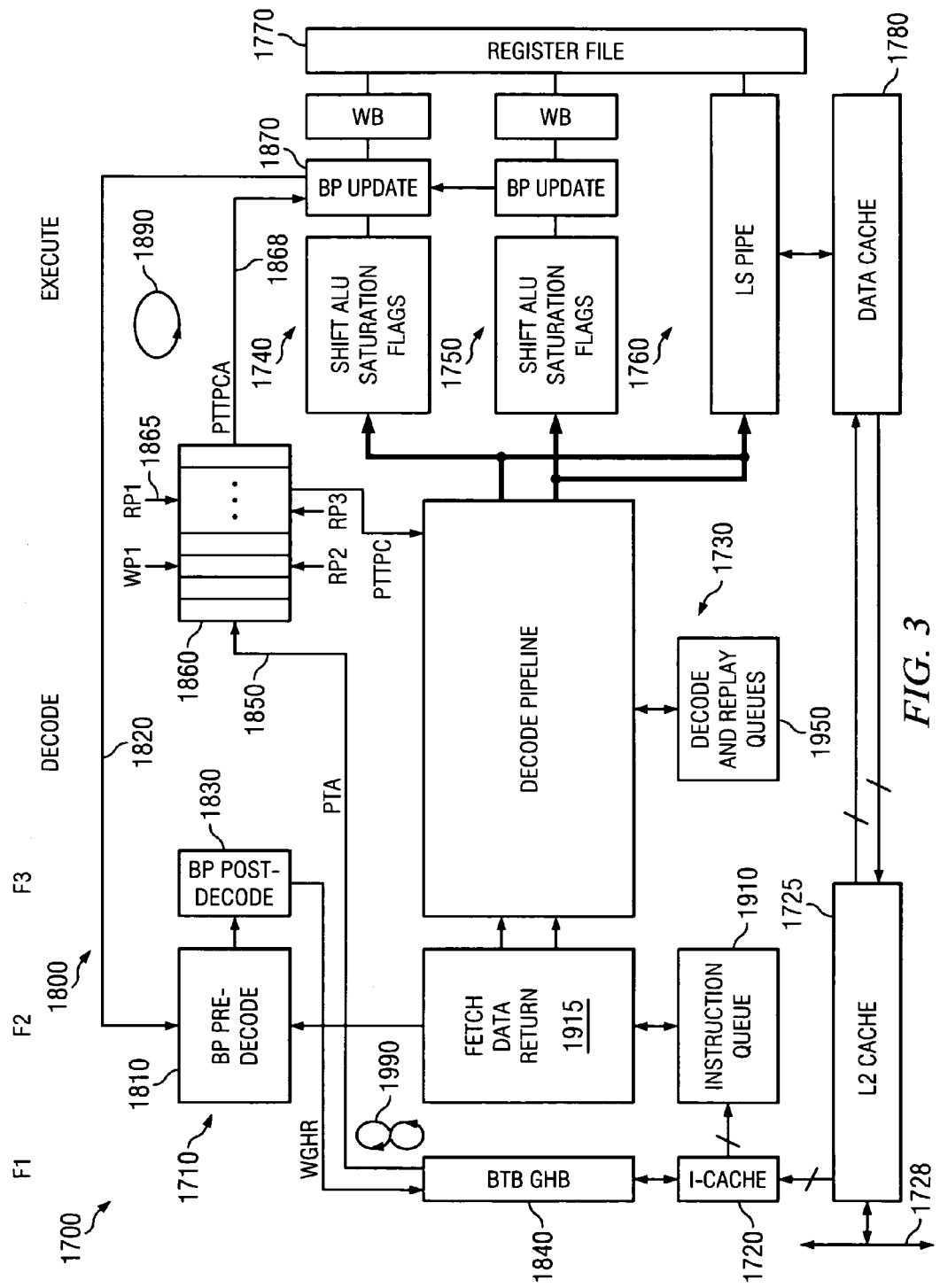
FIG. 3 is a block diagram of an improved processor of the invention for use in the integrated circuits of FIG. 2 and includes a pipeline diagram of inventive circuitry and coupled structures including pipelined precise branch prediction circuit blocks at fetch stages, message passing bus back from an execute stage, and pointer-based FIFO 1860 communicating predicted target addresses to execute stage.

Turning to FIG. 3, an inventive microprocessor 1700 has a fetch pipe 1710 obtaining instructions from one or more caches such as a level one (L1) instruction cache (Icache) 1720 and a level two (L2) instruction and data cache 1725 coupled to a system bus 1728.

Fetched instructions from the fetch pipe 1710 are passed to an instruction decode pipe 1730. Instruction decode pipe 1730 aligns, decodes, schedules and issues instructions at appropriate times defined by clock cycles. Fetch pipe 1710 and instruction decode pipe 1730 suitably each have one or more pipestages in them depending on the clock frequency and performance requirements of the application.

Zero, one or two instructions are issued in any given clock cycle in this embodiment, and more than two instructions are issued in other embodiments. Instruction decode Pipe 1730 in this embodiment issues an instruction I0 to a first execute pipe Pipe0 1740, and may issue a second instruction I1 to a second execute pipe Pipe1 1750. Instructions are suitably also issued to a Load-Store (LS) pipeline 1760. Prior to issue, instructions I0 and I1 are called candidate instructions, herein.

Pipe0 1740, Pipe1 1750 and LS pipeline 1760 write results to a register file 1770 and each have execute pipestages as illustrated. The pipelines 1740, 1750, 1760 suitably are provided with more, fewer, or unequal numbers of pipestages depending on the clock frequency and performance requirements of particular architectures and applications. Further pipelines are suitably added in parallel with or appended to particular pipelines or pipestages therein in various embodiments.

This embodiment features in order execution with an Execute unit having two execute pipelines. At least one program counter PC suitably keeps track of the instructions. The Execute unit takes into account the number of issued instructions, the instruction length and taken branch prediction, and calculates for and writes to the program counter PC, such as a register in register file 1770.

Decode pipe 1730 issues instructions to the LS pipe 1760 for load and/or store operations on a data cache 1780 for either unified memory or memory specifically reserved for data. Data cache 1780 is bidirectionally coupled to the L2 cache 1725.

Fetch pipeline 1710 has improved special branch prediction (BP) circuitry 1800 that includes a remarkable fine-grained branch prediction (BP) decoder including a BP Pre-Decode section 1810 coupled by a special message bus 1820 providing branch resolution feedback from the improved execute pipelines 1740 and 1750. BP Pre-Decode section 1810 supplies pre-decoded branch information to a BP Post-Decode section 1830 in at least one succeeding hidden pipestage F3.

BP Post-Decode Section 1830 supplies highly accurate speculative branch history wGHR bits to a hybrid branch prediction unit 1840 including a Global History Buffer (GHB) to supply highly accurate Taken/Not-Taken branch predictions. Hybrid branch prediction unit 1840 also includes a Branch Target Buffer (BTB) to supply Taken branch addresses. Unit 1840 supplies predicted branch target addresses PTA to a special low power pointer-based FIFO unit 1860 having pointers 1865. Low power pointer-based FIFO unit 1860 supplies predicted taken target PC addresses PTTPCA on a bus 1868 as a feed-forward mechanism to branch resolution (BP Update) circuitry 1870 in Pipeline 1740 and PTTPC to address calculation circuitry 1880 in decode pipeline 1730. BP Update circuits in each of Pipelines 1740 and 1750 are coupled to each other and to the feedback message-passing bus 1820 for branch resolution purposes.

In FIG. 3, in this way, a remarkable branch prediction feedback loop 1890 is completed to include units and lines 1810, 1830, 1840, 1850, 1860, 1868, 1870, 1820. Fine-grained decoding 1810, 1830 excites branch prediction 1840 that feeds-forward information to BP Update circuitry 1870 which then swiftly feeds-back branch resolution information to even further improve the supply of wGHR bits from block 1830 to branch prediction 1840.

Branch prediction block 1840 is coupled to instruction cache Icache 1720 where a predicted Target Address TA is used for reading the Icache 1720 to obtain a next cache line having candidate instructions for the instruction stream. The Icache 1720 supplies candidate instructions to an Instruction Queue (IQ) 1910 and also to BP Pre-Decode 1810. A Fetch Data Return block 1915 also couples instructions from Icache 1720 to BP Pre-Decode 1810, and couples instructions from Instruction Queue 1910 to the beginning of the decode pipeline 1730.

Decode pipeline 1730 aligns instructions, which can carry over from one cache line to another, decodes the instructions, and schedules and issues these instructions to pipelines 1740, 1750, 1760. An example of instruction scheduling and issuing and execution data forwarding is further described in U.S. patent application Ser. No. 11/133,870 (TI-38176), filed May 18, 2005, titled "Processes, Circuits, Devices, And Systems For Scoreboard And Other Processor Improvements," which is hereby incorporated herein by reference. A decode and replay queues block 1950 is coupled to the decode pipeline 1730 to handle cache misses, pipeline flushes, interrupt and exception handling and such other exceptional circumstances as are appropriately handled there.

Further in FIG. 3, issued instructions are executed as appropriate in the pipelines 1740, 1750 and 1760. In each of the pipelines Pipe0 1740 and Pipe1 1750, circuitry and operations are provided for shifting, ALU (arithmetic and logic), saturation and flags generation. BP Update 1870 is provided. Writeback WB is coupled to Register File 1770. Multiply-accumulate MAC stages are also suitably provided in some embodiments for providing additional digital signal processing and other functionality. LS pipeline 1760 performs address generation and load-store operations.

Figure 4A:
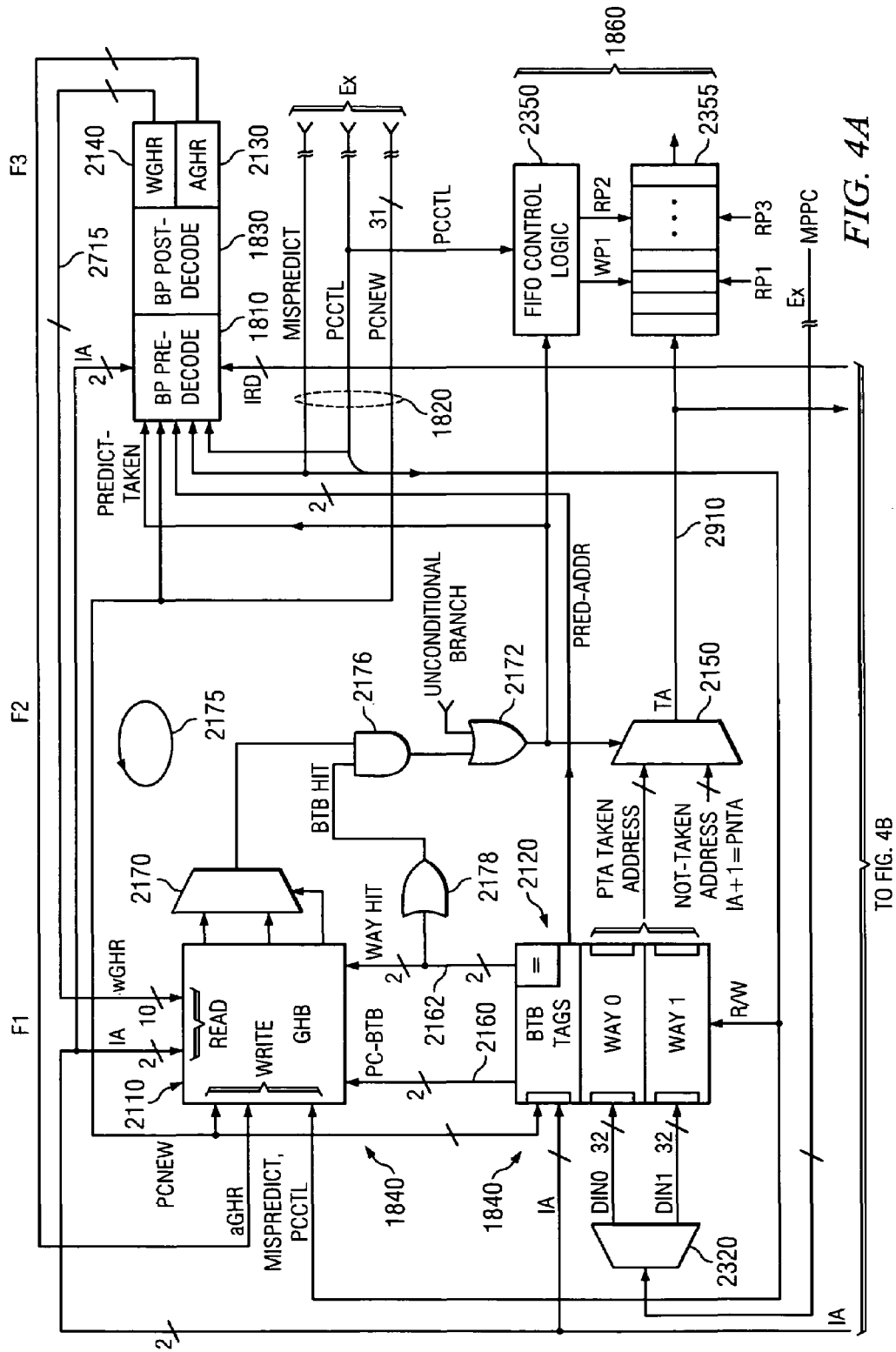
FIGS. 4A and 4B are upper and lower portions of a partially-block, partially schematic diagram of inventive branch prediction circuitry, pointer-based FIFO and instruction cache.
Figure 4B:
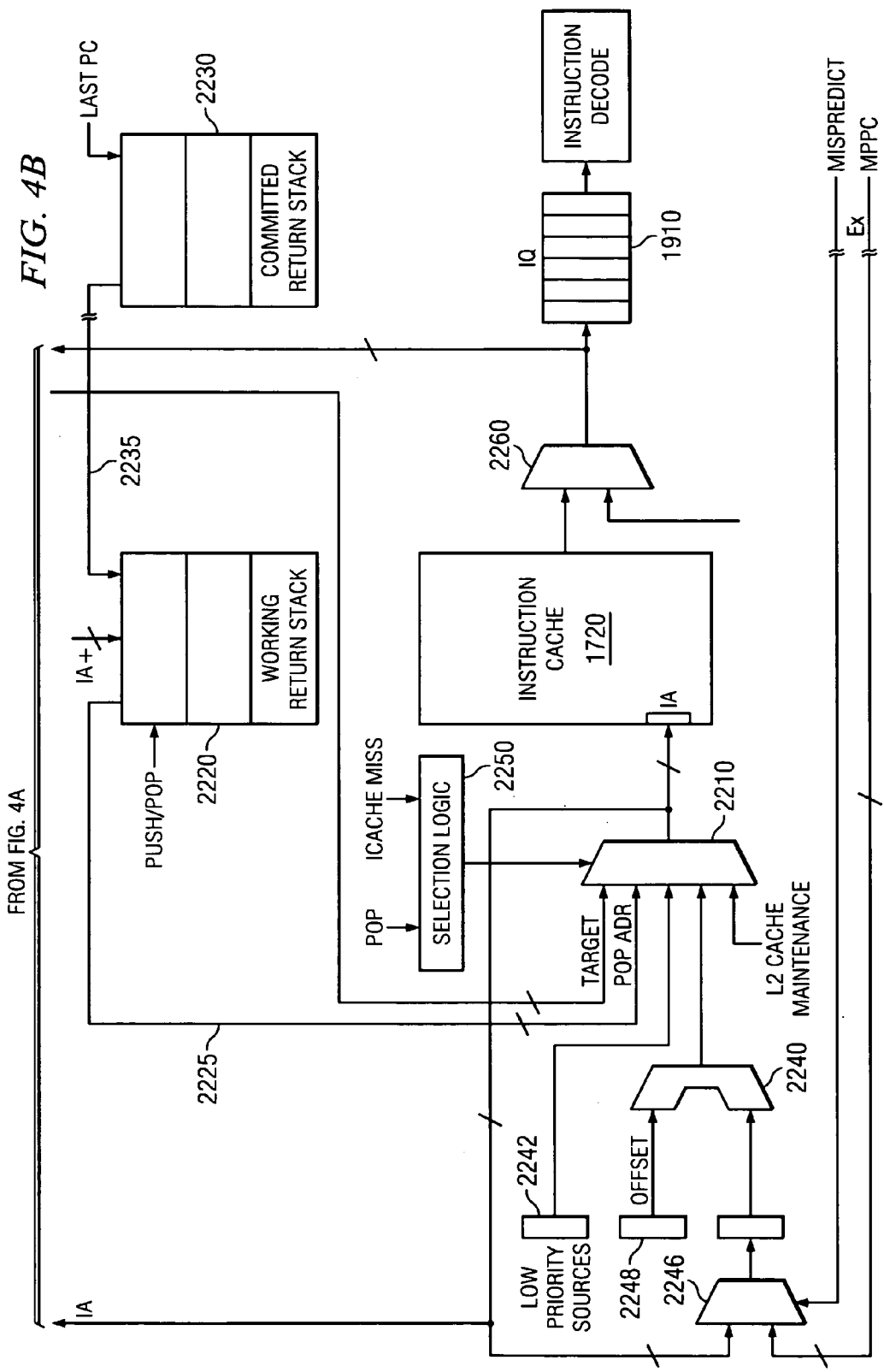

Discussion now turns to the combined FIGS. 4A and 4B. FIG. 4A shows a detail of particular FIG. 3 blocks and interconnections for Pre-Decode 1810, Post-Decode 1830, and block 1840 with a Global History Buffer GHB 2110 and a Branch Target Buffer BTB 2120. FIG. 4B shows Instruction Cache Icache 1720 and associated circuitry interconnected with the circuitry of FIG. 4A.

In FIG. 4A, global history buffer GHB 2110 has indexed entries that represent a branch prediction to take a branch or not-take the branch. A series of bits representing a history or series of actual taken branches and not-taken branches in the past is used as an index to the GHB 2110 entries. An entry is read-accessed by asserting as the index a particular currently predicted pattern of branches. With each cache linen, that currently-predicted pattern of branches may change and index to a different entry in the GHB 2110.

A series of the index bits for GHB write represents a current history of branches. Suppose that all the address predictions were staged down the pipeline pipestage-by-pipestage down to the execute pipestage where the branch instruction is actually executed, and then the differences between predicted history and actual history from execute pipestage were successively resolved at the execute pipestage. That way, the predicted history would be present for resolution with the generation or actual execution of each branch instruction. Unfortunately, every time a processor would stage the prediction history by moving the predicted history bits from one pipestage to the next pipestage, additional power is undesirably dissipated since the predicted history bits are not actually utilized until they reach the execute pipestage to which they are transferred. Furthermore, the undesirable power dissipation would be exacerbated as pipestages are added to processor architectures to accommodate higher and higher clock speeds.

Another type of approach might do an imprecise branch decoding of an entire cache line to determine if it has any branch or not. Such approach would fear complexity of full decode and speed paths for branch prediction. However, compromising by means of this imprecise decode would result in missing the detection of branch instructions with the net effect of increasing the branch mis-prediction rate and therefore reducing overall performance.

Attempting to employ for branch prediction certain instruction decoder circuitry that exists later in the pipeline in an instruction decode pipe is likewise unappealing since full instruction decode in the decode pipeline is commonly a speed-critical operation. Increasing the complexity of that instruction decoder circuitry in the decode pipeline for branch prediction seems destined to introduce speed critical paths rather than solve the problems posed by speed-critical paths.

Furthermore, performing branch decode for branch prediction purposes in the instruction decoder circuitry situated later in the pipeline in the instruction decode pipe also would negatively affect branch prediction accuracy since the instruction decode operations are later in the pipeline than the instruction fetch stage.

Problems that need to be overcome include substantial undesirable power consumption, reductions in branch prediction accuracy through imprecise branch detection, and speed critical paths in the logic that updates the predicted values with actual executed branch information when a mis-prediction occurs.

Consider a processor where the instruction cache line is wider than any instruction. There, multiple instructions appear on the instruction cache line in actual fetch. If decode logic were to simply detect a branch somewhere on the cache line, then when multiple branch instructions occur on the same cache line, the information to update and access the global history buffer (GHB) becomes imprecise. That means that the branch predictions for different actual branch patterns become confused or accumulated together in the process of updating the GHB. This degrades the accuracy of the branch predictions in the GHB when it is accessed to predict each new branch. Furthermore, in high speed, highly pipelined processors, the number of pipeline stages, and power and real estate are all at a premium.

Among other improvements described herein, staging of predicted branch history bit patterns through pipestages with attendant undesirable power dissipation is eliminated. Instead, branch history patterns are all maintained up front in the pipeline. The branch history pattern is maintained in two versions—first, an actual branch history of Taken or Not-Taken branches is determined from actual execution of each branch instruction in an execution pipestage far down the pipeline. This actual branch history is maintained in what is called herein an architectural global history register aGHR 2130 and updated by fast message-passing on lines 1820 from the execution pipestage 1870.

Second, a predicted, or speculative, branch history pattern has some actual branch history concatenated with bits of predicted branch history. This predicted branch history pattern is maintained in what is called herein a working global history register wGHR 2140.

These two branch history patterns are kept coherent in case of a mis-prediction. Advantageously, message-passing lines 1820 act as a bus that links or feeds back the actual branch history information, determined far down the pipeline in an execution pipestage such as 1870 of FIG. 3, to the circuitry 1810, 1830 that is operating up front in the fetch pipeline. This improvement saves power and facilitates the fine-grained full cache-line branch prediction advantages next described.

Power is saved in fetch by making the instruction cache line from Icache 1720 wider than any instruction. This approach also improves real-estate and instruction processing efficiency in retrieving the instructions. Here, the advantages of a wide cache line are combined with circuitry that provides improved high branch prediction accuracy without need of lengthening the pipeline in a high speed processor such as shown in FIGS. 3 and 2. Moreover, the improvements are applicable to a wide variety of different architecture types in processors having single and multiple pipelines of varying lengths.

The branch prediction decode logic 1810, 1830 not only detects a branch somewhere on the cache line, but also advantageously provides additional decode logic to identify precisely where every branch instruction on a cache line is found and how many branch instructions there are. Thus, when multiple branch instructions occur on the same cache line, the information to access the GHB 2110 is now made far more precise. The mosaic of branch histories are no longer confused and accumulated in the process by which branch predictions are used to access the GHB 2110. A tight figure-eight shaped BP feedback loop 1990 in FIG. 3 couples units 1810, 1830, 1840, 1720, 1810. In this way speed paths are avoided and branch prediction accuracy is further increased.

The process of loading the GHB 2110 with branch predictions learned from actual branch history speedily message-passed from the execution pipe also progressively improves the branch predictions then subsequently accessed from the GHB 2110. The additional decode logic (e.g., Post-Decode 1830) takes time to operate, but that is not a problem because at least some embodiments herein additionally run the additional decode logic as an addition to an existing pipestage and when needed, across at least one clock boundary in parallel with one or more subsequent pipestage(s) such as a first decode pipestage. This hides the additional decode logic in the sense that the number of pipeline stages is not increased, i.e. the pipeline of the processor as a whole is not increased in length. For example Post-Decode 1830 amounts to an additional fetch pipestage(s) parallelized with the initial pipestage(s) of the decode pipeline.

Notice that a record of actual branch history in aGHR 2130 is constructed by message-passing on bus 1820 to a fetch stage from the architecturally unfolding branch events detected down in the execute pipe such as at stage 1870. The aGHR 2130 is maintained close to or in the same fetch pipestage as the speculative GHR (or working GHR) wGHR 2140. The actual branch history is thus conveyed to a fetch stage up front in the pipe quickly from an execute pipestage 1870 farther down in the pipeline. In this way, on a branch prediction, the improved circuitry 1810, 1820, 1830 eliminates power consumption and clock cycles involved in staging the predicted branch history wGHR down to the branch execute pipestage.

This special logic 1810, 1830 situated in fetch and/or decode logic areas confers important processing efficiency, real-estate efficiency and power-reduction advantages. Consequently, what happens in instruction execution in the execute pipe is tracked up front in the pipeline thanks to the message-passing structure 1820. Up front, one or more pipestages 1810, 1830 of fine-grained wide-cache-line instruction decoding are advantageously implemented in parallel with conventional pipestages and thus hidden in fetch or decode cycles or both.

A first problem has involved first recognizing the need for fine-grained decode circuitry for supporting branch prediction, not to mention then how to provide that circuitry in fetch without lengthening the overall processor pipeline since the fetch pipeline might be lengthened. Unless one has a way of solving a second problem of quickly resolving the architectural branch history with the working branch history pattern of bits, the existence of the possibility of successfully confronting the first problem is not apparent. The solution of either problem is a key to solving the complementary problem. So, not only is each problem in isolation a challenge, but also each problem has impeded the solution of the other in a "chicken and egg" manner until now.

Being able to add this fine-grained decode logic and hiding it, is made possible by introducing the above-mentioned message passing bus that links the execute pipestage actual branch information back to the fetch pipe where the decode logic can be feasibly implemented and hidden. In other words, the message-passing bus not only saves power by eliminating staging of predicted branch history but also makes it possible in the first place to even consider, and indeed introduce as here, fine-grained full-cache-line decoding. Fine-grained decoding is advantageously hidden up front in the pipeline to improve predicted branch history patterns while coordinating the predicted branch history when necessary with the actual branch history thus message-passed back from the execute pipestage.

In summary, at least some of embodiments implement one or more of the following solution aspects. 1) Introduce fine-grained branch instruction decode in a fetch stage, parallel to an instruction queue, for instance. 2) Precise decode in a fetch stage can now be pipelined since it occurs early in the fetch/decode/execute sequence. 3) Implement a low overhead message passing protocol between the execute stage and the fetch branch decode stage thus introduced, to allow the branch prediction logic itself to reconstruct the execute behavior of predicted branches. 4) Synchronize updates of the actual global history register aGHR 2130 and the working global history register wGHR 2140, both in a fetch stage, regardless of the length of the pipeline between the fetch stage and the execute stage.

Advantages include eliminating staging of wGHR 2140 values along with instructions down the entire length of the machine pipeline to the execute stage to attempt resolution of branch prediction versus execute behavior. Instead, the approach herein advantageously establishes both the wGHR 2140 and aGHR 2130 locally up front in the fetch part of the pipeline, and uses a message passing bus 1820 to avoid pipelining the wGHR values to the execute stage. Up front, the branch execute history of aGHR 2130 is resolved against the predicted branch behavior held in wGHR 2140. Precise branch instruction decoding herein increases prediction rates and performance relative to an imprecise branch decode mechanism, while still avoiding speed critical paths.

Figure 5:
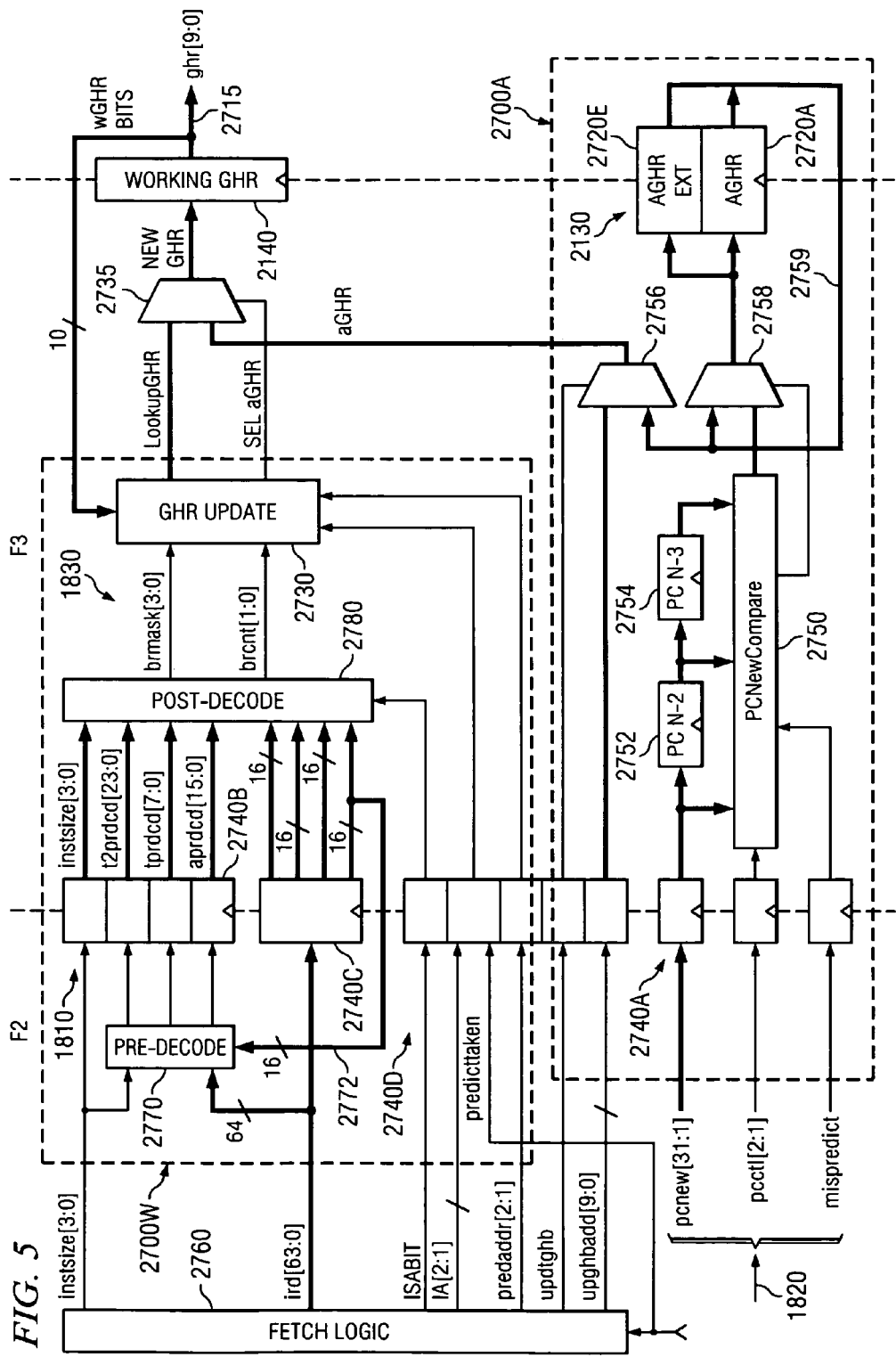
FIG. 5 is a partially-schematic, partially-block diagram further detailing inventive branch decoding and prediction circuitry of FIG. 4A including a working global history register wGHR for predictions, and an architectural global history register aGHR for actual branch history.

Thus, among the advantages are reduction or elimination of speed critical paths in the branch detection decode of circuits 1810, 1830, and greatly simplified aGHR and wGHR synchronization logic of FIG. 5. Branch prediction rate and accuracy are increased through early detection of branches (in the fetch stage) and precise detection of branches, and more comprehensive information therefrom, resulting in improved overall processor and system performance. Power and area are reduced through avoidance of staging or pipelining of the wGHR down to the execute pipestage where a branch is executed, and thereby eliminating the flops required for such staging and their associated wiring and clock buffers.

Indeed, by implementing precise branch decodes in the fetch stage, speed critical paths are avoided in the instruction decode stage which can already be prone to speed critical paths due to the relative lateness of operation that doing precise branch decodes could introduce in the instruction decode stage if used for branch prediction purposes. Advantageously, there is no need to compromise with imprecise branch instruction decoding, nor any need to limit overall machine clock speed. These tradeoffs are obviated by various embodiments herein so that precise branch instruction decoding occurs while machine clock speed is increased.

Advantageously, in high speed, highly pipelined processors and other processors, the number of pipeline stages is not increased even though performance is improved by the improvements to process and circuitry herein. Power and real estate are thereby saved because pipeline stages are not increased. Because branch prediction accuracy is improved, fewer pipeline flushes occur. Systems improved as taught herein work better because features and applications software and hardware execute faster. Thus, more features and applications as well are suitably introduced to run concurrently on the same system. Even in machines where the cache line is no wider than one instruction, power is saved and performance is improved by message-passing from an execution pipestage to the fetch unit up front to resolve predicted and actual branches.

Part of the new architecture described later herein below in FIG. 5 uses both pipelined GHR global history registers update circuitry at least partially parallelized with pipelined fine-grained decode circuitry to reduce or eliminate speed paths in the instruction decode logic that might otherwise occur. The predicted wGHR and actual aGHR branch histories are kept in synchronism during mis-prediction events by the message-passing circuitry driving information from the execute stage(s) of the pipeline(s) upstream to the fetch stage(s) of the pipe. Regardless of cache line width, the message-passing approach eliminates the power consumed and the chip real estate area that would otherwise be consumed by pipelining of the branch prediction data from instruction fetch stage all the way to the execute stage.

Thus, improved GHR (Global History Register) logic includes circuitry whereby the instruction fetch unit in aGHR reconstructs the architectural state (the actual branch history that has occurred in branch execution) through the message passing circuitry coupling the downstream execution stage and the upstream instruction fetch stage. In conjunction and parallelized with the reconstruction circuitry, the branch prediction logic compactly can add a hidden pipestage for fine-grained decode of branch instructions, permitting a precise decode of the entire instruction cache line. More precise decode results in increased branch detection and therefore a significant reduction in branch mis-prediction events, improving overall performance of the processor.

By pipelining the precise fine-grained decode process, speedpaths are reduced by allowing multiple cycles (e.g., two) for performing the instruction fetch data branch detection decode required for the wGHR 2140 speculative or predicted branch history update. By also pipelining the aGHR 2130 (actual branch history) logic, the complexity of the logic required to keep both aGHR 2130 and wGHR 2140 in synchronism on mis-prediction is greatly reduced.

In FIG. 4A, part of the decode Pre-Decode 1810 is done in F2 pipestage, and the bulk of the decode is done in Post-Decode 1830 in the hidden F3 pipestage. Fetch pipestage F3 is parallelized with a first decode pipestage. The rest of the instruction fetch unit thereby advantageously supplies the instruction stream.

Among other advantages of various ones of the embodiments, numerous different kinds of pipelines accommodate the improvements. Pipelines for in-order execution with any of single-issue, two-issue, and multiple issue architectures are improved as described herein. Out-of-order instruction issue architectures are suitably improved by the message-passing bus, wherein a tag generation circuit for tagging the instruction is coupled via the message passing bus to pass the tag to the fetch unit.

Branch prediction has a Branch Target Buffer BTB 2120 and Global History Buffer GHB 2110 with the following features in some embodiments:

Bimodal branch prediction.

Basic block concept, using branch target (instead of branch address) as input address to read BTB 2120 and GHB 2110. The index is hashed with the last few branch directions (global branch prediction).

Branch prediction is independent with Icache 1720, accessing ahead of Icache, and shuts down when waiting for Icache.

One (1) bubble for short basic block.

In FIG. 4A, a two-cycle branch prediction loop has a branch target buffer (BTB 2120) and a global branch history buffer (GHB 2110). The BTB 2120 is implemented as cache array with tag compare and fetching of a predicted taken target address PTA. The GHB 2110 is an array that is read by an index comprising speculative branch history bits supplied by wGHR 2140.

In FIG. 4B, the target address TA from branch prediction in FIG. 4A is coupled to the instruction cache 1720. Branch predictions from GHB 2110 and BTB 2120 are accessed every clock cycle along with access of instruction cache 1720. The branch prediction is pipelined across two clock cycles. If an instruction cache line is predicted by wGHR 2140 accessing GHB 2110 to have a taken branch, then each sequentially subsequent instruction on the current instruction cache line is ignored or cancelled. In this embodiment, power consumed in fetching is consumed on every taken branch prediction. For further power minimization, the instruction cache 1720 suitably has logic to disable read of a tag array in Icache 1720 when the sequential address is within the cache line size corresponding to the granularity of a tag.

In FIG. 4A, the BTB 2120 and GHB 2110 are supplied with MSB and LSB Instruction Address IA lines respectively. BTB 2120 associatively retrieves and supplies a Predicted Taken Address PTA and supplies it to a Mux 2150. Concurrently with retrieval of the PTA, BTB 2120 outputs branch prediction relevant information on a set of lines 2160 coupled to the GHB 2110 to facilitate operations of the GHB 2110. Lines 2160 include two way-hit lines 2162, and lines for PC-BTB[2:1] from each of Way0 and Way1.

Mux 2170 supplies a global branch prediction direction bit of Taken or Not-Taken at the output of Mux 2170. An OR-gate 2172 couples the global prediction Taken/Not-Taken as a selector control PREDICTTAKEN to a Mux 2150. Mux 2150 selects a corresponding Target Address as a Predicted Taken Address PTA if the prediction is Taken, or a Predicted Not-Taken Address (sequential, incremented IA+1) PNTA at output of Mux 2150 if the prediction output PREDICTTAKEN from OR-gate 2172 is Not-Taken.

OR-gate 2172 also supplies a PREDICTTAKEN output to BP Pre-Decode block 1810 to complete a loop 2175 of blocks 1810, 1830, wGHR 2140, GHB 2110 and logic via OR-gate 2172 back to block 1810. If the branch instruction is an unconditional branch, a BTB 2120 output line for an Unconditional Branch bit in a retrieved entry from BTB 2120 is fed to OR-gate 2172 to force a predicted Taken output from the OR-gate 2172.

OR-gate 2172 has a second input fed by an AND-gate 2176. AND-gate 2176 has a first input fed by the output of Mux 2170 with the global prediction of GHB 2110. AND-gate 2176 has a second input fed by an OR-gate 2178. OR-gate 2178 has two inputs respectively coupled to the two Way Hit lines 2162. If there is a way hit in either Way 0 or Way 1 of BTB 2120, then the output of OR-gate 2178 is active and qualifies AND gate 2176. The Taken or Not-Taken prediction from GHB output Mux 2170 passes via AND-gate 2176 and OR-gate 2172 as the signal PREDICTTAKEN to block 1810.

In FIG. 4A, the just-described AND-OR logic generates PREDICTTAKEN. The logic has an input fed by the Taken/Not-Taken output from Global History Buffer Mux 2170. Another input from BTB 2120 to this logic circuit can override the prediction from GHB 2110 in this embodiment in the following circumstances. First, if there is a BTB miss (signal BTBHIT low), meaning no valid predicted branch instruction in BTB 2120, then PREDICTTAKEN output from AND-gate 2176 is kept inactive even though the Taken/Not-Taken output from Mux 2170 is active. Second, the BTB 2120 keeps track of the branch type, so that with an unconditional branch, the prediction is taken (PREDICTTAKEN is active from OR-gate 2172) regardless of the GHB 2110 Taken/Not-Taken prediction.

As noted above, if instruction address IA does not match a tag for any branch target in the BTB 2120, then the signal PREDICTTAKEN is Not Taken or inactive. Thus, a taken prediction (PREDICTTAKEN active) in this embodiment involves the BTB 2120 having a target address PTA for some branch instruction in the cache line. Since the target address is suitably calculated at execution time in this embodiment, BTB 2120 does not contain the target of a branch until a branch instruction goes through the pipeline at least once. In the first nine branches of a software program in this embodiment, the circuitry defaults to the Not-Taken prediction, since a part of the branch history does not exist for purposes of accessing GHB 2110 and the BTB entries are just beginning to build up. Note that other approaches currently existing or yet to be devised for branch prediction in those first branches (e.g. the nine first branches) are also suitably used in conjunction with the improvements described herein.

In FIG. 4A, the BTB 2120 is two-way set associative. BTB 2120 address path includes row decoding and row drive, bit drive and output circuitry, and tag compare to generate respective way hit signals for each of the two ways on lines 2162. A way hit signal from a given way supplies Target and Branch Type. Branch Type information is used as a PUSH/POP selector control for Mux 2210 in FIG. 4B to select between BTB target and return stack (POP ADR in FIG. 4B) to determine an address to access the instruction cache 1720 via Mux 2210.

In FIG. 4A, the Branch Target Buffer BTB 2120 provides fast access to taken-branch addresses. The BTB 2120 has the following contents as tabulated in TABLE 1:

TABLE 1

BRANCH TARGET BUFFER ENTRY CONTENTS

| Contents | Description |
| --- | --- |
| Target | Predicted Target Address PTA to use in fetching Target Instruction from Instr. Cache |
| Tag | Tag to compare against, includes PC-BTB |
| Target Mode | Instruction set 1SA of the target instruction |
| Page Cross | Whether branch and target instruction are not in same memory page |
| Unconditional Branch Type | Ignore prediction from GHB 2110 Direct, Call, Return |
| Valid | BTB entry is valid |

In FIG. 4A, the BTB 2120 is a content addressable array accessed by instruction fetch virtual addresses IA. These addresses designated "IA" are the current instruction address value that points to the current instruction for fetch purposes. BTB 2120 has two Ways having one tag per Way. Each tag has the same MSBs as the other tag if both Ways hold an entry. The MSBs of an address IA match the MSBs of the one or two tags when a BTB hit is said to occur. The LSBs of the tags may not match the address IA, and those LSBs provide important instruction position information on the cache line called PC-BTB herein. Thus, the two ways associatively store entries of TABLE 1 for as many as two respective Taken-branch instructions situated on the same cache line.

A glossary of branch related terms is tabulated in TABLE 2.

TABLE 2

GLOSSARY OF BRANCH-RELATED TERMS

| LEGEND | NAME | REMARKS |
| --- | --- | --- |
| IA | Instruction Address | Address used for I-Cache read |
| IA + 1 | Predicted Not-Taken | Next cache line address to fetch in program order |
| IA[2:1] | Initial Position | Initial position of entering onto a cache line. Lower addresses than IA[2:1] on the cache line are ignored, if any. |
| PC | Program Counter of Executed Instruction | PC holds the address of the instruction that is executed and committed to the machine state. |
| PCNEW | | Contents of PC passed back to fetch stage |
| IRD | Instructions Read | Cache line of Instructions that are concurrently read out of I-Cache. (IRD is not an address. IRD is instructions.) |
| BT | Branch Target | An instruction to execute next after a branch instruction when the branch operation represented by the branch instruction is Taken. |
| PC-BTB | | Tag address in BTB has LSBs pointing to a position of a Taken branch instruction on a cache line. Instruction Address IA MSBs identify address of the cache line itself.. |
| Branch | Branch | Branch for the present purposes is any data move to the PC as contrasted with simply sequencing the PC to the next instruction in program order sequentially. |
| BTB | Branch Target Buffer | Cache of Predicted-Taken Addresses (PTAs) accessed associatively by Instruction Address IA MSBs. BTB accesses PC-BTB, PTA, and Unconditional and Type information. |
| MPPC | Mis-Predicted PC Address | Actual target address sent from execution stage back to instruction fetch stage for updating BTB entry. |
| ATA | Actual Target Address | Address determined by actual execution of a branch instruction when actually taken. |
| MISPREDICT | Mis-prediction Signal | Mis-prediction has four categories: 1) target mismatch of predicted taken address from FIFO with actual target address ATA from actual branch execution in execute unit. 2) Branch is taken but predicted not-taken or not predicted at all. 3) Branch is not taken (no target to compare), but was predicted taken. 4) Some other synchronization events are suitably handled as if they were mis-predictions. |
| PREDADDR | Predicted Position | Predicted position of a Taken Branch instruction on a cache line. If no branch exists nor is predicted taken on the cache line, then PREDADDR defaults to the end position ("11"). PREDADDR is related to PC-BTB. |
| PTTPC | Predicted Taken Target PC | The predicted taken target PC address from FIFO for PC1 calculation in FIG. 7 |
| PTTPCA | Predicted Taken Target PC Address | The predicted taken target PC address from FIFO for target mismatch comparison purposes in execute unit. Time-delayed version of PTTPC. |
| TA | Target Address | Either PTA or PNTA. Output of Mux 2150. |
| PTA | Predicted-Taken Address | Content of BTB Muxed out by Mux 2150 when the GHB supplies a Predicted Taken prediction. PTA can be used for I-Cache read to fetch Branch Target. PTA has MSBs identifying a cache line and LSBs identifying position of the Branch Target on the cache line. |
| PNTA | Predicted-Not-Taken Address | IA + 1 Muxed out by Mux 2150 when the GHB supplies a Predicted Not-Taken prediction. PNTA increments IA for I-Cache read to fetch next cache line in program order. PNTA has position LSBs set to "00." |
| | Predicted Taken | Value of bit from GHB representing a prediction that a branch instruction just fetched will, when executed several clock cycles later in an execute pipestage, load the PC with an address that is NOT the next address in program order. Used to operate Mux 2150. |
| | Predicted Not-Taken | Value of bit from GHB representing a prediction that a branch instruction just fetched will, when executed several clock cycles later in an execute pipestage, load the PC with an address that IS the next address in program order. The Predicted Not-Taken value is the logical complement of Predicted Taken value. |

TABLE 2-continued

GLOSSARY OF BRANCH-RELATED TERMS

| LEGEND | NAME | REMARKS |
| --- | --- | --- |
| GHB | Global History Buffer | Array of prediction direction/strength bit values Predicted Taken and Predicted Not-Taken arranged by GHB addresses (indexes) each representing a different branch history series of bits. |

Figure 6:
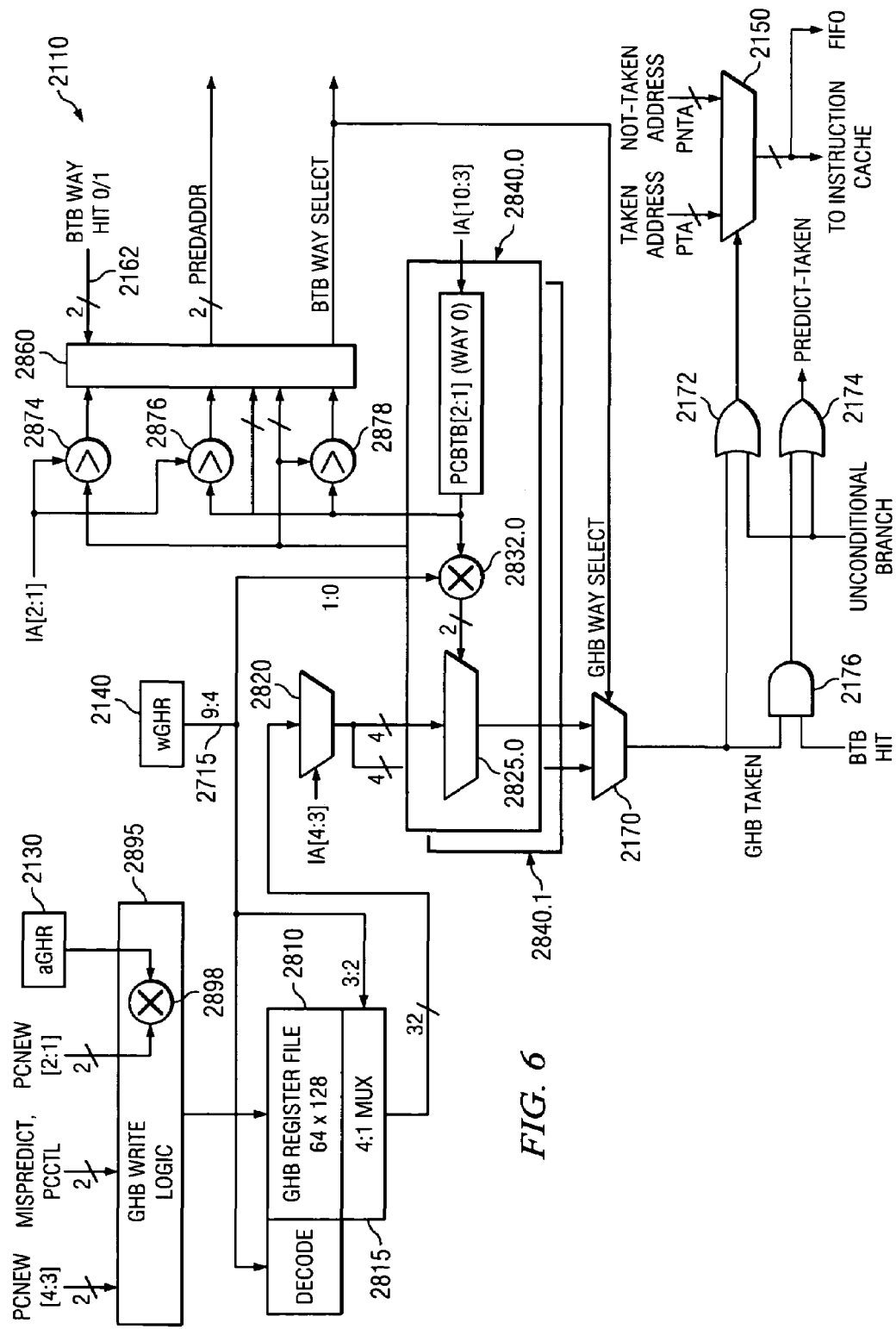
FIG. 6 is a partially-schematic, partially-block diagram further detailing inventive global history buffer circuitry and related branch target buffer circuitry of FIG. 4A driven by the circuitry of FIG. 5 for making high-accuracy branch predictions.

In FIG. 4A and FIG. 6, if a BTB hit occurs, FIFO 1860 is updated with a Predicted Taken Address PTA value retrieved on BTB hit. This Predicted Taken Address is sent by Mux 2150 to update the Instruction Address IA via a Mux 2210 of FIG. 4B. IA is coupled to an address input of Instruction Cache 1720 to retrieve the cache line holding the Branch Target instruction to which the PTA points. This Branch Target instruction is fed from Instruction Cache 1720 as the next instruction into the Instruction Queue 1910 of FIG. 3 and FIG. 4B.

In FIG. 4A and FIG. 6 if no BTB hit occurs, there is no Predicted Taken Address and the GHB 2110 PREDT/NT output is zero at the selector input of Mux 2150. The Instruction Address IA value is incremented by one ("IA+ 1"). This value is called a Predicted Not-Taken Address PNTA and is muxed out of Mux 2150 to update the Instruction Address IA via Mux 2210 coupled to address input of Instruction Cache to retrieve the next cache line in program order to which the Predicted Not-Taken Address points. Each next instruction(s) from such cache line is fed from Instruction Cache into the Instruction Queue 1910.

Depending on whether the branch is predicted Not-Taken or Taken respectively, the cache line for the incrementally-next instruction in program order or for the branch target instruction is retrieved from Instruction Cache and also fed as IRD to BP Predecode 1810. If the predictions are correct, the pipeline(s) execute smoothly and no mis-prediction is detected nor generated as a MISPREDICT signal in the execute pipestage of FIG. 7 where the actual Not-Taken or Taken status of a branch is determined by actual execution.

In FIG. 4A and 6, GHB 2110 has a two-bit saturation counter that increments a pertinent GHB two-bit entry on an actual executed taken branch and decrements the GHB entry on an actual executed non-taken branch. For a correctly predicted branch, only the LSB (least significant bit or strength bit) of the counter is incremented. This effectively saturates the count value. On a mis-prediction, the MSB (most significant bit or direction bit) is flipped only if the strength bit is zero (0) at that time. Thus, the counter effectively increments or decrements the count based on taken or non-taken mis-prediction. The counter ranges over +1, +0, −0, −1 as it were. For example, suppose the direction bit one represents Taken and zero represents Not-Taken and the entry is initialized at "00" for Not-Taken low-strength. Then if the branch as executed is actually Not-Taken, then the entry is incremented to "01" for high-strength. Then suppose the branch is executed again and is actually Taken (mis-predicted). Strength is decremented and the entry is "00" (Not-Taken low-strength) Then if the branch is executed again and is actually Taken, the direction bit is now flipped due to the mis-prediction at low strength to make the entry "10" (Taken, low-strength). And if executed yet again and actually Taken, the strength bit is incremented to make the entry "11" (Taken, high-strength.) (All the foregoing instances assume instances of same branch history to access the same entry in GHB 2110.)

If no mis-prediction is detected in actual execution, and the strength bit in GHB is not already one at the location indexed, the strength is incremented (High).

If a MISPREDICT signal is generated by actual execution, and there is an actual taken branch when Not-Taken was predicted, then an entry based on the saturating counter operation described hereinabove is written into GHB 2110 of FIG. 4A by GHB write circuitry 2895 of FIG. 6 at the location identified by the latest ten bits of aGHR actual branch history. Also, the branch target address MPPC from execution stage is written to BTB 2120 and associated therein with the corresponding PC value (fed back as PCNEW) of the branch instruction actually executed.

If a MISPREDICT signal is generated by actual execution, and there is an actual Not-Taken branch when Taken was predicted, then the GHB 2110 entry is updated based on the saturating counter operation described hereinabove at the location identified by the last ten bits of actual branch history. The BTB entry of tag and branch instruction at hand is allowed to remain because 1) the GHB two-bit saturating counter may still indicate a weakly taken branch, or 2) this branch may belong to another aGHR global prediction path (index) that has a Taken direction bit in GHB, or 3) in case of an unconditional branch, the BTB entry itself determines the branch is taken. Ordinarily, the GHB will decide by selector control of Mux 2150 whether the entry in the BTB is used or not. (The PTA entry in the BTB can be subsequently updated by a new branch target address on a valid taken branch having the same tag.) In either type of mis-prediction, the actual Taken/Not-Taken from the execute pipestage in FIG. 7 is also fed back in this process to aGHR 2130 of FIG. 5 to keep a record of actual branch behavior.

In the BTB TABLE 1, Target Mode allows use of instructions from different instruction sets such as the first instruction set and the second instruction set referred to by way of example herein. The number of instructions sets is suitably established by the skilled worker, and up to 2-to-number of bits of Target Mode is the number of instruction sets permitted by the number of bits provided for tabulations in the BTB Table. With two Target mode bits in this example, 2-to-two power (equals four) Instruction Sets are accommodated.

If the BTB access of the bit Unconditional retrieves a one ("1"), then the branch Target from BTB 2120 is the Target Address for fetching the next instruction regardless of GHB 2110 output. If Unconditional=0, then the Taken/Not-Taken branch prediction output from GHB 2110 of FIGS. 4A and 6 operates Mux 2150 if there is a BTB Way Hit. The UNCONDITIONAL signal is fed to an input of OR-gate 2172 in FIG. 4A.

Figure 7:
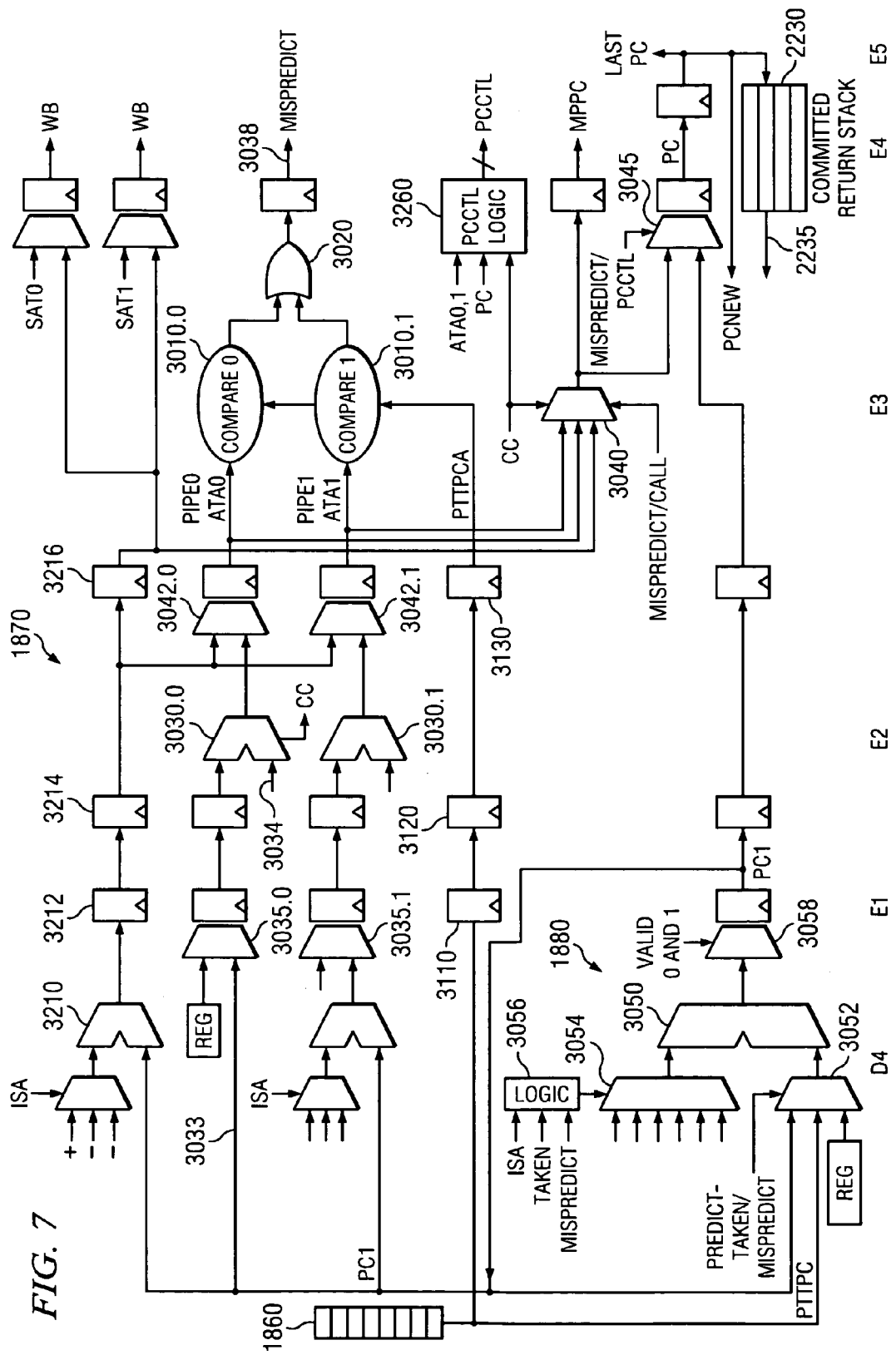
FIG. 7 is a partially-schematic, partially-block diagram further detailing inventive execution circuitry of FIG. 3 with message-passing circuitry back to fetch and fed by pointer-based FIFO circuitry with predicted taken target addresses supplied from fetch.

In FIGS. 3, 4B and 7, an execution pipestage has a Branch Resolution logic circuitry 1870 which supplies branch-taken information to a Committed Return Stack 2230. Stack 2230 is coupled via a message-passing bus 2235 back to a Speculative Working Return Stack 2220. Stack 2220 supplies a Pop Address on line 2225 to the POP ADR input of Mux 2210. Thus, a return stack is advantageously implemented for CALL and RETURN instructions. CALL instructions store their incremented instruction addresses related to IA on the stack beforehand for use by a RETURN instruction thereafter, so the global branch prediction mechanism is bypassed in the case of CALL and RETURN instructions.

In FIG. 4B, the Working Return Stack 2220 is a speculative push/pop stack in fetch. When a CALL instruction is detected, the next sequential instruction address IA is pushed on the stack. When a RETURN instruction is detected, the top of stack 2220 is popped as the predicted target address POP ADR. The Committed Return Stack 2230 is operative on retiring of a CALL or RETURN instruction. On a branch mis-prediction, the Committed Return Stack 2230 is copied to the Working Return Stack 2220. Some example operations of these stacks relative to pipe0 and pipe1 are Call1 push 1, Call0 push 0, Return0 pop 0, Return1 pop 1.

In FIG. 4B, Instruction Cache Icache 1720 has an input for the latest Instruction Address IA asserted to Icache 1720 to obtain a new cache line. Instruction Address IA is supplied by a Mux 2210. Mux 2210 has inputs from 1) Target output of Mux 2150 of FIG. 4A to handle predicted branches, 2) Pop Address POP ADR from Working Return Stack WRS 2220 to handle Return instructions, 3) output from an Offset Adder 2240, 4) addresses supplied by L2 Cache 1725 of FIG. 3 for cache maintenance, and 5) addresses from low priority sources 2242.

Offset Adder 2240 has a first input fed by a Mux-flop 2246. Mux-flop 2246 has a first input coupled to the output of Mux 2210. That output of Mux 2210 can thereby have any appropriate offset applied to it.

Mux-flop 2246 has a second input fed by lines MPPC supplying a branch target address generated by actual execution of a branch instruction in the execute pipeline. Occasionally, such actual branch target address was mis-predicted by the branch prediction circuitry. In such case of a misprediction detected in BP Update unit 1870 of FIG. 3, the branch target address generated by actual execution is fed back on the lines MPPC from pipe stage 1870 of FIG. 3.

Mux-flop 2246 has a selector control fed by MISPREDICT line from BP update 1870 of FIG. 3. If the MISPREDICT line is active, then Mux-flop 2246 couples the actual branch target address on the lines MPPC to Offset Adder 2240. Otherwise if the MISPREDICT line is inactive, then the Mux-flop 2246 couples the Mux 2210 output to Offset Adder 2240 for offsetting.

Offset Adder 2240 has a second input provided with a selected one of several ISA instruction-set-dependent offset values 2248 of zero or plus or minus predetermined numbers. Offset Adder 2240 supplies the appropriately-offset address to an input of Mux 2210.

Mux 2210 has its selector controls provided by a selection logic 2250. Selection logic 2250 is responsive to inputs such as POP indicating that the Working Return Stack 2220 should be popped to the Icache 1720, and to another input ICacheMiss indicating that there has been a miss in the Icache 1720. Selection logic 2250 is provided with all input needed for it to appropriately operate Mux 2210 to supply Icache 1720 with addresses in response to the various relevant conditions of the processor architecture.

Icache 1720 feeds an instruction width manipulation Mux 2260 which supplies output to the Instruction Queue 1910 and the decode pipeline thereafter.

In FIGS. 4B and 4A, Mux 2210 supplies as output the Instruction Address IA that ordinarily is used to read the BTB 2120 to supply a Predicted Taken Address PTA (if any) of the instruction having the instruction Address IA. The BTB has a R/W write input coupled to the MISPREDICT line from execute stage 1870. If the MISPREDICT line is active, then for write purposes the BTB 2120 has a BTB entry written with the mis-predicted branch target address fed on lines MPPC via a data input Mux 2320 to the BTB 2120 in a Way and at a tag established by the Instruction Address PCNEW associatively stored with entry MPPC.

In FIG. 4A, FIFO 1860 has a FIFO control logic 2350 and a register file 2355 of storage elements, and is fed with target addresses TA from Mux 2150. The FIFO control logic 2350 is fed with monitor inputs including the TakenNot-Taken prediction from OR-gate 2172. In this way FIFO control logic 2350 only updates a storage element in register file 2355 of low-power pointer-based FIFO 1860 when there is a predicted Taken output active from OR-gate 2172. Thus register file 2355 of pointer-based FIFO 1860 only holds Predicted Taken Addresses PTA from Mux 2150, and a write pointer WP1 of FIFO 1860 is only incremented upon receipt of a PTA (or before receipt of another PTA), rather than responding to a PNTA from Mux 2150.

Turning to FIG. 5, a hidden pipestage F3 of the fetch pipeline provides a virtual pipestage for improved fine-grained cache line branch decoding and improved circuitry including global history registers aGHR 2130 and wGHR 2140.

In FIG. 5, the PCNEW value and certain signals MISPREDICT and PCCTL[2:1] are received at fetch via lines 1820 from the execute pipestage signifying the actual behavior of the branch. The message passing circuitry from FIG. 7 clocks PCNEW the execute PC (instruction address of the executing instruction) into the global history aGHR circuitry 2700A of FIG. 5. In the meantime, fine-grained decode circuitry of FIG. 5 is keeping track of the entire cache line.

The MISPREDICT and PCCTL signals from an execution stage 1870 of FIG. 3 and FIG. 7 are thus sent back through the PC-New Compare block of FIG. 5 to update the architectural Global History Register aGHR 2130 of FIG. 5. The aGHR keeps track of the actual branch history and thereby improves the branch prediction performance of the circuitry of FIG. 5. So there is feedback to fetch stage F2 from the address stream as the execution unit actually executes branches, and this feedback improves the determination of the next predicted address upstream in fetch as needed.

In FIG. 5, logic blocks 1810, 1830 share two sections—a Working History section 2700W and an Actual History section 2700A.

Improved branch prediction accuracy is important in processors wherein branches are not just unconditional Jump instructions but also numerous other branch instruction types any of which involve a non-sequential address load to the Program Counter. It is highly desirable, therefore, to not only 1) very precisely decode all branch instruction types if possible so as to improve the prediction rate, but also 2) to find a place to "hide" one or more decode cycles for the very high frequency precise decode operations. Physically hiding the "F3" pipeline stage from the architecture confers an additional clock cycle to complete the fine-grained decoding, which in turn confers a better prediction accuracy on the improved architecture.

In one embodiment, for purposes of this precise decoding, a minority part of the real estate and decode operations is allocated to an F2 pipestage and the majority thereof is allocated to an F3 pipestage situated time-wise in parallel with an early part of decode pipeline 1730. In other embodiments, a different allocation could be used across two clock cycles, and indeed, one or more additional clock cycles are suitably hidden for this branch prediction-related instruction decode purpose.

The rest of the fetch unit in FIGS. 3 and 4B fetches the instruction stream in any appropriate manner and is represented in FIG. 5 as Fetch Logic 2760. Further in FIG. 5, a set of flip-flops 2740 are clocked on the clock boundary F3 to receive the information from message-passing lines 1820, as well as from further lines described in connection with FIG. 5.

For each executed branch instruction, the information, designated PCCTL, that an execution pipestage 1870 sends back to Fetch is a first bit 1) branch or no branch as determined by logic in execute unit detecting either an actually decoded branch or something other than a simple increment of PC by any instruction; and a second bit 2) if a branch, whether the branch is actually Taken or actually Not-Taken, reflecting a condition code CC event when there is a branch based on ALU or other logic in the execute unit. See FIG. 7 for further description of the execute unit. The details of such logic are de-emphasized for conciseness since they are merely dependent on details of the instruction set.

In FIG. 5, the Actual History 2700A clocks PCNEW into flip-flops 2740 and uses a comparator PCNEWCOMPARE 2750. The PCNewCompare block 2750 monitors LSB (less significant bits) of the address to detect when an instruction straddles and thus has crossed the cache line boundary of 64-bits width. This means that the instruction address of the instruction at hand is not changed. PCNewCompare block 2750 compares from last valid instruction to next valid instruction to see if it crossed the block boundary. Earlier contents of the PC are shifted into registers 2752 and 2754, and these are used for compare purposes in compare circuit 2750. PCNewCompare 2750 looks for discontinuities in the program counter stream by comparing 1) a current PC (designated PC N—1clocked into flops 2740 from lines PCNEW in bus 1820) with 2) the staged versions of the PC (PC N—2 2752 and PC N—3 2754) resulting from the in-order issue. In this embodiment, regardless of whether more than one execute pipeline is involved, one series of program counter values is sufficient.

Each of the wGHR 2140 and aGHR 2130 are one-bit wide shift registers by ten (10) deep in this example. Each one or zero in the wGHR 2140 and aGHR 2130 stands for "Taken" or "Not Taken" in respect of a particular branch in a sequence of branches to which the series of shift register cells correspond. The wGHR 2140 needs to be updated in case of MISPREDICT active.

In FIG. 5, the wGHR 2140 keeps track of the speculative branch history pattern, and uses the pattern to index into the GHB 2110 circuitry of FIG. 6 to obtain a Taken/Not-Taken prediction from GHB 2110 of what the next branch is predicted to be. By contrast, aGHR 2130 tracks actual executed Taken/Not-Taken branch behavior of branches executed in the execute pipestage(s). Note that the contents of aGHR 2130 provide a window on behavior of a predetermined number (e.g. ten) of most-recently actually executed branches, but that behavior is numerous clock cycles down the pipeline and thus lagging very much behind in time relative to the current information that is needed. The wGHR 2140 is therefore provided to predict branch behavior. In case of MISPREDICT active, the Actual History circuitry 2700A couples and copies the aGHR 2130 to wGHR 2140 via 10-bit lines 2759 via Mux 2756 and thence via Mux 2735 to wGHR 2140. Elsewhere, the processor flushes the pipelines, and execution restarts from what is known to be the actual behavior of the instruction stream in aGHR 2130.

A multiplexer 2758 has two 10-bit inputs for a) the current contents of aGHR 2130 on a line 2759 and b) an output from PCNEWCOMPARE compare logic 2750.

When an instruction crosses a cache line, the PCNEW does not change from one cycle to the next, so compare logic 2750 detects an equality. In such case, the aGHR is fed back to itself via the Mux 2758. Multiplexer 2758 has an output coupled to the aGHR portions 2720A and 2720E. Multiplexer 2758 thereby either updates aGHR 2130 with new results of comparison block 2750, or if block 2750 detects there is no update needed, then Mux 2758 is controlled by block 2750 to simply enter the previous contents of aGHR 2130 from line 2759 back into aGHR 2130.

The aGHR 2130 has a shift register Extension section 2720E to include earlier branch history and thus more bits than are used in wGHR 2140. In case of a replay (such as triggered by a data cache miss) or a pipeline flush event, bits including the bits of shift register Extension section 2720E are used to reinstate the bits representing an earlier branch history pattern. The bits are reinstated by Mux 2758 by loading them into the main aGHR section 2720A. Operations thereby resume at the earlier point in the history in an advantageous and uncomplicated manner.

In FIG. 5, the Working History section 2700W accomplishes the precise branch prediction that improves branch prediction accuracy by means of more complete branch instruction decoding, and the hidden pipestage F3. The Pre-Decode 1810 and Post-Decode 1830 in Working History section 2700W provide an additional decode circuit having respective circuit portions 2770, 2780 respectively situated for fetch purposes time-wise in parallel with a fetch stage and a decode pipeline stage. In the FIG. 5 embodiment, the additional decode circuit 1810, 1830 is responsive to the cache line IRD to generate at least one set of bits of a branch count BRCNT value representing presence of plural branches in the cache line when plural branches occur and at least one different bit of BRCNT value representing presence of a single branch in the cache line.

The actual instruction stream Icache 1720 in Fetch pipeline is coupled from Fetch Logic 2760 to Working History section 2700W to provide a 64-bit cache line IRD. The latest instruction(s) on the cache line IRD are connected directly to and clocked into flip-flops 2740C which have four 16-bit subsections. Also, these instructions are predecoded by a Predecoder 2770, which supplies outputs respectively to a section of flip-flops 2740B that has respective subsections pertaining to different instruction sets or ISAs.

The Predecoder 2770 and Postdecoder 2780 circuitry detect based on the last address IA where in the cache line and which chunks of the cache line IRD are valid. That circuitry accounts for any wrap-around instructions and advantageously determines which and how many of the chunks of the cache line represent any branch instruction(s) from any of plural ISA instruction sets. Up to four 16-bit wide branch instructions might be present in this example. Some instructions might be different widths such as 16-bit and 32 bit instructions. There might be no branch instructions, or one 16-bit or 32-bit branch instruction, or two branch instructions each of 16 or 32 bits length, with the balance of the 64 bit cache line occupied by instructions that are not branch instructions. There might be three branch instructions of 16, 16, and 32 bits, or 16, 16, 16 bits and a fourth non-branch 16 bit instruction. And as noted above, there might be even four branch instructions of 16, 16, 16, 16 bits. Also, the instructions with their different lengths might be mixed in any order. Accordingly, the decoder in working history logic 2700W is provided with significant and sufficient decode logic to perform its function relative to the particulars of the ISA(s) involved.

In this example, two instruction sets are involved. A first instruction set has 32 bit instructions. A second instruction set has 32-bit instructions and 16-bit instructions. The instructions from either instruction set arrive in any order. Two decoders for the first instruction set are provided because the 64-bit cache line comprehends two 32-bit instructions from the first instruction set. Also, in this example two execution pipelines are provided and two instructions issue into the respective pipelines at a time. By contrast from the second instruction set, four 16-bit instructions can be delivered from the 64-bit cache line. For high speed partial decode, four more decoders are provided for the second instruction set in addition to the two decoders for the first instruction set.

In FIG. 5, predecoder 2770 performs a partial decode on each branch instruction relative to all three opcode forms of this example: $1^{st}$ instruction set 32-bit, $2^{nd}$ instruction set 16-bit, and $2^{nd}$ instruction set 32-bit. In other words, each instruction set and each opcode bit-length to be comprehended by the architecture is at least partially decoded.

In this example, Predecoder 2770 utilizes six predecoder logic circuits, two for the first instruction set and four for the second instruction set. Predecoder 2770 uses as many of the six predecoder logic circuits as needed to determine the instruction set (first or second) and which bit length each instruction corresponds to.

Inputs to predecoder 2770 are 64-bit IRD delivering a cache line, 4-bit instruction size INSTSIZE from Fetch pipestage F2, and 16 wrap-around bits on 16-bit line 2772 from the previous cache line stored in flip-flops 2740C. The wrap-around bits are input to Predecoder 2770 because a set of first 16 bits of a new cache line arriving on IRD can be a part of a 32-bit instruction that began in the last 16 bits (wrap-around) bits of the previous cache line.

Further in FIG. 5, outputs of Predecoder 2770 are clocked into flip-flops 2740B as 24-bit T2 instruction set predecode (T2PRDCD) responsive to the 16-bit or 32-bit form of instruction in the second instruction set. Also clocked in, are 8-bit "T" instruction set predecode (TPRDCD) responsive to a group of 32-bit of instructions in the second instruction set, and 16-bit "A" instruction set predecode (APRDCD) responsive to 32-bit instructions in the first instruction set. Since the manner and details of decoding are dependent on the particulars of any given instruction set ISA which are not essential to the present description, such details are omitted for conciseness. Next, a Postdecode logic block 2780 does a final decode to determine what opcode format and position each branch instruction occupies on the cache line.

GHR Update block 2730 is fed with the 10-bit current contents of wGHR on lines 2715; as well as several lines from Fetch Logic 2760 via flops 2740D. Fetch Logic 2760 supplies a 2-bit predicted address PREDADDR. A 1-bit ISABIT indicates instructions are only from second ISA instruction set (or not). ISABIT signifies a change from a first Instruction Set Architecture (ISA) designated "A" to a second ISA "T" of 16/32 bit instructions (see TABLE 1). A 1-bit signal PREDICTTAKEN indicates a Taken/Not-Taken prediction from GHB 2110 and logic in FIG. 4.

Circuitry 2700W of FIG. 5 advantageously decodes the cache line sufficiently to identify precisely which instructions are branch instructions and how many of them are branch instructions found in the cache line. Put another way Circuitry 2700W tells precisely where in the cache line there exists a branch instruction. This is an advantage conferred by Postdecode 2780 which outputs BRMASK and BRCNT.

In FIG. 5, then GHR Update block 2730 assembles an updated set of branch history bits destined for wGHR 2140. Notice that the Taken (1) and Not-Taken (0) behavior of the ten branches represented in wGHR 2140 is running ahead of the actual known behavior of branches that is being entered into the aGHR 2130 from the execute stage.

The GHR Update circuitry 2730 updates wGHR 2140 in one cycle no matter how many branches are present in the cache line.

In FIG. 5, the 10-bit current contents of wGHR 2140 on lines 2715 are coupled back to GHR Update block 2730 so that in the case when there is no branch instruction in the cache line, the current wGHR contents are simply delivered back to wGHR 2140 from GHR Update 2730 via Mux 2735. If there are branch instructions detected in the cache line by Postdecoder 2780, then GHR Update 2730 enters a zero or a one representing a branch prediction for each of those branch instructions in the cache line. Thus, wGHR 2140 is a register and GHR Update 2730 acts as logic to successively reload wGHR 2140 in a way that amounts to shifting the branch bit pattern across the wGHR 2140 register.

GHR Update 2730 has an output LookupGHR for updating wGHR 2140. LookupGHR is established as a function of the branch count BRCNT bits according to the following TABLE 3. "T/NT" in the TABLE 3 represents the single-bit one or zero value of the signal PREDICTTAKEN. If no valid branches are detected on the cache line, then wGHR 2140 is not updated regardless of PREDICTTAKEN.

TABLE 3

UPDATING wGHR 2140

| BRCNT | LookupGHR (concatenation) |
| --- | --- |
| 00 | {wGHR[8:0], T/NT }; |
| 01 | {wGHR[7:0], 0, T/NT }; |
| 10 | {wGHR[6:0], 00, T/NT }; |
| 11 | {wGHR[5:0], 000, T/NT }; |

For example, in the case of branch count BRCNT=11, the circuitry of FIG. 5 recognizes not only that four 16-bit branch instructions occupy the cache line 2740C but also that IA[2:1] points to the first instruction at one end of the cache line and PREDADDR[2:1] points to the last instruction at the other end of the cache line.

In general, IA[2:1] points to the word on the cache line of the current instruction. PREDADDR[2:1] is LSB bits of a tag address, if any, having MSB bits defined by the address of the cache line, wherein the BTB reports a hit (presence) of a predicted-Taken branch at a position on the cache line as further identified by those LSB bits. The circuitry 2780, 2730 can predict more than one branch at a time, but not all branches on a cache line may even be reached in actual execution. In that case, BRCNT is a smaller number than binary 11 (decimal 3).

In a case where there is more than one valid branch on the cache line and PREDICTTAKEN is a one (taken), the circuitry thus operates to identify the position of the branch instruction which is regarded as Taken as that position to which PREDADDR[2:1] points because that is the position represented by the tag in BTB where a hit occurs and because in this embodiment BTB is a cache having tags representing addresses of branch instructions that have been actually Taken. If IA[2:1] were 00 and PREDADDR were 00, then BRCNT would not be 11, but 00 instead. In the example of four branches on the cache line, PREDADDR is 11 when BRCNT is 11. Any branch(es) between the IA[2:1] position on the cache line and the PREDADDR[2:1] position on the cache line are presumed Not-Taken because a hit or entry for them has not just occurred or been found in the BTB. That is a reason why the insertion bit zeroes are inserted in the concatenation by GHR Update 2730 according to TABLE 3.

An important result of the operations in FIGS. 4A and 5 involves fetching the right cache line on the next clock cycle. That fetch depends on PREDICTTAKEN predicting whether or not there is any branch on the cache line which will be Taken, and PREDADDR[2:1] identifying by position which of possibly plural branches on the cache line will be Taken. Identifying that position matters because different branches will probably have respective taken-branch target addresses that point to respective different new cache lines any of which might be the right cache line to fetch next. Accordingly, knowing from GHB 2110 whether any branch on the cache line is predicted taken, and knowing further from PREDADDR the position of that taken branch, the target addressed by that branch can be used to bring in the correct next cache line IRD from Icache 1720 on the next cycle.

Note that in this embodiment, predictions from GHB 2110 and WayHIT and PREDADDR from BTB 2120 provide a mutual check-and-balance system. If GHB predicts Taken but BTB Way Hit has no entry for a Taken branch having happened, then PREDICTTAKEN is made inactive. If GHB 2110 predicts Not-Taken even when there is a Way Hit, then PREDICTTAKEN is inactive and Mux 2150 prevents PTA from being used and selects PNTA instead.

In this example of a two-way BTB 2120, the BTB can have up to two Taken branches at different BTB tag LSBs corresponding to the same MSB of that tag representing the address of the cache line itself. And in FIG. 6, in such a case, the lower numbered address position of the two is used for purposes of PREDADDR[2:1] because sequential execution will most likely reach the branch instruction having that lower numbered address and then that branch instruction being predicted-Taken will most likely actually be Taken in actual execution and change the instruction stream to a different path bypassing the higher-numbered instruction. That is a reason why the policy of using lower numbered address position is used in the embodiment of FIG. 6, not only for operating the GHB Mux 2170 but also the BTB internal selection of the right PTA from either of two Ways of BTB. GHR Update 2730 uses PREDADDR to update wGHR 2140 and thereby access GHB 2110 to provide a new PREDICTTAKEN for use in processing cache line IRD on the next cycle. Concurrently, BTB 2120 uses PREDADDR to identify the right way PTA to output via Mux 2150 for accessing Icache 1720 to supply cache line IRD on that next cycle.

It is believed that experience indicates that a very high proportion of branches that are predicted-Taken actually are Taken. All branches in the positions starting with IA[2:1] and less than PREDADDR[2:1] are most likely not going to be Taken. So zeroes are entered for the branch behavior speculatively in wGHR 2140 as insertion bits.

Notice that in the embodiment shown in FIG. 4A, there is a small degree of latency in generating the speculative branch pattern for wGHR introduced by using a pipestage or two to do the fine-grained decode (1810, 1830). Accordingly, the speculative branch pattern in wGHR used to index the GHB is running a cycle or two behind. However, the advantages of the fine-grained decode in improved branch prediction so far outweigh any little effect of the latency, that providing the fine-grained decode (1810, 1830) is highly attractive. And compared to using the actual branch history, which is running very many more cycles behind in a deeply pipelined processor, as an index to GHB, the performance improvement of the processor and structure herein is even more strikingly outstanding.

The remarkably advantageous and elegant process and structure in FIG. 4A thereby confer a highly accurate speculative branch pattern for use in accessing the GHB on the next pass. Furthermore, this process and structure also deftly use the BTB to accurately identify the next cache line IRD to fetch because PREDADDR in the BTB tag LBSs accurately identifies what branch instruction on the current cache line is the one that will be Taken. BTB thereby also supplies the associatively-stored target address PTA that includes the tag to point to the correct next cache line IRD to fetch from Icache 1720 subject to PREDICTTAKEN coupled from GHB. Since that target address PTA, being accurate, also establishes IA to match the correct tag MSBs to use in the next access to BTB, the BTB is more efficiently and advantageously used cycly after cycle. Furthermore, PREDADDR feeds forward into GHR Update 2730 to improve wGHR patterns and consequent GHB accesses, in this win/win control loop 2175. BTB 2120, Pre-Decode 1810, Post-Decode 1830 with GHR Update 2730, and wGHR 2140, and GHB 2110 together work synergistically as taught and described herein to increase instruction efficiency and processor performance generally.

When one or more branches are present on the cache line, the GHR Update 2730 loads nine, eight, seven or six previously-most-recent bits from wGHR (where wGHR bit number zero is the previously most-recent bit), concatenated with further newer bits: none, one, two or three zeroes (called insertion bits herein), and one prediction bit. That prediction bit becomes the newest wGHR[0] bit.

For instance, in case of four (4) valid branches in the cache line detected by pre/post decoding and Not-Taken prediction (0) by GHB/BTB, then three insertion zero bits plus prediction zero bit make four zero bits fed to wGHR 2140. The use of insertion bits such as a varying number of zeroes is a special improvement for distinguishing different histories to index into the GHB register file 2810.

In this way, branch decoding detects branches on a cache line, and modifies the wGHR pattern with different numbers of insertion bits dependent on, or as a function like BRCNT of, the number of detected branches, ordinarily ignoring when PREDICTTAKEN=1 (Taken) any branches on the cache line having an address subsequent to a predicted address PREDADDR[2:1] and prior to Instruction Address IA[2:1] as fed to GHR Update 2730. (Some special cases handled in TABLES 5-9 may vary. See TABLE 7 for instance, when PREDICTTAKEN=0 (Not-Taken)).

The number of detected branches less those ignored is the number of what are herein called valid branches for purposes of GHR Update 2730. This hashing improvement advantageously adds insertion bits, such as a variable number of zeroes or otherwise, ahead of PredictTaken in wGHR depending on number of valid branches in the cache line. This approach avoids confusing the branch history with other histories that involve actual Non-Taken branches (GHR zeroes). Only the non-taken branches within the cache line are included as zeroes by the operations of this example of GHRUpdate 2730. The non-taken branches are part of the pre-decoding 2770 and post-decoding 2780/2730 for updating wGHR 2140. The non-taken branches from the starting instruction until the taken branch instruction of this cache line are added as insertion zeroes to the wGHR by this circuitry 2730.

Even if the predicted taken branch instruction branches to another branch instruction on the current cache line, then IA[2:1] and predicted address PREDADDR will be updated on the next cycle and the process operates correctly.

The respective clock cycles at which the IA and PREDADDR are generated in FIG. 4A and the flops 2740 in FIG. 5 are used and located in this embodiment to make GHR Update 2730 operate on each cache line as described here.

Accordingly, when PREDICTTAKEN=1 (Taken) the circuitry in Post-Decode 2780 that generates BRCNT ignores any branch instruction following the position PREDADDR of a first-reached instruction on the cache line that is predicted taken. In this sense, the predicted taken branch is also by definition, or presumed to be, the "last" branch instruction to be reached in the basic block or cache line.

In this cache line, if there is another branch (not found in BTB) before a predicted taken branch, then such other branch is presumed to be a non-taken branch to be entered as an insertion zero "0" in the wGHR. Accordingly, entering the variable number of zeroes elegantly builds into the speculative branch history the non-taken predictions for branches detected on the cache line ignoring any branches before the Instruction Address[2:1] position on the cache line and further ignoring any branches positioned on the cache line after the position PREDADDR of a predicted-taken branch on the cache line. In other words, when PREDICTTAKEN=1 (Taken), the valid instructions for purposes of generating the branch mask BRMASK and branch count BRCNT are from IA (starting address—this can be 00 for sequential instruction or any address for a target address) to PREDADDR (branch address of the predicted taken branch), such that any branch prior to IA and after PREDADDR on the cache line is ignored.

GHR Update Logic block 2730 supplies a 10-bit updated set of GHR bits Lookup GHR as well as control output SELaGHR to Mux 2735. SELaGHR control to Mux 2735 couples GHR Update 2730 output LookupGHR to wGHR 2140 unless MISPREDICT is active and there is no Load-Store exception. Mux 2735 has two 10-bit inputs, a first input connected to GHR Update block 2730, and a second input connected to the output of Mux 2756 of Actual History section 2700A. The 10-bit GHR update selection made by Mux 2735 is clocked into the wGHR 2140 unless there is no reason to change the contents of wGHR 2140.

A predetermined number of most recent bits (e.g., all ten bits) in wGHR 2140 is output on a bus 2715 to circuitry of FIG. 6, as well as fed back to Global History Register Update logic circuit 2730.

Postdecode 2780 provides a 4-bit branch mask output BRMASK, and a 2 bit output branch count BRCNT, both supplied to GHR Update block 2730. BRMASK and BRCNT basically provide a bit-field that identifies where the branch instructions are in the cache line and how many branches there are. This bit-field is a highly advantageous result of the operation of Postdecode 2780 first by detecting each instruction that is in fact a branch instruction, given that instructions can be from different instruction sets and have different lengths. Postdecode 2780 secondly, identifies where the detected branch instructions actually are situated in the cache line and applies masks to count the valid branches.

In an operational instance, the cache line has a predicted Taken first branch to a second branch as the target farther along on the same cache line. Depending on embodiment, the Icache 1720 sends the same cache line or the cache line 2740C is simply maintained without a repetitious Icache 1720 access. In an operational instance wherein a branch instruction wraps from a first cache line to a second cache line, the branch prediction for that branch instruction occurs upon obtaining the second half of the instruction when the second cache line is accessed. Assuming the branch instruction is in the predicted program path, the signals IA[2:1] and PREDADDR are used as described herein for branch prediction processing of that branch instruction in the second cache line. Also in this case wherein a branch instruction wraps from a first cache line to a second, wGHR is updated for that branch instruction when the second cache line is processed by GHR Update 2730.

In this embodiment of FIG. 5, the additional decode circuit 1810, 1830 is operable to detect branch instructions in the cache line wherein the branch instructions are from two different instruction sets or have different lengths, and when a branch instruction wraps around from a current cache line to a succeeding cache line, or wraps around from another cache line to the current cache line. The circuit can count branch instructions of different lengths in the cache line, not counting a branch instruction that wraps around to a succeeding cache line, and not counting any branch instruction on the cache line that has an address less than a current address IA [2:1].

Note, in regard to Postdecode 2780 that some advanced instruction sets have instructions that lack a simple set of a few identifier bits that establish a given instruction as a branch instruction. For example, one instruction may have a flag bit that makes the instruction do a branch only when the flag is set. Another instruction may simply be a move instruction or an arithmetic or logic instruction that is only a branch for the present purposes when the destination of the result of executing the instruction is the Program Counter (PC) itself.

And given this variety of instructions and instruction sets, all of which variety is advantageously comprehended in the decoding circuits 2770 and 2780, these decoding circuits are likely to need more than a single pipestage to complete their operations when applied in a high speed processor with an advanced complement of instructions to decode. This improved embodiment remarkably accommodates these advanced instruction sets without extending the pipeline of the processor as a whole. This improved embodiment is advantageously able to handle instructions that would otherwise challenge a process of determining whether a given instruction is a branch instruction or not a branch instruction at all. In FIG. 5, the special decode logic straddles pipestages F2 and F3 and is thus coupled by registers 2740 on the F2/F3 pipestage boundary between Predecode section 2770 and Postdecode section 2780.

4-bit BRMASK identifies which 16-bit portions of the cache line have a valid branch instruction therein. For example, "1001" signifies that the first and last 16-bit portions of the cache line respectively have a branch instruction therein, but the middle two 16-bit portions of the cache line respectively lack any branch instruction. 2-bit BRCNT is a code that in this example is a coding equal to the binary count of branches in BRMASK less one. For example, one branch in BRMASK has a branch count BRCNT of 00, two ones in BRMASK has BRCNT=01, etc., and four ones in BRMASK has BRCNT of 11.

Next, various examples of entries in BRMASK are provided. When BRMASK is [0000], no valid branch instructions exist on the cache line and wGHR 2140 is maintained unchanged.

Note that the codings for BRMASK and BRCNT described here are but one example of a way to distinguish the various branch instruction permutations across the cache line by width and by type as branch or non-branch. In general the coding is any coding that distinguishes those branch instruction permutations across the cache line by instruction width and by type as branch or non-branch. One general approach provides N-bit codes where 2-to-the-N-power is greater than or equal to the number of possible branch instruction permutations across the cache line by width and by type as branch or non-branch.

Note that the legends "BRMASK" and "BRCNT" do not limit the function of either set of lines to be a mask or a count. A particular coding scheme is described next.

For instance, "1101" for the BRMASK bits in this example of TABLE 4 signifies there is a branch that starts at word 0, word 2 and word 3. Four branch combinations corresponding to BRMASK 1101 are tabulated next. Branch count BRCNT is the same (binary 10, or decimal 2) for all of them.

TABLE 4

EXAMPLE OF SOME BRANCHES ON CACHE LINES

| Branch | Word # | | | | | |
|---|---|---|---|---|---|---|
| Combination | 3 | 2 | 1 | 0 | BRMASK | BRCNT |
| A) | 16 | 16 | x | 32/2 | 1101 | 10 |
| B) | 16 | 16 | x | 16 | 1101 | 10 |
| C) | 16 | 32/2 | 32/1 | 32/2 | 1101 | 10 |
| D) | 16 | 32/2 | 32/1 | 16 | 1101 | 10 |

A "1" in BRMASK indicates the start (or highest word number of address) of a branch instruction. This could be a 32 bit or 16 bit branch in this example. The upper word ("32/2") of a 32 bit branch is indicated with a one in BRMASK.

An instruction is represented as valid or significant for GHR Update 2730 branch history update purposes in the following way. Two 2-bit fields determine the valid range of instructions-IA[2:1] (Instruction Valid Address word position) and PREDADDR[2:1]. IA[2:1] selects or identifies the current valid instruction word position in a cache line. PREDADDR determines or identifies the position of a predicted-Taken branch instruction if any in the cache line. The tag in the BTB has two more LSB bits of precision beyond the fewer number of address bits (e.g., IA[10:3]) used to access the BTB. The address bits IA used for access and the two more LSB bits of precision comprise part or all of the known address of a branch instruction that was actually Taken at some previous time. Both that known address of the earlier-Taken branch instruction, and the target address to which that branch instruction actually branched are associatively stored in the BTB. PREDADDR [2:1] is based on those two more LSB bits of precision. When the BTB is accessed using the fewer number of address bits, the additional two more bits of precision in the address are thereby retrieved along with the associatively stored target address PTA. The BTB in this example has two ways, Way0 and Way1, and there may be such Taken branch information in neither, either, or both, Way0 and Way1.

The PC-BTB address from each Way of the BTB is selected by the same index or tag IA[10:3]. The PC-BTB address is read out along with the unconditional branch field, target address, and branch type. They are all qualified by their respective way hit signal.

PC-BTB for way0 and way1, as thus qualified, are inputs to logic that generates PREDADDR by selecting the PC-BTB with the lower address if both ways hit. When both ways hit, the lower address is used because the branch instruction at the corresponding lower address on the cache line will most likely be taken and the branch instruction at the higher address on the cache line will not be reached on this pass. But if there is no hit in the BTB (sequential execution), PREDADDR then defaults to 11 by qualifying logic responsive to way0-hit and way1-hit both inactive. The default to 11 is provided on the good assumption that all branches on the current cache line will not be taken (in view of no BTB hit) so PREDADDR "11" opens up the masking process that produces BRCNT to count any and all branches on the cache line starting with the position IA[2:1].

The logic to generate PREDADDR from PC-BTB, or to generate the unconditional bit or branch type can be physically implemented anywhere using different types of storage (register or SRAM bits) and such logic suitably uses the same index as the BTB tags and data.

If three or four branches on the cache line have actually been Taken in their history, GHB 2110 will have Taken at different indexes (BTB tag LSBs) to distinguish between the various branches. If BTB has four ways, then BTB has capacity for up to four targets (as many targets as ways) that can be stored to correspond. In the example of FIG. 4A wherein BTB has two ways and entries occupy both ways currently at the same tag, the BTB control circuitry operates according to any suitable entry replacement policy or procedure such as randomly selecting (or updating least-recently used or other alternatives) as between the ways to determine the BTB way wherein to replace the entry in the BTB at that tag with the latest taken mispredicted branch address information.

The instructions at word positions between PREDADDR and IA[2:1] inclusive are regarded as valid or significant (when PREDADDR[2:1] is larger than IA[2:1] and PREDICTTAKEN=1). The use of the predicted address word bit-pair PREDADDR is now further described. Two lines from the BTB 2120 tag unit of FIG. 4A are coupled to Working History circuitry 2700W of FIG. 5. These two lines carry the bits that identify which one of four words on the targeted instruction cache line holds the Taken branch recognized in the BTB.

In FIG. 4B, comparator circuitry (not shown) associated with the IA register at Icache 1720 compares the current Instruction Address IA and next-previous IA bits that identify the cache line to retrieve. If these IA values are equal, the cache line has already been retrieved to flops 2740C. Icache 1720 control logic responds to the comparator circuitry (not shown) to prevent a repetitious access, thus conferring a power savings.

GHR Update 2730 is circuitry that operates to enter at least one speculative branch history bit based on logic processing of branch position bits from a full instruction cache line decode and to prevent any branch position bits corresponding to at least one invalid portion of the cache line from being included in the logic processing. Advantageously, in this way, the accuracy of the speculative branch history and resulting global branch prediction are improved.

To further understand PREDADDR, consider the following example of a portion of an instruction stream. (This example uses word addresses not byte addresses.)

| Word address | cache line |
|---|---|
| . . . | |
| previous sequential instructions | |
| . . . | |
| 300 Branch to 306 | cache line 1 |
| 301 instruction A | cache line 1 |
| 302 instruction B | cache line 1 |
| 303 instruction C | cache line 1 |
| 304 instruction D | cache line 2 |
| 305 Branch to 500 | cache line 2 |
| 306 instruction E | cache line 2 |
| 307 Branch to 600 | cache line 2 |
| 308 instruction F | cache line 3 |
| . . . | |

After the cache line 1 has been fetched to flops 2740C, assume the GHB 2110 circuitry of FIG. 4A and FIG. 6 predicts a branch on cache line 1 will be taken, and PREDADDR=00 identifies the branch at 300 as the position from which the branch will be taken. The BTB further outputs a predicted target address PTA for the branch at Instruction Address IA 300 and the PTA value is address 306 on Cache line 2. PTA is fed to IA in FIG. 4B and Cache line 2 is then fetched from Icache 1720. The target address 306 is now known (from PTA) to be the third word 10 of cache line 2, so the branch at 305 is masked out in the sense of being invalid or ignored for this purpose because address 305 is less than IA[2:1] address 306. ("306" hexadecimal is 001100000110 in binary so its two LSBs are "10".) The branch at 305 is invalid for purposes of this cycle because execution of the branch at 300 has already branched past or skipped address 305.

Suppose that GHB predicts by PREDICTTAKEN=1 that there is a taken branch somewhere on cache line 2 and BTB reports way hits for both the branch at 305 and the branch at 307. Since the branch at 305 is invalid, that leaves branch at 307 on the cache line as the only branch instruction that has an address with LSBs exceeding the "10" LSBs of IA[2:1]. PREDADDR is generated with a value of "11" since that is the LSBs of 307 hex. IA[2:1] is currently pointing to the hypothetically non-branch instruction at address 306. Fine-grained decoding and masking of the cache line advantageously has identified the existence of the branch at 307 and established BRCNT=00 (one valid branch). A one (1) (because PREDICTTAKEN=1) will be added to wGHR and no insertion zeroes are introduced in wGHR because BRCNT=00 and in accordance with TABLE 3. Now, BTB selects the Way output tagged by PREDADDR (tag 307 value), and BTB outputs new PTA=600 hex. Mux 2150 selects PTA instead of PNTA and sends PTA to IA via Mux 2210. Accordingly, the next fetch gets the cache line holding the instruction at Instruction Address 600 (IA=600) from Icache 1720. Moreover, both cache line 3 and the cache line holding the instruction at address 500 are advantageously prevented from being fetched at this time, and in this example.

IA[2:1] is generated in F2 pipestage and indicates the starting 16 bit word of the first-reached valid instruction in a line. PREDADDR determines the valid Taken branch instruction if any (if none then PREDADDR=11). If IA[2:1]=00 and PREDADDR is 11 then all bits of the BRMASK are valid for counting to yield BRCNT. Still assuming PREDADDR=11, if IA[2:1]=01 then only bits [3:1] on the cache line are valid and if IA[2:1]=10 then only bits [3:2] of BRMASK are valid.

The hardware and process of Post-Decode 2780 and GHR Update 2730 are further described with reference to a truth table or procedure for updating wGHR based on PREDICTTAKEN, IA[2:1], and PREDADDR and other information as shown next.

Note that BRMASK,PREDADDR,IA[2:1] and BRCNT are mixed into the entire control path, meaning FIG. 5 is correct but implementation and timing optimization in this example can smear the hard boundary shown in FIG. 5 between blocks 2780 and 2730.

Branch Count BRCNT is a function of the value of branch mask BRMASK as given by TABLE 5:

TABLE 5

BRANCH COUNT AS FUNCTION OF BRANCH MASK

```
BRMASK
|    BRCNT
|    |
0000 -- (No Update to wGHR when BRMASK=0000)
0001 00
0010 00
0011 01
0100 00
0101 01
0110 01
0111 10
1000 00
1001 01
1010 01
1011 10
1100 01
1101 10
1110 10
1111 11
```

GHRSHIFT is a "shift" enable for wGHR 2140 in the sense of enabling loading of LookupGHR into wGHR 2140. The shift is usually enabled if BRMASK represents at least one valid branch on the cache line. The shift logic has some preconditions based on valid fetch from Icache 1720, no pipe flush, and no cancellation of last write. The logic is:

GHRSHIFT=IRDvalid AND NOTflush AND NOT CancelLastwr AND OR (BRMASK).

The cache line branches are represented by ones, if any, in a four-bit representation BRMASK of words on the cache line. The pseudocode for BRMASK lays out the ones for branches from the various instruction sets on the 4-bit representation and applies various masks such as to mask out invalid branches.

```
BRMASK =
( ( [ {Abranch[1], 0, Abranch[0], 0} OR
    (ISA16branch[3:0] AND NOT MASKISA16[3:0]) OR
    (ISA32branch[3:0]) ]
    AND ISIZEMASK[3:0] )
    OR BTBwayMASK[3:0] )
```

AND {FETCHMASK[3:1], 1}.

Abranch[1:0] a 1 indicates a 32-bit branch instruction from an instruction set architecture (ISA) designated "A" is detected in that half of the cache line.

ISA16branch[3:0] a 1 indicates a 16 bit branch inst. from another ISA "T" is detected in that halfword ISA32branch[3:0] a 1 indicates a 16 or 32 bit branch inst. from another ISA is detected in that halfword.

FETCHMASK is a delayed version of IRDsize (delayed 1 clock). In other words, if only part of the instruction cache line is valid, then FETCHMASK masks out the invalid balance of the cache line.

Truth table TABLE 6 determines the MASKISA16 4-bit mask for BRMASK generation purposes. Each dash "-" in the following Tables indicates a Don't Care.

TABLE 6

MASK FOR ISA16

```
ISA32CROSS
|  ISABIT
|  |  ISIZE[3:0]
|  |  |       MASKISA16[3:0]
|  |  |       |
- 0 ---- 0000
0 1 0000 0000
0 1 1000 0000
0 1 0-10 0100
0 1 1-10 0100
0 1 -100 1000
0 1 00-1 0010
0 1 10-1 0010
0 1 -1-1 1010
1 1 0000 0001
1 1 1000 0001
1 1 0-10 0101
1 1 1-10 0101
1 1 -100 1001
default:
1 1 ---1 ----
```

Truth table TABLE 7 establishes the valid portion of the cache line for branch prediction purposes in generating BRMASK. That valid portion is represented by bits IRDsize as a function of PREDADDR, IA[2:1], and whether there is a predicted taken branch (PREDICTTAKEN active or not).

TABLE 7

IRD SIZE

```
PREDICTTAKEN
|  PREDADDR
|  |  IA[2:1]
|  |  |    IRDsize
|  |  |    |
0 -- 11 000
0 -- 10 001
0 -- 01 011
0 -- 00 111
1 11 11 000
1 11 10 001
1 11 01 011
1 11 00 111
1 10 10 000
1 10 01 001
1 10 00 011
1 01 01 000
1 01 00 001
1 00 00 000
default:
1 -0 11 ---
1 00 -1 ---
1 0- 1- ---
```

Notice that when PREDICTTAKEN=0 (Not-Taken), then PREDADDR is ignored for purposes of TABLE 7 example embodiment. In such case, branches on the cache line starting with IA[2:1] are predicted Non-Taken for wGHR update purposes in this embodiment, notwithstanding that one or more of those branches may have been Taken at some time as signified by way hit in BTB and PREDADDR. Various embodiments suitably vary the policies defined in the TABLES according to simulation results and as such results may suggest.

Truth table TABLE 8 for Instruction Size Mask generates ISIZEMASK[3:0] from cache line information about 16-bit instructions (ISIZE bit=0) and 32-bit instructions (ISIZE bit=1) for purposes of generating BRMASK described elsewhere herein. If ISIZE bit 3 is a one (1), then the cache line holds only a lower 16-bit portion of a 32-bit instruction, which is then rendered zero (0) as not counted as a branch in bit 3 of ISIZEMASK. To generate ISIZEMASK, each bit of ISIZE is inverted, except don't-care ("-") are rendered as ones (1) in the mask.

TABLE 8

INSTRUCTION SIZE MASK

```
ISIZE[3:0] bits
|       ISIZEMASK[3:0]
|       |
0000 1111
1000 0111
0-10 1101
1-10 0101
-100 1011
00-1 1110
10-1 0110
-1-1 1010
```

The truth table TABLE 9 shows how BTBwayxMASK is generated respective to each Way x of BTB 2120. BTBwayxMASK masks for each Way are then ORed to produce BTBwayMASK. BTBwayMASK is used in generating BRMASK as described elsewhere herein. For each Way x, BTBwayxMASK is a function of Instruction Address IA[2:1], the BTB-PC[2:1] of the branch target from the Way x, and conditioned on a Tag Hit (Way Hit) active in that Way x. If there is no Tag Hit active, the BTBwayxMASK for Way x is all zeroes. The TABLE 9 operation is analogous to FIG. 6 comparators 2874 and 2876 for comparing cache line positions for current instruction position IA[2:1] and, for each Way, the BTB-PC [2:1] position of Taken Branch instruction on the cache line.

TABLE 9

BTB WAY MASKS

```
IA[2:1]
|  BTBwayPC[2:1]
|  |
|  |    BTBwayxMASK[3:0]
|  |    |
00 00 0001
00 01 0010
00 10 0100
00 11 1000
01 00 0000
01 01 0001
01 10 0010
01 11 0100
10 00 0000
10 01 0000
10 10 0001
10 11 0010
11 00 0000
11 01 0000
11 10 0000
11 11 0001
```

Turning to the subject of wGHR and GHB 2110 initialization, the following values are used in one policy example for initializing on power up or soft reset:

wGHR—0 (all zeroes meaning "Not-Taken")
aGHR—0 (all zeroes meaning "Not-Taken")
GHB—set all two-bit entries to "00" (Not-Taken direction, Low strength) state.

Power Up: Initialize the aGHR and wGHR to all zeroes, or otherwise as simulation tests may suggest for improved initial branch prediction. Initialize GHB 2110 to all zeroes. An alternative policy initializes GHB to "10" (Taken, low strength), or randomizes the Taken/Not-Taken direction MSB bit or otherwise as simulation tests suggest in general or for optimizing particular applications. Initialize BTB 2120 valid bits to all zeroes (invalid).

Soft Reset: Same as Power Up.

Pipeline Flush: (see above) Load aGHR into wGHR. No initialization of GHB 2110.

Advantageously, no initialization is required during ordinary correctly-branch-predicted operation wherein a series of instructions traverse the execute pipeline. In the BTB 2120 and GHB 2110 of FIG. 4A, when a pipeline flush is required, the operations include:

1) Flush the pipeline.
2) In FIGS. 4A and 5, copy the aGHR 2130 to the wGHR 2140. This transfers information about actual branch behavior to the working global history register.
3) In FIG. 4A and FIG. 6, update the GHB 2110 (Global History Buffer) entry according to incrementing/decrementing the two-bit GHB saturation counter with correct actual Taken or Not-Taken behavior just encountered in the execution pipe and which necessitated the pipeline flush because of mis-prediction.
4) In FIG. 4A, update the BTB 2120 (Branch Target Buffer) with the also-corrected target address to which the branch now goes in the case of an actual Taken branch.

Actual History section 2700A has two further inputs supplied from Fetch Logic 2760 that are clocked into respective ones of the flip-flops 2740. These two further inputs are designated Update Global History Buffer UPDT-GHB (one line) clocked in to a flip-flop in the 2740 group. UPDTGHB controls the selection of Mux 2756. Update Global History Buffer Additional UPGHBADD (ten lines) is supplied to a respective part flip-flops 2740D and thence to one of the pair of 10-bit inputs of Mux 2756. The purpose of UPDTGHB and UPGHBADD is for maintenance purposes to initialize the wGHR 2140 for instance on power-up and soft reset.

Discussion now turns to FIG. 6.

Both the wGHR 2140 and aGHR 2130 are representations of a history of Taken/Not-Taken branches (speculative in wGHR 2140 and actual in aGHR 2130). The Global History Buffer circuitry 2110 of FIG. 6 responds to wGHR 2140 and delivers via logic a latest speculative predicted Taken/Not-Taken bit PREDICTTAKEN into the wGHR Update 2730 in an advantageous feedback loop.

In a more complex embodiment, the circuitry for GHB 2110 of FIG. 6 has a mux at output to select either 1) Bimodal local (instruction-specific) branch prediction or 2) improved global branch prediction based on fine-grained cache line decoding or 3) hybrid of 1) and 2). The embodiments 1), 2), 3) are in order of complexity, with embodiment 1) being the simplest. The discussion herein focuses on improvements to the global branch prediction. The embodiment 2) illustrated utilizes global branch prediction by itself.

A saturated bimodal counter is used to predict a taken branch only if the particular branch was Taken two times in a row, and predicts a Not-Taken branch only if the particular branch was Not-Taken two times in a row. The circuitry for generating the bimodal prediction is suitably maintained in the BTB 2120 of FIG. 4A. A Bias bit (not shown) in the more complex embodiment 3) is stored in each position of BTB 2120 and operates the mux to choose between Bimodal and Global branch prediction.

Global branch prediction in FIG. 6 keeps track of numerous previous branch paths so as to take account of the same branch being reached by different paths. "Path" for this purpose refers to a recent actual history sequence of Taken and Not-Taken bits. Accordingly, the branch prediction depends on the particular path that led to the current branch instruction that is being branch-predicted currently. For example, a first particular path that has just led up to the current branch may call for a branch to be now predicted Taken by branch prediction logic in Global History Buffer circuitry 2110 of FIG. 6. Suppose another particular path traversed in execution later in the code also leads up to the same branch instruction in the software program. The path-dependent branch prediction herein calls for that branch to be predicted Taken or Not-Taken independently of the prediction for the first particular path. Thus, the path matters in branch prediction of Taken and Not-Taken by Global History Buffer circuitry 2110.

Accordingly, in FIG. 4A and FIG. 6, Global History Buffer circuitry 2110 is keeping track of the branches reached in execution of the code and the Taken/Not-Taken direction and High/Low strength status of those branches.

Circuitry 1810, 1830 of FIG. 5 maintains a speculative and actual recent history of branches leading to the latest current branch instruction. In FIG. 6, Global History Buffer circuitry 2110 maintains a global, or comprehensive, history of the Taken/Not-Taken behavior of the processor indexed or addressed for write input by the actual history aGHR in FIGS. 4A and 6. This actual history is read-accessed by the speculative (working) history of branches provided by the wGHR 2140 of FIG. 5. In this way, wGHR 2140 feeds back addresses or indexes into the Global History Buffer circuitry 2110 for GHB read earlier in the Fetch pipe of FIGS. 3 and 4A to produce a Taken/Not-Taken prediction retrieved from the global entries.

In FIG. 6, GHB 2110 has a GHB register file 2810 that has a write port and a read port. The write port is updated by GHB Write Logic 2895 while each new branch prediction is read out of GHB register file 2810 read port. Upon an instance of MISPREDICT active, GHB Write Logic 2895 writes the strength bit and sometimes the direction bit in at the address (index) supplied by aGHR 2130. Thus, the two-bit GHB entry at the given GHB storage address (index) is updated according to a procedure as described elsewhere herein. In the process, GHB write logic 2895 writes the two-bit entry to a GHB storage address (index) specified by a concatenation of aGHR[9:2] with PCNEW[4:3] and a hash (XOR) 2898 of the most recent two aGHR[1:0] bits with two PCNEW LSB bits PCNEW[2:1]. (This write hash corresponds to analogous hashing on GHB read by XOR 2832.i.) The two bits 4 and 3 of the PCNEW address (PCNEW[4:3]) of the branch instruction in execution are provided as concatenation bits as just described for the write address to GHB register file 2810. Also, when MISPREDICT is not active but a branch instruction is executed in FIG. 7, the strength bit is updated in the two-bit entry at the given GHB storage address (index) according to the update procedure as described elsewhere herein.

In FIG. 6, for example, the GHB register file 2810 has 8K organized as 4K 2-bit entries to provide a 2-level Global History Buffer. 256×16 direction bits are provided in the register file array 2810. 256×16 strength bits are provided as an array of flip-flops wherein each flip-flop has a writeable bit. The number of GHB register 2810 entries is at least equal to the number of different branch sequences indexed, which is 2 raised to a power equal to the number of bits (e.g. 10 here) in the wGHR 2140 plus the two extra bits of Instruction Address IA[4:3] used at Mux 2820 for GHB read. (2-to-12$^{th}$ power is 4K.)

In FIG. 6, GHB register file 2810 is index accessed or read-addressed by 10-bit wGHR output line 2715 from FIG. 5. Six most-significant bits (MSB) of line 2715 are decoded to access 64:1 the GHB register file 2810, followed by a 4:1 Mux 2815 controlled by the next two less-significant bits of line 2715, followed by a 4:1 Mux 2820 under control of Instruction Address (IA) bits [4:3]. Then follows a 4:1 Mux 2825.0 (and 2825.1) under control of a hash provided by XOR 2832.0 (or 2832.1) of the two least-significant bits (LSBs) on line 2715 with PC-BTB tag LSB bits [2:1] from BTB Way0 (or Way1).

Confusion of similar branch histories, e.g. those longer than 10 bits that have the same 10 bits in the wGHR, is advantageously minimized by introducing the Instruction Address IA [4:3] bits distinguishing cache lines as further indexing bits for the GHB register file 2810. Using XOR 2832.0 and XOR 2832.1 to XOR the wGHR LSBs with low order PC-BTB bits representing position on a cache line helps distinguish branch histories where several branch instructions are found in program code in more or less close succession such as on the same cache line.

In FIG. 6, note that there are two sets of branch prediction circuitry 2840.0 and 2840.1 called GHB Way0 and GHB Way1 herein. For brevity, the internals of circuitry 2840.0 is described, it being understood that the corresponding parts of circuitry 2840.1 have decimal 0.1 appended instead of 0.0. The decimals correspond to the BTB 2120 Way 0 or Way 1 from which the PC-BTB[2:1] values come to the GHB Way circuits 2840.1 and 2840.1 respectively.

In branch prediction circuitry 2840.0 note that four-bit upper and lower halves of the 8 bits from Mux 2820 are supplied respectively to 4:1 Mux 2825.0 in circuitry 2840.0 and 4:1 Mux 2825.1 in circuitry 2840.1. XOR 2832.0 provides a 2-line output to control 4:1 Mux 2825.0 and analogous XOR 2832.1 controls 4:1 Mux 2825.1. A single line output from each Mux 2825.0 and 2825.1 is fed to a corresponding first input and second input of the 2:1 output Mux 2170.

A Branch Target Buffer BTB 2120 GHB Way Select signal is provided to control the Mux 2170. The single-line output of Mux 2170 is a GHB Taken/Not-Taken branch prediction signal.

The GHB Way Select control signal for Mux 2170 is generated by a logic circuit 2860. Logic circuit 2860 has inputs for two BTBWayHit lines, and three greater-than comparators 2874, 2876, and 2878. Comparators 2874 and 2876 each have a first input respectively connected to Instruction Address bits IA[2:1]. Comparators 2874 and 2876 each have a second input respectively connected to PC-BTB bits [2:1] for each of BTB Way0 and Way1. Comparator 2878 has first and second inputs respectively connected to those PC-BTB bits [2:1] for Way0 and Way1.

Logic circuit 2860 advantageously responds to the comparators 2874, 2876, 2878 to operate the selector control of Mux 2170 so that the prediction selection is logically takes account of Way Hit signals on lines Way Hit lines 2162 and the position of each Taken-branch registered in BTB relative to each other and to the current instruction position IA [2:1] on the cache line.

BTB 2120 has two ways, to avoid thrashing on addresses which have different LSBs but are accessed by identical bits IA[10:3], which are used as the BTB index tag MSBs. The comparators 2874, 2876, 2878 provide prioritization or selection by Mux 2170 of the Way-related GHB circuit 2840.0 or 2841 output.

With two Ways the BTB generates two hit/miss outputs, one for Way0 and one for Way1. This raises the possibility that both Ways could hit. The illustrated embodiment adopts the policy of selecting the lower addressed Way hit rather than the higher addressed Way hit, provided the PC-BTB [2:1] tag address values from each BTB Way array are within range of (greater than) the fetch starting address which is indicated by IA[2:1]. Note that both Way values of PC-BTB[2:1] are compared against IA[2:1], and then the two Way values are compared against each other. This comparison process is also used to select the predicted target address PTA from up to two possibilities stored in the BTB Ways.

In FIG. 6, output signals from this process are named as follows:

BTBHIT=BTB circuit has a PTA prediction in at least one Way.

GHBTAKEN=direction of the GHB prediction, 1=Taken, 0=Not-Taken (T/NT)

(subject to not-Unconditional qualifier and BTBHIT qualifier in FIG. 4A logic.)

If no BTB Ways hit, then BTBHIT=0. GHBTAKEN is don't care. Logic 2176, 2172 overrides GHBTAKEN. Set PREDADDR="11" to point to end of cache line.

If both BTB Ways hit and both Muxes 2825 report Taken, then BTBHIT=1 and set GHBTAKEN=1, except see Note 1. Set PREDADDR to PC-BTB[2:1] address position located immediately after the IA[2:1] value.

If both BTB Ways hit and both Muxes 2825 report Not-Taken, then BTBHIT=1 and GHBTAKEN=0. Set PREDADDR=11. In case of unconditional branch, the GHB prediction is overridden and PREDICTTAKEN=1.

If both BTB Ways hit and Muxes 2825 report opposite Taken/Not-Taken, generate GHB Way Select control signal to Mux 2170 to select the reported T/NT from the Way Mux 2825.0 or 2825.1 with its PC-BTB[2:1] address position located immediately after the IA[2:1] value (closest to the fetch starting address). Set PREDADDR to that PC-BTB [2:1] address immediately after IA [2:1] value. Then BTBHIT=1 and assign GHBTAKEN to the value output by that selected Way Mux 2825.0 or 2825.1, except see Note 1.

If only one BTB Way hits, then BTBHIT=1. Set GHB Way Select to that Way to assign GHBTAKEN to value from corresponding Way Mux 2825.0 or 2825.1. Set PREDADDR to PC-BTB [2:1] for that Way. Except see Note 1 re that sole PC-BTB[2:1] value.

Note 1: In FIGS. 4A and 6, if both PC-BTB[2:1] addresses represent tag address positions on the cache line before the position represented by the IA[2:1] value, then GHBTAKEN is set equal to zero (Not-Taken). Set PREDADDR to="11" to point to end of cache line. In FIG. 5, wGHR is updated with a number of leading zeroes equal to the number of branches on the cache line starting with IA[2:1] value and thereafter to end of cache line.

The Taken/Not-Taken branch prediction output from Mux 2170 is fed via AND-OR logic 2176, 2172 to the control input of Mux 2150. Mux 2150 selects between either of two target addresses PTA and PNTA (IA+1 increment of current Instruction Address IA) and supplies a Target Address output TA to access the Instruction Cache 1720 of FIG. 3 and FIG. 4A to obtain a targeted new cache line that includes the instruction to which processing operations are to branch, depending on the branch prediction.

Thus, as described hereinabove, the next time the same pattern of branches as represented by the set of ones and zeroes in wGHR 2140 shows up, that same set of ones and zeroes will read-access the location in the GHB 2110 that holds the direction bit to correctly predict Taken or Not-Taken. As various patterns show up, and corresponding GHB 2110 and BTB cells are written and corrected, the branch prediction process as a whole progressively improves during execution of instructions by the processor.

Suppose there are a series of 1000 instructions in a software program and there are 100 branch instructions among the 1000 instructions. Each of those branches has a Taken or Not-Taken value in actual execution of the program and some the branches are executed more frequently than others. Thus, the branch behavior in the actual execution of the program represents a series of actual occurrences, as determined in actual execution in the execute unit, in a branch pattern of Taken, Not-Taken, Taken, Taken, Not-Taken, Not-Taken, Not-Taken, etc. [1, 0, 1, 1, 0, 0, 0, . . . ]

At any given time in actual execution the last 10 actual occurrences in the branch pattern is maintained as a series of ones and zeroes in the aGHR 2130 and a 10-bit set of actual and predicted branch occurrences is kept in the wGHR 2140. Then at any given time the wGHR 2140 holds a particular pattern of branch pattern bits that access the location in the GHB 2110 corresponding to the particular pattern. The GHB 2110 responds by supplying a one or zero direction value representing Taken or Not-Taken respectively as a branch prediction value of GHB Takenfor the latest branch instruction to be predicted.

The teachings herein are applied to improve microprocessor pipelines in many respects. For example, portions of the pipeline are suitably improved by providing:

A) message passing from later stage of fetch pipeline to earlier stage of fetch pipeline B) message passing from stage of decode pipeline to stage of fetch pipeline C) message passing from later stage of decode pipeline to earlier stage of decode pipeline D) message passing from stage of execute pipeline to stage of decode pipeline E) message passing from later stage of execute pipeline to earlier stage of execute pipeline F) message passing from stage of execute pipeline to stage of fetch pipeline.

G) message passing from same stage of plurality of execute pipelines to a stage of fetch pipeline (execute pipeline includes arithmetic/logic pipelines and load-store pipelines)

H) message passing from plurality of stages of execute pipeline to a stage of fetch pipeline J) message passing from plurality of stages of execute pipeline to a plurality of stages of fetch pipeline K) message passing from a stage of execute pipeline selectively to different stages of fetch pipeline Branch Target Address FIFO As the number of pipeline stages increases in high performance microprocessor technology, branch prediction becomes ever more critical to keep taken-branch instructions from flushing the pipeline. As the branch is predicted, suppose the predicted branch target address PTA were pipelined (or "staged" by passing it down every stage of the pipeline) from the fetch unit to the decode unit to the execute unit of the pipeline. Regardless of whether the branch is predicted correctly or not, the predicted branch target address shifting through many pipeline stages would consume a significant amount of power; especially the clock power associated with registers at every pipeline stage.

In FIG. 3, the microprocessor also has a fast-access nearby L1 data cache 1780 for holding some data from level 2 (L2) cache 1725 or a main memory. If the cache memory 1780 lacks data that the microprocessor requests, the circumstance is called a cache miss, and the data will take longer to obtain from L2 cache 1725 or main memory. In addition, on data cache miss for a load operation, all instructions from the load operation forward may need to be replayed (executed all over again) when load data is actually received from the L2 cache or main memory.

On instruction replay, suppose the predicted branch target addresses were recycled through the decode unit of the pipeline so that the branch target address is also pipelined between execution unit and decode unit on instruction replay. Again, the predicted branch target address shifting through many pipeline stages would consume a significant amount of power, especially the clock power associated with registers at every pipeline stage.

Accordingly, it is desirable to simplify the process of branch prediction and reduce power consumption associated with branch prediction and instruction replay after cache misses.

To solve this problem, some embodiments herein establish a pointer-based branch target FIFO 1860 set up in the execution unit, at or prior to the pipestage where the branch is executed. In FIGS. 3, 4A, and 7, branch target FIFO 1860 is situated just ahead of the execution unit, the branch is executed in the execution unit, and the branch resolution is then performed. As the branch is predicted as Taken (PREDICTTAKEN=1) in FIG. 4A in the fetch unit of the pipeline, the branch Target Address TA=PTA from mux 2150 is sent directly to and latched into pointer-based FIFO 1860.

Because FIFO 1860 is pointer based, the branch Target Address does not move in most or all clock cycles. Pointers are updated instead of moving addresses. This saves power in branch Target Address operations. Notice that the structural complexity of arrangements for staging the branch target address down many pipeline stages is also thereby omitted and obviated. For purposes of branch target address communication, intermediate pipeline stages are bypassed. Advantageously, power dissipation and real estate in the improved and simplified structure is reduced and saved, either entirely or for addition of other functions and features.

The branch target FIFO 1860 is suitably implemented as a register file structure with pointers for reading and writing addresses. The pointers increment (or decrement alternatively) and wrap around as appropriate after each read or write operation of the FIFO 1860.

The branch target FIFO 1860 has at least two pointers. A speculative write pointer WP1 increments on every taken branch address issued from Mux 2150 in the fetch unit. An architectural read pointer RP1 increments in execution pipestage in response to FIG. 7 comparator(s) 3010 for each actual taken branch except in case of replay, mis-prediction, and abort. In FIG. 7, predicted-Taken target address PTTPC identified by the architectural read pointer RP1 is used in a decode pipestage for Program Counter PC1 calculation and that predicted target address is coupled to the target address comparator 3010 as a Predicted Taken Target PC Address PTTPCA in execution pipestage. Advantageously, pointer operations save power because each PTA value input to the FIFO 1860 from Mux 2150 of FIG. 4A remains stationary as long as it is in the FIFO 1860.

With this structure, the clock is only enabled for a single entry in the FIFO 1860 queue for writing data. The output data is read from static multiplex logic. An advantageously small amount of clock power is expended for updating the pointers such as WP1 and RP1. FIFO control logic 2350 of FIG. 4A controls the write and read pointers and involves a minor and advantageously acceptable amount of circuitry.

For four (4) pipeline stages with single read and write pointers to 32-bit registers, the clock power is estimated to be about 36/128 (9/32=0.28) or about 28% of the clock power that would be utilized for shifting registers. The power (36 units) of the pointer-based FIFO approach herein is ratioed to a divisor equal to the read power (128 units) of a dynamic logic FIFO, as estimated next.

For writing, the data is written to a single 32-bit register in either approach, so the power dissipation on write is similar at 32 units of power. Four bits for 2-bit write pointer WP1 and 2-bit read pointer RP1 dissipate another 4 units of power for a total of 36 (32+4) units of power. For the special register file structure, no entry is shifted, saving much power. Muxes read the data from the register file registers under control of at least one read pointer RP1. While the register file can be implemented with dynamic Mux, this dynamic Mux approach is believed comparable in dissipation to enabling a 32-bit register for shifting, which consumes power. Here, a static Mux is used because the power dissipation through the static Mux is generally less than for dynamic Mux.

The 128 units divisor comes from reading or removing of data from a FIFO that physically shifts data. When the first entry of the FIFO is read, all other entries are shifted up by one entry. Four 32-bit shifting registers would involve 128 units of power. More shifting registers would consume even more power.

Another embodiment of the FIFO 1860 suitably has two read operations and read pointers RP1, RP2: one in an early pipeline stage of execution or decode for program counter (PC) calculation, and one later in the pipeline in the execute pipestage that performs the branch target calculation and comparison with the predicted Target Address PTTPCA. In this and other embodiments, even more than two pointers are suitably provided. For example a replay pointer RP3 tracks writeback operations for replay purposes as described later hereinbelow.

Further advantages offered by one or more of the embodiments are described next.

The amount of power saving using the FIFO 1860 improvement increases with increasing numbers of pipeline stages.

Power used by an embodiment is reduced compared to the power required by a shifting register structure for staging branch prediction bits down the pipeline. Power is reduced by using the pointer-based FIFO 1860 for the taken-branch target address instead of a shifting structure.

Even though the FIFO is updated only on every taken branch, and even if a taken branch occurs less frequently or occasionally, the power savings due to the pointer-based FIFO approach are nevertheless substantial. This is because a conventional shifting-queue in the pipeline can consume power with every clock cycle all over the pipeline, regardless of whether there are few or many taken branches to shift down it. In pipelines where the predicted taken branch address would be shifted down multiple pipelines, the power dissipation can be even further exacerbated. Also, more complicated logic must be added in order to clock gate the predicted taken target address through many pipestages, since the clock gating would be very likely different for this purpose than for the basic instruction shifting in each pipeline.

Furthermore, the special pointer-based FIFO 1860 uses about one quarter 25% of the real estate for 32-bit registers piping taken branch addresses down the pipeline. In terms of power, the power is estimated to be the 28% above multiplied by 25%, which equals 7%. In other words, the pointer-based FIFO approach consumes only an estimated 7% (estimated seven percent) of the power required by the piping of taken branch addresses down the pipeline.

Integrated circuit area (real estate) is significantly saved by substantially reducing the routing of buses through different pipestages and units of the pipeline. In one type of layout embodiment, the Predicted Target Address PTA bypasses intermediate pipestages and goes directly from the fetch unit via a bus 2910 of FIG. 4A to the FIFO 1860 for access by the execution unit where the branch is resolved. A single bypass-bus 2910 to FIFO 1860 structure is used in place of many different stages and types of shifting registers. Moreover, the single FIFO 1860 structure is readable by different pipestages for branch execution.

A single bypass-bus 2910 to FIFO 1860 structure dispenses with latency (wasted clock cycles) associated with laterally passing down branch predictions through pipestages. The FIFO register file with pointers is used to hold the predicted taken target addresses stationary in the FIFO and to bypass the predicted taken target addresses around a plurality of the pipestages for comparison with actual target addresses generated from the executing of branch instructions.

The FIFO 1860 is readily implemented as a circular buffer.

The deeper the pipeline and the more parallel execution pipelines used in superscalar architecture, generally the deeper the FIFO 1860 should be. This helps to prevent pipeline stalls. The number of pipestages is not critical for applicability of this pointer-based FIFO improvement. The improved FIFO 1860 approach, is applicable to pipelines of any length.

The FIFO 1860 depth is generally set equal to the highest number of taken-branches that are likely to be in the pipeline at once. "Depth" for this purpose is the number of items of data that can be entered in the queue that the FIFO 1860 represents with its corresponding number of storage elements. The depth of the FIFO 1860 is suitably made to have a number in a range of plus or minus 30% of the sum of the number of execute pipestages in all pipelines to which a branch instruction can be issued. Some embodiments feasibly have FIFO depths outside this range as well. Embodiments within this range are believed to be large enough in depth number to minimize pipeline stalling and small enough in depth number to conserve real estate.

In an example, a FIFO 1860 holds an address-wide predicted taken branch target address PTA, a 2-bit branch type (Call, Return, Normal), and an ISABIT bit for Instruction Set Architecture (ISA) all from BTB 2120. The number of entries (depth) is suitably twelve (12) entries in one example. The deeper and wider a pipelined architecture is, the more FIFO 1860 register storage units are suitably used according to an advantageously-linear scale-up in numbers. If the FIFO 1860 becomes full, a signal FIFOFULL is output from the FIFO 1860 to the fetch unit for stalling instruction cache fetches. To minimize such stalls, the capacity of the FIFO 1860 entries is made sufficient to prevent stalls that might occur if the number of entries were relatively small.

The FIFO 1860 is initialized at power up, at soft reset, and on every pipeline flush such as at branch mis-prediction. The FIFO 1860 is initialized in one procedure simply by setting the write pointer WP1 equal to the read pointer RP1. Upon pipeline flush, valid bits of the FIFO 1860 are cleared. In ordinary operation, there does not need to be any editing function on the FIFO 1860 besides writing one end and doing pointer updates.

In FIG. 4A, when a branch is predicted Taken, a Target Address PTA from BTB 2120 is fed to the Target Address output of Mux 2150 which couples the Target Address to FIFO 1860. At the FIFO 1860, the write pointer WP1 for predicted taken branch is incremented and the predicted Target Address PTA is entered into the FIFO 1860. Notice that the FIFO 1860 write pointer WP1 does not need to be changed for every branch, because changing the FIFO 1860 write pointer WP1 specifically for predicted-Taken branches is sufficient.

Then several or many cycles later (assuming a highly pipelined high performance processor), the branch instruction itself reaches an execution pipestage of FIG. 7 that actually generates an actual Target Address ATA of the branch instruction being executed. A comparator 3010.0 or 3010.1 compares the predicted Taken Target PC Address PTTPCA from the FIFO 1860 with the actual Target Address ATA0 or ATA1 generated by that execution pipestage in a pipeline Pipe0 or Pipe1. If the comparison detects a match (equality), the prediction is correct and operations proceed.

If comparison detects a target address mismatch, then a mis-prediction has occurred. The following operations are thereupon initiated:

1) Send the correct actual Target Address ATA as address MPPC to the Branch Prediction Unit of FIG. 4A.
2) Flush the pipeline.
3) Flush the FIFO 1860 by
 a) zeroing FIFO 1860 valid bits
 b) resetting the read pointer RP1 and the write pointer WP1 both to zero or otherwise equal to each other.

The mis-predicted branch instruction may have been used in FIG. 4A to predict another branch instruction as target that also has a predicted taken branch. The predicted branch target address for the targeted predicted taken branch instruction will have been entered in the FIFO 1860, making the new predicted taken branch information irrelevant and to be disregarded. Clearing the whole FIFO 1860 is conveniently performed as described above.

To understand why the predicted-Taken Target Address PTTPCA and actual Target Address ATA are compared at all in execution, note that some advanced instruction sets have instructions that lack a simple set of a few identifier bits that establish a given instruction as a branch instruction. For example, an indirect branch instruction has the target address provided from a register or load data from memory. In other words, the register or memory address is identified by the branch instruction and not the target address itself. Since the register data or load data can change, the PTTPCA and ATA are compared in execution.

Also, one instruction may have a flag bit that makes the instruction do a branch only when the flag is set. Another instruction may simply be a Move instruction or an arithmetic or logic instruction that is only a branch for the present purposes when the destination of the result of executing the instruction is program counter PC via shift/ALU/saturate lines SAT0 or SAT1 of FIG. 7. Thus, there may be no identifying set of bits to decode that characterize the instruction itself as a branch, nor any instruction wherein a flag bit might be set to indicate the branch nature or not.

Accordingly, the predicted-Taken Target Address PTTPCA and actual Target Address ATA are advantageously compared in execution for any of several such reasons. In one embodiment, the comparison is performed in an execution pipestage because that saves at least one clock cycle compared to doing the compare in the Fetch unit in a second alternative embodiment that passes the actual Target Address ATA back to the Fetch unit for comparison in Fetch. The predicted Target Address PTTPCA and actual Target Address ATA are compared as a continual verification in this embodiment that the branch prediction circuitry is working, because even with advanced instruction sets, the predicted Target Address should match the actual Target Address when the branch is predicted Taken.

Furthermore, with advanced instruction sets, the actual calculation of the actual Target Address in the execution unit varies sufficiently with different types of branch instructions that merely predicting a branch-Taken and having an actual branch-Taken does not guarantee that the sequence of instructions fetched in response to the branch-Taken prediction PTA in FIG. 4A are the same as the sequence of instructions that should be fetched in response to the actual Target Address ATA of the actual branch-Taken event in FIG. 7. Accordingly, it is advisable to perform a comparison of actual Target Address ATA with predicted Target Address PTTPCA and flush the pipe if there is a discrepancy, or target mismatch.

In FIG. 7, in cases where one branch is a predicted-Taken branch, OR gate 3020 accommodates respective comparison of PTTPCA by comparators 3010.0 and 3010.1 with ATA for a branch instruction in either pipeline Pipe0 or Pipe1.

The FIFO 1860 improvement is applicable not only to machines that do in-order instruction issue but also machines that do out-of-order instruction issue. For out-of-order architectures, each entry in FIFO 1860 is augmented with a tag. Likewise the FIFO 1860 improves machines that are single issue, dual-issue, and multiple issue for any number of instructions. For example, in a higher performance processor where multiple branches can be executed in the same cycle, more read pointers and read ports are suitably provided to the branch FIFO for reading first and second (and even more) entries of the branch FIFO for predicted taken target addresses pertaining to branch instructions respective to each of a plurality of pipelines to which branch instructions are issued. The FIFO 1860 improvement is applicable to improving a fetch pipe itself, a decode pipe, the datapath execute pipe as above, and a load-store pipe.

The special pointer-based FIFO approach in various embodiments facilitates improved operation of RISC processors, digital signal processors (DSP), microcontrollers, main microprocessors, SIMD (single instruction multiple decode) and MIMD (multiple instruction multiple decode) architectures, pipelined ASICs (application specific integrated circuits, and pipelined gate arrays, and in general pipelined architectures with one or more pipelines of whatever type to which the advantages of the FIFO 1860 structure comment its use.

As described, the message-passing bus and FIFO 1860 structure is applicable for instance to pipes where a branch is executed. Processor architectures that execute two or more branches simultaneously are improved by adding one or more additional read pointers to the FIFO 1860 to accommodate every parallel branch.

Direct Passing of Immediate Data and Other Embodiments

Some embodiments directly pass immediate data directly to a destination pipestage instead of staging the immediate data through the pipeline. The immediate data are suitably handled by pointer operations of a pointer-based FIFO according to the teachings herein. Embodiments thus include those in which one or more such pointer-based FIFO circuits store immediate data, store predicted target addresses, store other types of information, or any combination of the foregoing.

Some embodiments add pointer-based FIFO registers to FIG. 3 register file 1770 itself. In other words, the layout is arranged to have the FIFO 1860 improvement situated physically in or adjacent or essentially as part of the array which establishes the register file 1770. The FIFO 1860 is arranged with its pointer circuitry in a highly real-estate efficient manner. The register file registers and the FIFO 1860 registers are operated independently in some embodiments. In other embodiments the register file 1770 registers and the FIFO 1860 registers are suitably shared in their uses when this contributes to the performance of the processor.

Some other embodiments advantageously lay out the FIFO 1860 as a regular structure (as opposed to random logic) situated near the pipestage of branch execution. In other words, the FIFO 1860 introduces a physically-regular geometric structure into the chip layout near one of the pipestages as seen under the microscope.

In FIG. 7, Actual Target Address ATA0 and/or ATA1 is calculated in an execution pipestage and compared with the predicted Target Address PTTPCA in an execution pipestage. In FIG. 3 and FIG. 4A, originating pipestage of PTA is a fetch pipestage and the circuitry jumps over or bypasses intervening pipestages into the execution unit.

Suppose a branch is predicted Taken (PREDICT-TAKEN=1). The BTB 2120 generates a predicted target address PTA in FIG. 4A. One clock cycle (one pipestage) is used to send the PTA to the FIFO 1860 and control circuitry 2350 increments its write pointer WP1. Each time a predicted-Taken branch occurs, the target address PTA is entered in the FIFO 1860 and write pointer WP1 is incremented. In between occurrences of predicted taken branch, several or many clock cycles occur by the time the branch instruction itself reaches an execution pipestage to be actually executed.

In FIG. 7, an actual calculated branch target address ATA is generated by execution pipestage for the branch instruction that had a predicted branch target address entered in the FIFO 1860 many cycles earlier. The process of operation reads the FIFO 1860 at the read pointer RP1. With the comparator 3010, compare the thus read predicted target address PTTPCA for this just-executed branch instruction. Then increment the FIFO 1860 read pointer RP1. If addresses ATA and PTTPCA are identical, the prediction is correct (MISPREDICT=0), otherwise not correct (MISPREDICT=1).

Remember that many clock cycles elapse between the time when the predicted Target Address PTA was predicted for the first branch instruction and when that first branch instruction actually reaches the execution pipestage for execution and calculates the actual Target Address ATA for the first branch instruction. During those clock cycles second, third, etc. branch instructions with predicted-Taken branches can occur.

Now consider the FIFO 1860 read pointer RP1 for actual-Taken branch. This read pointer RP1 is not affected by entry of new second, third, etc. branch predictions. The read pointer RP1 is used to identify the location in the FIFO 1860 where the branch prediction is found for the branch instruction just being executed in execute pipestage. Then when the comparison of predicted Target Address PTTPCA for the first branch instruction with the actual Target Address ATA for the first branch instruction is needed, the read logic accesses or has accessed the FIFO 1860 at the location to which the read pointer RP1 points to obtain address PTTPCA to use in the comparison.

Once this FIFO read occurs, the read pointer RP1 for predicted Target Address PTTPCA is now incremented by FIFO Control Logic 2350 of FIG. 4A in response to PCCTL lines from the FIG. 7 execute unit. In this way, when a second predicted-Taken branch instruction arrives in the execution pipestage, then the read circuitry will be ready to read the predicted Target Address PTA that was sent from Fetch unit to FIFO 1860 regarding the second branch instruction. Accordingly, the read pointer RP1 for predicted Target Address PTTPCA continually chases the write pointer WP1 for predicted Target Address PTA around the circular buffer of FIFO 1860. The read pointer RP1 for predicted Target Address PTTPCA points to the same FIFO 1860 location as the write pointer WP1 for predicted Target Address PTA when there are no branch instructions in the pipeline with predicted-Taken branches subsequent to a first branch instruction that has just reached execution pipestage for execution.

With this pointer-chasing description, consider how a single FIFO 1860 advantageously handles first, second, third, etc. branch instructions all with predicted-Taken that go down plural execution pipelines. Assume for but one example, an architecture that prevents two branch instructions, or at least two predicted-Taken branch instructions, from being issued simultaneously into the execution pipelines. The single FIFO 1860 keeps track of all the predicted-Taken branches. The same write pointer WP1 and read pointer RP1 operations advantageously suffice to handle all the pipelines. In processor architectures that execute two or more branches simultaneously, additional read pointers are added to the FIFO 1860 to accommodate every parallel branch.

Target mismatch is only one condition in mis-prediction. Target mismatch is the focus of operation of comparator(s) 3010. Target mismatch involves the branch going to a different actual Target Address than the predicted Target Address predicted for that branch instruction.

Other conditions include: 1) branch taken and mis-predicted not taken, 2) branch taken and not predicted at all, or 3) branch is not taken but was predicted taken. Some conditions that contribute to mis-prediction in an embodiment are not conceptually related to mis-prediction at all, such as a synchronization event. A synchronization event is changing of mode of instruction from one instruction set (ISA value) to another instruction set, whereupon the circuitry in some embodiments synchronizes the pipeline again.

An event of Branch actually Taken but mis-predicted Not-Taken is not a case of target mismatch. Accordingly, no predicted-Taken Target Address is entered into the FIFO 1860 and the write pointer WP1 is not incremented. Indeed, advantageously predicted Non-Taken Target Address PNTA of FIG. 4A does not need to be entered into FIFO 1860, since the execute pipestage sends back the branch taken event in PCCTL to the aGHR 2130 of FIG. 4A and FIG. 6. So the predicted not-Taken (PREDICTTAKEN=0) bit for that branch instruction in wGHR 2140 is contrary to the PCCTL actual-Taken, and a mis-prediction is suitably generated in circuitry 1830.

Conversely, if the predicted Target Address was generated predicted-Taken (PREDICTTAKEN=1), but the branch is actually Not-Taken some cycles later in the execution pipestage, then there is no need for an address comparison. Instead, the read pointer RP1 is simply incremented by FIFO control logic 2350 in response to PCCTL and the pipeline is flushed. If branch was taken and not predicted at all, then this case either is resolved by target mismatch at comparator 3010 by misreading FIFO at read pointer RPI or by logic that detects a pointer error wherein RP1 gets ahead of WP1. The pipeline is flushed and FIFO 1860 is reset.

Branch prediction unit GHB 2110 might incorrectly predict the instruction as a branch instruction that is Taken when it is not a branch instruction at all. If this scenario is possible, the main decode unit 1930 of FIG. 3 suitably is arranged to detect this condition and sends a mis-predict signal back to fetch unit in FIG. 4A.

In FIG. 7, Condition code CC evaluation is done in a pipestage having an ALU for a branch instruction in the first pipeline pipe0. For a second pipeline pipe1, the condition code evaluation is done in a subsequent pipestage on any branch instruction that may currently exist there. This approach to condition code evaluation advantageously provides an ALU setting a condition code CC and a conditional branch instruction executing in the same cycle.

In FIG. 7, the execute unit has logic 3260 for generating PCCTL control information including a first bit representing branch or no-branch as determined by logic in execute unit detecting generally something other than a simple increment of PC for that instruction (or not) such as by comparison of ATA and PC. A second PCCTL bit is activated if a branch exists, to identify a branch actually Taken or actually Not-Taken event. The second PCCTL bit reflects a condition code CC event based on ALU or other logic in the execute unit. The details of such logic are de-emphasized for conciseness since they are dependent on widely-varying details of instruction set(s) used in any particular processor.

In FIG. 7, an ALU 3030 computes actual target address ATA0 to a flop as the sum of current value of an address PCion a line 3033 plus an offset value on a line 3034. Alternatively, contents of another register REG are provided to ALU 3030.0 by a Mux 3035 selection of the register REG instead of address PC1.

Then comparator 3010.0 compares ATA0 with PTTPCA and if not equal, a mis-predicted branch is signaled on MISPREDICT line 3038. MISPREDICT is coupled back to branch prediction circuitry of FIGS. 4A, 5 and 6. A Condition Code CC from ALU 3030.0 together with MISPREDICT and CALL (Call via FIFO 1860 from BTB TABLE 1) provide selector controls to a Mux 3040. Mux 3040 selects ATA0 or another address source. The output of Mux 3040 supplies the actual target address MPPC to update BTB 2120 in the branch prediction circuitry of FIG. 4A. In this way, actual branch execution produces the information used to update the aGHR 2130 and GHB 2110 of FIG. 4A as well. Similar circuitry, including ALU 3030.1, comparator 3010.1, mux 3035.1, and so on, is provided to support the second pipeline Pipe1.

FIFO 1860 couples a taken target address PTTPC to successive flops 3110, 3120 provided in the first couple of execution pipestages in FIG. 7 and to supply address PTTPCA to comparator(s) 3010. The reason for using the successive flops in this example is described next.

FIFO 1860 latches the Predicted Taken Address PTA data in fetch area of FIG. 4A of the pipeline. Each PTA stays in the FIFO 1860 and circuitry of FIG. 7 uses the data in decode stage and again in execute stage. Then the predicted-taken target address suitably remains in the FIFO until the branch instruction is retired from the execute pipeline. Because N:1 muxing is provided to read from a selected one of the N register file registers of FIFO 1860, and this takes some extra time in some embodiments, the data is automatically supplied in previous clock cycles ahead of branch resolution comparator 3010 if advisable to avoid a possible speed path. Even if flops 3110 and 3120 are used, the FIFO plus flops still involve significantly less real estate and power dissipation than a conventional pipelining approach. MISPREDICT Flop 3038 is selectively clocked such as when valid contents are present to update it as indicated by PCCTL.

The Taken-Branch FIFO 1860 is actually automatically read every clock cycle and piped a couple of flops 3110, 3120 down to the comparator, in a first alternative. In such alternative FIG. 7 flops 3110 and 3120 literally represent physical shifting. Pipelining the target address (PTTPC down to supply PTTPCA to the comparator 3010) is suitably clock gated with the valid predicted taken branch instruction. As noted, this approach still is advantageous over a conventional pipelining approach.

In a second alternative of this embodiment, since reading is by static mux, the data is available every clock cycle. Control logic 2350 does not advance the read pointer unless there is a valid predicted taken branch instruction in execution unit. The second alternative provides control logic 2350 with two read pointers, a first read pointer RP1 in the earlier pipeline stage for PC calculation by Adder 3050 and a second read pointer RP2 in execute stage for address comparison by comparator 3010. This second alternative is even better than the just-described first alternative in terms of power because the Target address PTTPCA is directly accessed by use of read pointer RP2 for comparator 3010. PTTPC and PTTPCA are the same address residing stationary in a same one storage element of FIFO 1860. In this second alternative, FIG. 7 flops 3110 and 3120 are interpreted as figurative representations and not physical structures, and read pointer RP2 handles direct access by comparator 3010 to the register file 2355 of FIFO 1860.

The comparison output of comparator 3010 is conveniently meaningless except on instances of Taken Branch detection in PCCTL. In other words, the comparison is qualified by the occurrence of an actual taken predicted branch instruction. This solves or obviates any problem how to know when to read the FIFO 1860 to get input timely to the comparator since Taken branch detection occurs in a later execution pipestage than FIFO 1860 read occurs. Advantageously, the circuit reads the FIFO 1860 when or even before actual Taken branch detection in the execute pipe occurs.

Two consecutive correctly-predicted Taken branches can occupy consecutive execute pipestages (back-to-back). Read pointer RP1 increments on every predicted taken branch instruction. Read pointer RP2 just increments on every valid (actually taken) predicted taken branch instruction.

Again consider first and second consecutive correctly-predicted Taken branches. In this second alternative, FIFO Read Pointer RP2 increments upon occurrence of first Taken branch to get FIFO ready immediately for the second Taken branch. In other words, the first valid predicted taken branch instruction increments the FIFO read pointer RP2. Comparator 3010 advantageously obtains that taken branch predicted address (from FIFO 1860 register location to which RP2 points) on the next cycle and not two cycles of latency later, thus saving time and increasing instruction efficiency.

FIFO 1860 provides still further advantages in embodiments that replay instructions. Data cache 1780 can signal replay of a load/store instruction. Suppose the replay signal is asserted several cycles into the execute pipeline due to cache miss or misalignment. On replay, the load/store instruction and all subsequent instructions in the execute pipeline are then suitably re-sent or reissued from the decode unit 1730. In a further advantageous feature supporting such replay, FIFO 1860 has a third read pointer RP3 herein called an actual or architectural read pointer controlled by logic 2350. Read pointer RP3 is incremented in writeback pipestage of an execute pipeline when an instruction is actually retired. If and when the replay signal is asserted, the control circuit 2350 is responsive to the replay signal to reset the read pointers RP1 and RP2 described hereinabove to equal or point to the same FIFO location as actual read pointer RP3. In this way read pointers RP1 and RP2 are moved back in the instruction stream to a point where these read pointers RP1 and RP2 will do their part in the replay process. The read pointer RP3 is also compared to write pointer WP1 in generating a FIFOFULL signal to instruction fetch circuitry in an unusual case if the FIFO 1860 perchance becomes full.

When no branch is involved, or a branch is predicted Not-Taken and there is no misprediction, then Adder 3050 and its input muxes are controlled to simply increment the value of PC1. No mis-predicted address MPPC is produced when there is no misprediction (MISPREDICT=0) or MISPREDICT zero invalidates MPPC. Address PC1 is suitably piped down to a Mux 3045 to update PC in ordinary sequential execution.

When a branch is actually Taken and there is no misprediction, then mux 3040 is controlled to select the ATA of the branch (or PTTPCA) and then mux 3045 feeds it to PC in the register file 1770 and feeds it back to fetch as PCNEW of FIGS. 7 and 4A.

In FIG. 7, the legends Pipe0 and Pipe1 refer to pipelines of circuitry horizontally in FIG. 7 that service branches. For example, Adder 3210 offsets the PC1 value when there is a branch in Pipe0, and Adder 3230 offsets address PC1 when there is a branch in Pipe1. The offset values are omitted for clarity since they merely depend on particulars of whatever instruction set(s) ISA are used in the processor. Also, note that offsets depend on addresses of the various instructions issued into the execute unit pipelines, and the instructions may be issued in varying numbers concurrently (or none) in a given clock cycle.

For delivering the address MPPC in case of a mis-predicted branch (e.g., MISPREDICT active) because of target mismatch or other mis-prediction type, Mux 3045 delivers the output from Mux 3040 to PC and PCNEW. Also, selector controls operate Mux 3040 and Mux 3042.0 or .1 pertaining the pipeline having the branch instruction involved. If a branch is actually Not-Taken but predicted Taken, then Mux 3040 supplies MPPC equal to incremented PC as received via ALU 3210 and flops 3212, 3214, 3216. Flop 3216 also is suitably used to provide a RETURN address for a Return instruction.

Regarding Adder 3050, if a branch is predicted Taken (PREDICTTAKEN active), then Mux 3052 selects PTTPC from FIFO 1860 for input to Adder 3050. If a branch is predicted Not-Taken, then Mux 3052 selects PC1 for input to Adder 3050. If a register is involved in calculating PC1, then Mux 3052 selects a register REG such as from register file 1770. Adder 3050 increments the PC1 value by different amounts depending on how many instructions have just been validly issued, for instance.

If a branch is Taken but either predicted Not-Taken or has target mismatch, then the Mux 3042 feeds the output of the ALU 3030 for the pipeline involved as an ATA to Mux 3040. Then Mux 3040 selects the ATA for that pipeline and delivers it to MPPC and to Mux 3045. Then Mux 3045 delivers MPPC to PC and PCNEW.

Input to the adder 3050 has an offset selected by Mux 3054 from predetermined multiple values when instructions from different instruction sets have different lengths such as a 16-bit or 32-bit instruction. Logic 3056 is responsive to inputs such as ISA, Taken, and MISPREDICT, to control selections by Mux 3054. A mux 3058 is suitably provided for an additional Adder 3050.1. Mux 3058 is responsive to whether an instruction is validly issued in a particular pipeline or not (VALID 0 and 1).

In FIG. 7, note the PC1 value is updated depending on various combinations of branch conditions, instruction type ISA and so forth. The PC1 value is fed into execute pipelines Pipe0 and Pipe1 as a read operand for branch instructions starting at Adder 3210 or Adder 3230. The predicted target address PTTPC and the value for PC1 in execute stage are used by Adder 3050 in a process which operates to calculate address PC1 for instruction 0 and 1 by means of Adder 3210 and Adder 3230. The instruction length, type, mode, and condition code CC status are also used to calculate the PC value by Adder 3050.

Figure 8:
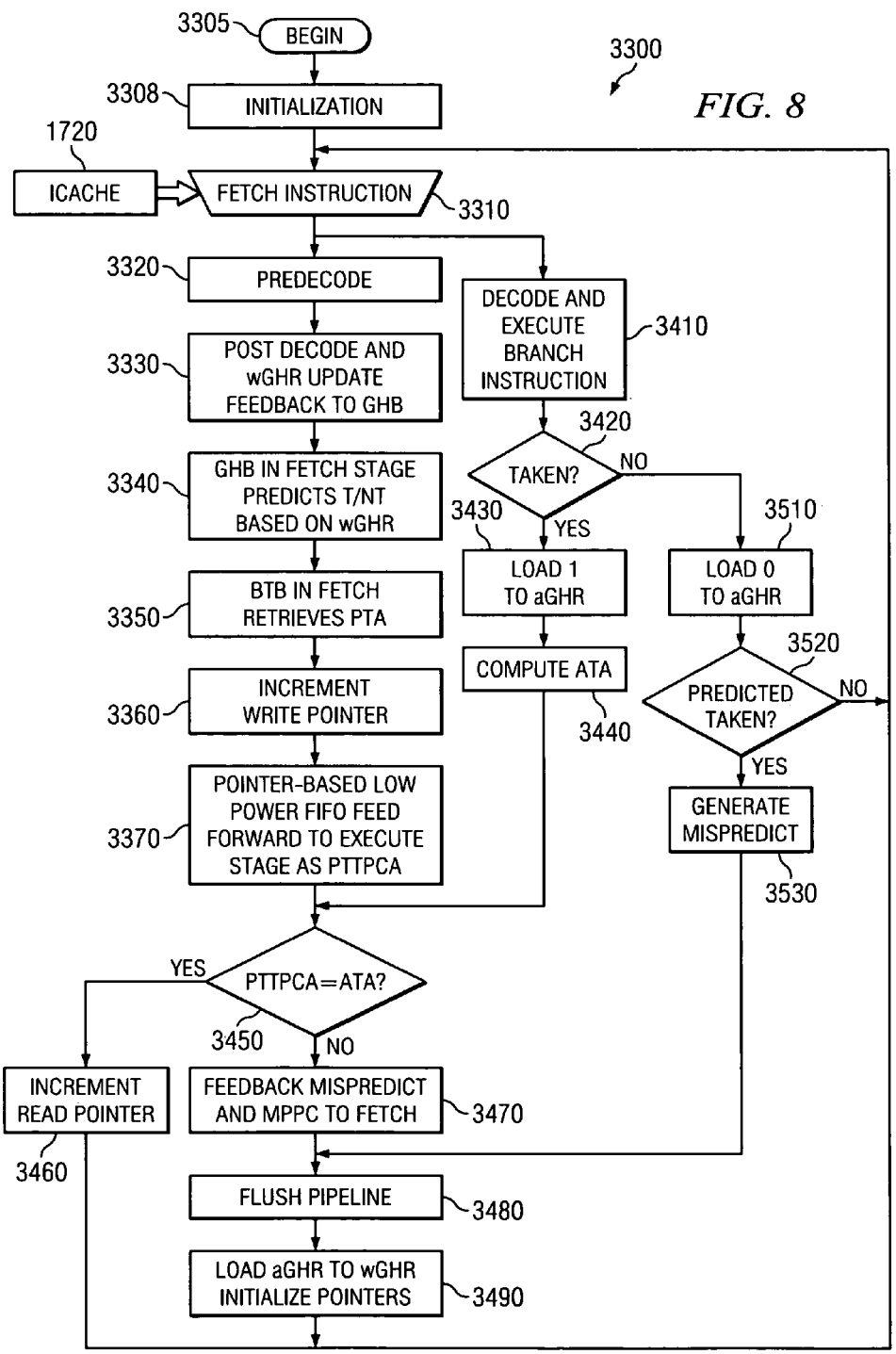
FIG. 8 is a flow diagram of a method embodiment of inventive branch prediction.

Turning to flow diagrams of FIGS. 8 and 9, the steps that execute instructions as well as steps that perform other operations serially in the flow diagrams are also suitably parallelized and performed for all the source operands and pipestages concurrently. FIGS. 3, 4A, 4B, 5, 6, 7 and other Figures show examples of such parallelization. Thus, pipeline processes advantageously parallelize steps. For instance the next branch prediction can be set up (increment the write pointer) in FIFO 1860 while the data are being read from FIFO 1860. Similar remarks apply to FIG. 9, for which analogous pipeline processes are suitably implemented.

In FIG. 8 a branch prediction process 3300 commences with BEGIN 3305 and initialization of aGHR 2130, wGHR 2140, and FIFO 1860 read pointers RP1, RP2, RP3 and write pointer WP1. The process 3300 proceeds to fetch an instruction in a step 3310 such as fetching a cache line from Icache 1720. Then for branch prediction and any other useful purpose a Pre-Decode step 3320 begins decoding the cache line to detect branches thereon. In at least one clock cycle thereafter, a Post-Decode step 3330 finishes detecting branch(es) on the cache line and if any branches exist on the cache line, step 3330 updates wGHR working (speculative) branch history with a latest speculative history pattern for at least one such branch.

A Global branch prediction step 3340 next accesses GHB 2110 and retrieves a latest Taken/Not-Taken bit representing a branch prediction for the at least one such branch on the cache line. Also, a step 3350 operates BTB 2120 to retrieve a Predicted Target Address PTA, if any. If GHB 2110 predicts the branch as Taken, and BTB 2120 has entry for a PTA, then a step 3360 increments write pointer WP1 of FIFO 1860 and enters PTA into FIFO 1860.

A step 3370 minimizes power dissipation by pointer-based operation 3360 and by coupling the FIFO 1860 output to bypass some pipeline stages for access by one or more pipeline stages thereafter such as late main decode access of PTTPC at a location in FIFO 1860 identified by Read Pointer RP1 and in the execution unit (FIG. 7) access of Predicted Taken Target PC Address PTTPCA by Read Pointer RP2 and committed read pointer RP3.

In the execution unit, a decision step 3450 compares an actual target address ATA from branch instruction execution with PTTPCA. If a match is detected (YES) in step 3450, then operations go to a step 3460 and increment read pointer RP1 of FIFO 1860 and then loop back to fetch 3310.

Note that while the hereinabove branch prediction-related steps are underway, a step 3410 is doing main instruction decoding and execution of instructions including one or more branch instructions. In actual execution of a branch, an actual Taken/Not-Taken signal is generated. If the branch is actually Taken, then a decision step 3420 proceeds to a step 3430 to load a Taken (1) bit into Actual History aGHR 2130. Also, a step 3440 computes actual target address ATA in the execution unit. Then ATA is delivered to comparator 3010 for comparison with PTTPCA in decision step 3450 as described herein. A match (YES) is described in the previous paragraph in regard to step 3450.

If a match of ATA with PTTPCA is not detected (NO) in step 3450, then operations proceed to a step 3470. Step 3470 directly sends back a MISPREDICT one-bit signal by a message-passing bus 1820 back to aGHR 2130 so that power dissipation is further minimized and to update aGHR 2130. An actual target address ATA instruction address-wide value designated MPPC is also sent back with MISPREDICT to BTB 2120 to update BTB.

Because of the mis-predicted branch, a succeeding step 3480 flushes the pipeline, and then a step 3490 loads the aGHR 2130 to wGHR 2140 so that further branch prediction remains coordinated with the actual branching in execution. Also, step 3490 initializes the pointers of the FIFO 1860. Operations go back to step 3310 to fetch the appropriate cache line from earlier in the instruction stream where the mis-predicted branch was situated, and to resume the process 3300.

If in step 3420, the branch instruction was Not-Taken in execution, then operations go to a step 3510 and load a zero (0) indicative of Not-Taken into the Actual History aGHR 2130. Then a step 3520, determines whether this branch that was actually Not-Taken had been predicted Taken. If the branch had not been predicted Taken, then no mis-prediction occurred, and operations go directly back to step to step 3310 and avoid read pointer step 3460.

If in step 3520, the branch had been predicted Taken, then a mis-prediction occurred. At this point a step 3530 supplies MISPREDICT active to the branch prediction circuitry, whereupon flush pipeline step 3480 and subsequent steps are performed.

In FIG. 9 a method 3600 of updating the wGHR 2140 performed by the circuitry of FIG. 5 commences with a BEGIN 3605 and then decodes a cache line in a step 3610. In step 3610, instructions from different instruction sets (ISA) are detected, and branch instructions are distinguished from other instructions. If there is no branch on the cache line, then a step 3620 loops back to step 3610.

If there is a branch on the cache line, then operations go to a step 3630 to generate ISIZEMASK as a first function f1 of different branches from different ISAs on the cache line. Also, a step 3640 generates a BTBwayMASK as a second function f2 of LSBs from IA[2:1] and the PC-BTB in each BTB way, designated BTBwayPC[2:1]. A step 3650 generates a FETCHMASK as a third function f3 of PREDICT-TAKEN, PREDADDR, and IA[2:1] delayed by a clock cycle in flops 2740D of FIG. 5.

A step 3660 generates BRMASK as a fourth function f4 of branch information from the decode step 3610, and the mask steps 3630, 3640, and 3650. Then a step 3670 generates branch count BRCNT as a fifth function f5 of BRMASK from step 3660.

A value LookupGHR for updating wGHR 2140 is generated in steps 3680 and 3690. Step 3680 determines, depending on which of several possible values of BRCNT is present, an operation 3690.00, .01, .10, or .11 to perform. A respective series of selected wGHR bits is followed by a bit for Taken/Not-Taken (T/NT), or by a zero and T/NT, or two zeroes and T/NT, or by three zeroes and T/NT. In this way an advantageous operation helps to distinguish and separate different branch histories depending on the context of Not-Taken branches on the cache line where they occur. The result is a string or pattern of bits LookupGHR at point 3695 in the process.

Next a step 3710 determines whether a signal SelAGHR calls for reconstructing wGHR such as in the case of a mis-prediction. If not, then a step 3720 loads the wGHR 2140 with the series of bits constituting LookupGHR. If wGHR must be reconstructed based on step 3710, then a step 3730 advantageously loads wGHR 2140 with the contents of aGHR 2130 as appropriate to return to an earlier point in the sequence of cache lines, or an earlier point in a software program.

In FIG. 9, operations performed by circuitry of FIG. 6 proceed to step 3740 to access the GHB register file 2810 using the wGHR contents as index. Several bits are retrieved from the GHB and more process steps determine which of the several bits is to be the GHB branch prediction here. Now, a step 3750 further muxes the bits based on IA[2:1]. This produces a set of bits one-fourth as numerous in this example.

Then a step 3760 hashes LSBs of wGHR with LSBs of PC-BTB such as by an XOR operation. Then a step 3770 muxes the bits from step 3750 based on the hash of step 3760. A further step 3780 then muxes the remaining bits by the GHB Way Select of FIG. 6 to produce the GHB TAKEN bit representing Taken/Not-Taken. Another step 3790 selects the predicted address of the next instruction by muxing PTA and PNTA using the Taken/Not-Taken signal from step 3780.

If there is a signal to stop, then operations reach RETURN 3815. Otherwise, if there is no signal to stop, then a decision step 3810 loops back and goes to step 3610 whereupon the process is repeated for each next cache line.

Processes of Manufacture

Manufacturing processors as described herein involves procedures as follows.

1) Prepare a particular design of the processor to have an instruction cache with cache lines, and a pipeline having at least one fetch stage and at least one decode stage.

2) Include in the design Register Transfer Language (RTL) or like form, an additional decode circuit having respective circuit portions situated for fetch purposes timewise in parallel with the at least one fetch stage and the at least one decode stage.

3) Establish the RTL to define the additional decode circuit to respond to the cache line to generate at least one set of bits representing presence of plural branches in the cache line when plural branches occur and at least one different bit representing presence of a single branch in the cache line, and a pattern storing circuit to respond to the additional decode circuit to hold and update a pattern of predicted branches.

4) Arrange the coupling and timing of modules so that aGHR is established to act as a first storing circuit associated with the fetch stage to store a history of actual branches, and wGHR is established to act as a second storage circuit in the pattern storing circuit associated with the fetch stage to store a pattern of predicted branches. Couple the second storing circuit to the first storing circuit. Couple the execute stage back to the first storing circuit.

5) Verify the design of the processor in simulation.

6) Manufacture to produce a resulting processor according to the verified design.

7) Using scan chain methodology on the resulting processor to verify the contents and timing of the additional decode circuit and the pattern storing circuit.

8) Further use scan chain methodology on the resulting processor to verify the contents and timing of the first storing circuit, the second storing circuit and the execute stage.

Testing and Verification

The skilled worker tests and verifies any particular implementation of the branch prediction in any appropriate manner. Each particular design is verified in simulation before manufacture to make sure that all blocks are operative and that the signals to predict and process branch instructions in the pipeline(s) are timed to coordinate with each particular branch instruction to which they pertain. First-silicon is suitably checked by wafer testing techniques and by scan chain methodology to verify the contents and timing of Pre-Decode, Post-Decode, aGHR and wGHR, GHB, BTB output, and states and control signals in key flops in the circuitry as described herein.

Tests when running software with known characteristics are also suitably performed. These software tests are used to verify that computed results are correct, that average number of mis-predicted branches divided by number of branches does not exceed an expected level, that average power consumption in the circuitry does not exceed an expected level and other performance criteria are met. Accordingly the pointer-based FIFO 1860 circuitry provides an additional advantage of facilitating testing because FIFO 1860 holds predicted taken target addresses that can be analyzed and verified.

Other Types of Embodiments

Some embodiments only use selected portions of the branch prediction function described herein. Various optimizations for speed, scaling, critical path avoidance, and regularity of physical implementation are suitably provided as suggested by and according to the teachings herein.

The branch prediction circuitry is suitably replicated for different types of pipelines in the same processor or repeated in different processors in the same system. For instance, in FIG. 2, any one, some or all of the RISC and DSP and other processors in the system are suitably improved with the advantageous branch prediction embodiments described herein. Suppose RISC processor 1105 is a first processor so improved. Then one or more additional microprocessors such as DSP 1110, and the RISC and/or DSP in block 1420, and the processor in WLAN 1500 are also suitably improved with the advantageous branch prediction embodiments. AFE 1530 in WLAN 1500, and Bluetooth block 1430 are examples of additional wireless interfaces coupled to the additional microprocessors. Other improved branch prediction circuits as taught herein are also suitably used in each given additional microprocessor.

The branch prediction described herein facilitates operations in RISC (reduced instruction set computing), CISC (complex instruction set computing), DSP (digital signal processors), microcontrollers, PC (personal computer) main microprocessors, math coprocessors, VLIW (very long instruction word), SIMD (single instruction multiple data) and MIMD (multiple instruction multiple data) processors and coprocessors as cores or standalone integrated circuits, and in other integrated circuits and arrays. The branch prediction described herein is useful in various execute pipelines, coprocessor execute pipelines, load-store pipelines, fetch pipelines, decode pipelines, in order pipelines, out of order pipelines, single issue pipelines, dual-issue and multiple issue pipelines, skewed pipelines, and other pipelines and is applied in a manner appropriate to the particular functions of each of such pipelines.

The branch prediction embodiments as taught herein are useful in other types of pipelined integrated circuits such as ASICs (application specific integrated circuits) and gate arrays and to all circuits with a pipeline and other structures involving dependencies and analogous problems to which the advantages of the improvements described herein commend their use. Other queue-like structures besides microprocessor pipelines can be improved by this message passing bus and FIFO 1860 structure, such as a 10 GHz or other high speed gate array.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows in software and hardware embodiments as well as portions of structure in various embodiments of the invention.

It is emphasized that the flow diagrams of FIGS. 8 and 9 are generally illustrative of a variety of ways of establishing the flow and the specific order and interconnection of steps is suitably established by the skilled worker to accomplish the operations intended. It is noted that, in some software and hardware and mixed software/hardware embodiments, the steps that execute instructions as well as steps that perform other operations in the flow diagrams are suitably parallelized and performed for all the source operands and pipestages concurrently. FIGS. 3, 4A, 4B, 5, 6, 7 and other Figures show examples of such parallelization. Other embodiments in hardware or software or mixed hardware and software do the steps serially. Some embodiments virtualize or establish in software form advantageous features taught and suggested herein.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, digital computer circuitry, ASIC circuits, PALs, PLAs, decoders, memories, non-software based processors, and other circuitry, and processing circuitry cores including microprocessors and microcomputers of any architecture, or combinations thereof. Internal and external couplings and connections can be ohmic, capacitive, direct or indirect via intervening circuits or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in either the detailed description and the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A processor having a pipeline and operable to process a plurality of instructions including branch instructions, said processor comprising:
    a fetch pipeline having branch prediction circuitry to provide an indication of a taken branch or a not taken branch and store and supply respective predicted taken target addresses for some or all of said branch instructions in said plurality of branch instructions;
    an execution pipeline having a branch execution circuit; and
    storage elements and control logic operable to establish a first-in-first-out (FIFO) circuit with a write pointer and a read pointer, wherein said control logic is coupled to said branch prediction circuitry to receive said indication of taken or not taken;
    wherein said control logic is responsive, to said indication indicating that a given branch instruction in the plurality of instructions is predicted to be a taken branch, to write a predicted taken target address, corresponding to said given branch instruction, to a said storage element identified by the write pointer and the predicted taken target address remaining stationary therein and so that said storage elements of said FIFO circuit do not store predicted not taken branches, said control logic operable to read a predicted taken target address from a storage element identified by the read pointer to said branch execution unit without said read predicted taken target address passing through a plurality of pipestages between said branch prediction circuitry and said branch execution circuit.

2. The processor claimed in claim 1 wherein said control logic is operable to change the value of the write pointer before writing another predicted taken target address.

3. The processor claimed in claim 1 wherein said branch execution circuit is operable to generate a signal that a branch instruction is actually taken, and said control logic responsive to the signal to change the value of the read pointer.

4. The processor claimed in claim 1 wherein said branch execution circuit is operable to generate an actual target address of a taken branch instruction and has a comparison circuit coupled to said FIFO to compare a predicted taken target address with the actual target address of the taken branch instruction.

5. The processor claimed in claim 4 wherein said branch execution circuit is operable to generate a signal that a branch instruction is actually taken, said comparison circuit operable to supply a mis-prediction output in response to the signal that the branch instruction is actually taken.

6. The processor claimed in claim 1 wherein said branch prediction circuitry is operable to supply a branch prediction signal representing Taken or Not-Taken, and said control logic responsive to the branch prediction signal Taken to write the predicted taken target address to the FIFO.

7. The processor claimed in claim 1 further comprising a multiplexer with inputs coupled to said storage elements and a selector control responsive to the read pointer.

8. The processor claimed in claim 7 wherein said multiplexer includes a static multiplexer circuit.

9. The processor claimed in claim 1 wherein said FIFO is coupled to also supply a predicted taken target address to a pipestage earlier in the pipeline than said branch execution circuit.

10. The processor claimed in claim 9 wherein the pipestage earlier in the pipeline is a pipestage for address calculation.

11. The processor claimed in claim 1 wherein said execution pipeline includes a writeback stage and said FIFO includes another read pointer, and said another read pointer is responsive to said writeback stage.

12. The processor claimed in claim 11 wherein said another read pointer is responsive to retirement of an actual taken branch by said writeback stage.

13. The processor claimed in claim 11 wherein said processor has a replay circuit operable to reset said read pointer equal to said another read pointer.

14. The processor claimed in claim 1 wherein the FIFO has a storage capacity for predicted taken target addresses, the storage capacity in a range of plus or minus 30% of the sum of the number of execute pipestages in each execute pipeline of the processor to which a branch instruction can be issued.

15. The processor claimed in claim 1 wherein said storage elements also are coupled to said branch prediction circuitry to hold branch type information.

16. The processor claimed in claim 1 wherein said storage elements also are coupled to said branch prediction circuitry to hold instruction set architecture information.

17. The processor claimed in claim 1 wherein said control logic is operable to selectively set the write pointer equal to the read pointer.

18. The processor claimed in claim 1 wherein said control logic is operable to set the write pointer equal to the read pointer upon a reset.

19. The processor claimed in claim 1 wherein said control logic is operable to change the value of the write pointer by incrementing the write pointer before writing another predicted taken target address, and said branch execution circuit is operable to generate a signal that a branch instruction is actually taken, said control logic responsive to the signal to increment the read pointer.

20. The processor claimed in claim 1 wherein said control logic with said storage elements establish the FIFO as a circular buffer.

21. The processor claimed in claim 1 wherein said control logic is operable to change the value of the read pointer with every taken branch retired from said execute pipeline.

22. The processor claimed in claim 1 wherein the pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), and 10) multiple instruction multiple data (MIMD).

23. A method of operating a processor having a pipeline having pipestages, the method comprising predicting an indication of whether a branch instruction is a taken branch or a not taken branch;

supplying respective predicted taken target addresses for branch instructions;

executing branch instructions having targets; and responsive to said indication for a branch instruction being predicted as taken, writing in a FIFO and holding a predicted taken target address, corresponding to the branch instruction being predicted as taken, stationary in the FIFO to bypass the predicted taken target addresses around a plurality of the pipestages for comparison with the targets from the executing of branch instructions and so that said FIFO does not store predicted not taken branches.

24. The method claimed in claim 23 wherein using the FIFO includes writing a predicted taken target address to the FIFO according to a write pointer.

25. The method claimed in claim 24 wherein using the FIFO includes changing the value of the write pointer before writing another predicted taken target address to the FIFO.

26. The method claimed in claim 23 wherein using the FIFO includes reading a predicted taken target address from the FIFO according to a read pointer.

27. The method claimed in claim 26 executing branch instructions includes generating a signal that a branch instruction is actually taken, and using the FIFO includes changing the value of the read pointer responsive to the signal.

28. The method claimed in claim 23 wherein executing branch instructions includes generating a signal that a branch instruction is actually taken, performing the comparison, and supplying a mis-prediction output based on a state of the comparison in response to the signal that the branch instruction is actually taken.

29. The method claimed in claim 23 further comprising predicting a branch and supplying a branch prediction signal representing Taken or Not-Taken, and using the FIFO includes writing a predicted taken target address to the FIFO responsive to the branch prediction signal Taken.

30. The method claimed in claim 23 farther comprising statically multiplexing the FIFO to bypass for comparison.

31. The method claimed in claim 23 wherein the executing includes a writeback operation and using the FIFO further includes reading a predicted taken target address from the FIFO according to a first read pointer and operating a second read pointer for the FIFO responsive to the writeback operation.

32. The method claimed in claim 31 wherein the operating the second read pointer includes adjusting the second read pointer responsive to retirement of an actual taken branch by the writeback operation.

33. The method claimed in claim 31 wherein the method includes initiating replay of some of the instructions and resetting the first pointer equal to the second read pointer upon initiation of the replay.

34. The method claimed in claim 23 wherein the step of using the FIFO includes storing branch type information for the executing.

35. The method claimed in claim 23 wherein the step of using the FIFO includes storing instruction set architecture information for the executing.

36. The method claimed in claim 23 wherein the step of using the FIFO includes selectively setting a write pointer equal to a read pointer for the FIFO.

37. The method claimed in claim 23 wherein using the FIFO includes circular operation of pointers.

38. A wireless communications unit comprising
a wireless antenna;
a wireless transmitter and receiver coupled to said wireless antenna;
a microprocessor coupled to at least one of the transmitter and receiver and operable to process a plurality of instructions including branch instructions, the microprocessor comprising:
  a pipeline having a fetch pipeline with branch prediction circuitry to provide an indication of a taken branch or a not taken branch and store and supply respective predicted taken target addresses for some or all of the branch instructions;
  an execution pipeline with a branch execution circuit; and
  storage elements and control logic operable to establish a first-in-first-out (FIFO) circuit with a write pointer and a read pointer, wherein said control logic is coupled to said branch prediction circuitry to receive said indication of taken or not taken, wherein the control logic is responsive, to said indication indicating that a given branch instruction in the plurality of instructions is predicted to be a taken branch, to write a predicted taken target address to a storage element identified by the write pointer and the predicted taken target address remaining stationary therein and so that said storage elements of said FIFO circuit do not store predicted not taken branches, the control logic operable to read a predicted taken target address from a storage element identified by the read pointer to the branch execution unit without the read predicted taken target address passing through a plurality of pipestages between the branch prediction circuitry and the branch execution circuit; and
a user interface coupled to said microprocessor.

39. The wireless communications unit claimed in claim 38 wherein the instruction issue circuit is operable to issue as many as a plurality of candidate instructions concurrently.

40. The wireless communications unit claimed in claim 38 further comprising a second microprocessor operable to process a plurality of instructions including branch instructions and a camera interface, the second microprocessor comprising:
  a second pipeline having an additional fetch pipeline with additional branch prediction circuitry to provide an additional indication of a taken branch or a not taken branch and store and supply respective predicted taken target addresses for some or all of the branch instructions;
  an additional execution pipeline with an additional branch execution circuit; and
  additional storage elements and additional control logic operable to establish another first-in-first-out (FIFO) circuit with a write pointer and a read pointer, wherein said additional control logic is coupled to said additional branch prediction circuitry to receive said indication of taken or not taken, wherein said control logic is coupled to said branch prediction circuitry to receive said indication of taken or not taken; the additional control logic responsive, to said additional indication indicating that a given branch instruction in the plurality of instructions is predicted to be a taken branch, to write a predicted taken target address to a storage element identified by the write pointer and the predicted taken target address remaining stationary therein, the additional control logic operable to read a predicted taken target address from a storage element identified by the read pointer to the additional branch execution unit without the read predicted taken target address passing through a plurality of pipestages between the additional branch prediction circuitry and the additional branch execution circuit.

41. The wireless communications unit claimed in claim 38 further comprising a second microprocessor operable to process a plurality of instructions including branch instructions and an additional wireless interface coupled to said second microprocessor, said second microprocessor comprising:

a second pipeline having an additional fetch pipeline with additional branch prediction circuitry to supply respective predicted taken target addresses for branch instructions;

an additional execution pipeline with an additional branch execution circuit; and additional storage elements and additional control logic operable to establish another first-in-first-out (FIFO) circuit with a write pointer and a read pointer, wherein said additional control logic is coupled to said additional branch prediction circuitry to receive said indication of taken or not taken, wherein said control logic is coupled to said branch prediction circuitry to receive said indication of taken or not taken, the additional control logic responsive, to said additional indication indicating that a given branch instruction in the plurality of instructions is predicted to be a taken branch, to write a predicted taken target address to a storage element identified by the write pointer and the predicted taken target address remaining stationary therein, the additional control logic operable to read a predicted taken target address from a storage element identified by the read pointer to the additional branch execution unit without the read predicted taken target address passing through a plurality of pipestages between the additional branch prediction circuitry and the additional branch execution circuit.

42. The wireless communications unit claimed in claim 38 wherein said microprocessor further includes security software including a branch instruction.

43. The wireless communications unit claimed in claim 38 wherein said pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), and 10) multiple instruction multiple data (MIMD).

44. The wireless communications unit claimed in claim 38 further comprising user interfaces to provide functionality selected from the group consisting of 1) mobile phone handset, 2) personal digital assistant (PDA), 3) wireless local area network (WLAN) gateway, 4) personal computer (PC), 5) WLAN access point, 6) set top box, 7) internet appliance, 8) entertainment device, and 9) base station.

* * * * *